Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors:
Paul A. Maximoff
Stanley J. Krol
John B. Sola

Inventors
Paul A. Maximoff
Stanley J. Krol
John B. Sola

Inventors:
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

April 27, 1965 P. A. MAXIMOFF ETAL 3,180,014

CONTACT LOADING MECHANISM FOR ELECTRICAL SOCKET MACHINES

Original Filed Sept. 18, 1958

34 Sheets-Sheet 15

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
by Paul A. Maximoff
Stanley J. Krol
John B. Sola

April 27, 1965

P. A. MAXIMOFF ET AL

CONTACT LOADING MECHANISM FOR ELECTRICAL SOCKET MACHINES 3,180,014

Original Filed Sept. 18, 1958

34 Sheets-Sheet 20

Inventors
Paul A. Maximoff
Stanley J. Krol
Joh B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Jola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

Inventors
Paul A. Maximoff
Stanley J. Krol
John B. Sola

United States Patent Office 3,180,014
Patented Apr. 27, 1965

3,180,014

CONTACT LOADING MECHANISM FOR ELECTRICAL SOCKET MACHINES

Paul A. Maximoff, Barrington, Ill., Stanley J. Krol, Arcadia, Calif., and John B. Sola, Chicago, Ill., assignors, by mesne assignments, to Malco Manufacturing Company Inc., Chicago, Ill., a corporation of Illinois Original application Sept. 18, 1958, Ser. No. 761,875, now Patent No. 3,063,139, dated Nov. 13, 1962. Divided and this application Feb. 21, 1962, Ser. No. 174,912
8 Claims. (Cl. 29—203)

This application is a division of Serial No. 761,875, filed September 18, 1958, now U.S. Patent No. 3,063,139, issued November 13, 1962.

This invention relates to automation of machinery for assembling electrical components. More particularly, the invention relates to machinery utilized for automatic handling of insulator bodies, and automatic assembling, fastening and testing of a plurality of electrical connectors in each of the insulators.

The automatic machine of the present invention is adapted for handling insulator bodies and connectors which in the specific embodiment shown and described comprise electronic tube sockets. Such tube sockets include an insulating body and a plurality of connectors which are fixedly secured in the socket body in a definite preselected pattern and orientation to suit the particular installation. The connectors may be of one type or of several types and in the present instance the tube sockets receive a plurality of contact connectors and a single center shield connector.

In the assembly of the connectors with the insulator body it is ordinarily necessary to first clean out the connector-receiving apertures in the body by removing any webs, ridges, or the like of insulating material which oft times are left after the socket bodies are molded. Next, it is necessary that the various types of connectors be inserted and properly orientated in the proper apertures in the socket body and be permanently secured therein. Further, it is necessary that the contact receiving apertures in the connectors themselves be properly sized. Lastly, it is necessary that each finished socket body be inspected to make certain that the proper number of connectors have been inserted in the proper disposition and in the proper apertures. Heretofore, some or all of these operations have been peformed manually or by manually operated machines. Because of the number of operations and the accuracy required, labor costs have been quite high and production has been quite slow.

The machine of the present invention eliminates all of the previous difficulties encountered in handling and assembling tube sockets and the like. With this machine it is necessary only to keep the machine supplied with sufficient socket bodies and connectors, and the machine then performs all of the handling, assembling and testing operations necessary to provide finished tube sockets, accepting only perfect sockets and rejecting imperfect ones all completely automatically.

An additional object of the invention is to provide an automatic socket machine embodying improved electrical contact feeding and insertion mechanism.

Other objects, features and advantages will be apparent from the following detailed description taken in conjunction with the accompanying drawings, in which:

FIGURE 34 is a front elevational view of the insulator broaching mechanism of the socket machine of the present invention, with some parts shown in section;

Figures 106, 107:
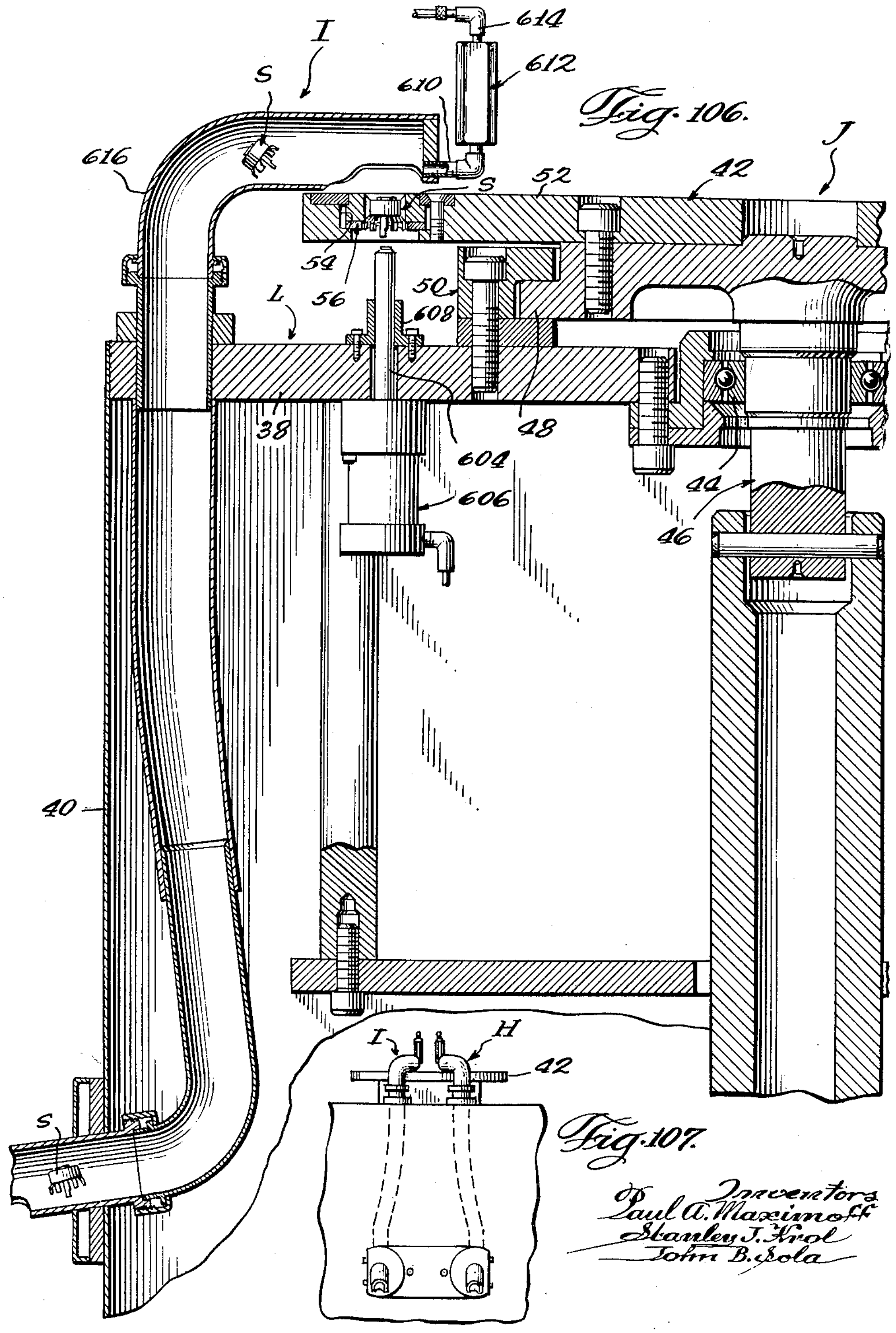

FIGURE 106 is an enlarged sectional view through the finished part acceptance mechanism of the socket machine of the present invention, and also illustrating the turntable portion of the transfer mechanism, and FIGURE 107 is a reduced size elevational view of the portion of the socket machine showing the relationship between the finished part acceptance mechanism and the defective part rejection mechanism.

The electrical socket machine of the present invention provides complete automation in the handling, assembly and testing of the various components of a tube socket or the like for use in electrical or electronic devices such as radios, television sets, electronic computers or the like. Such tube sockets are adapted to be disposed in the chassis of the devices and are utilized for connecting vacuum tubes, transistors or other components in the electronic circuits.

The socket machine includes a plurality of major assemblies working in timed sequence for feeding and loading the insulator bodies and the various connectors of tube sockets, for forming and sizing the various elements, for testing the elements, and for accepting finished parts and rejecting defective parts, all automatically. Once the socket machine has begun operation it delivers a finished socket approximately every two seconds.

For convenience in considering the machine the major portions herein illustrated are generally designated by the reference characters set forth in the following outline, and are primarily illustrated in the drawing figures set forth:

| Reference Character | Assembly | Drawing Figure |
|---|---|---|
| None | Socket machine in general | 1, 2 |
| s | Socket and parts | 3–6 |
| A | Insulator feeding and loading | 7–33 |
| B | Insulator broaching | 34–42 |
| C | Contact feeding and insertion | 43–67 |
| D | Contact testing | 68–72 |
| E | Contact forming | 73–80 |
| F | Center shield feeding and insertion | 81–96 |
| G | Final inspection and contact sizing | 97–105 |
| H | Defective part rejection | 106–107 |
| I | Finished part acceptance | 106–107 |
| J | Transfer mechanism | 1, 2 and 106 |
| K | Control apparatus | 1, 2 |
| L | Stationary frame | 1, 2, 106 |

*Tube sockets and parts*

Figures 2, 3, 4, 5, 6:
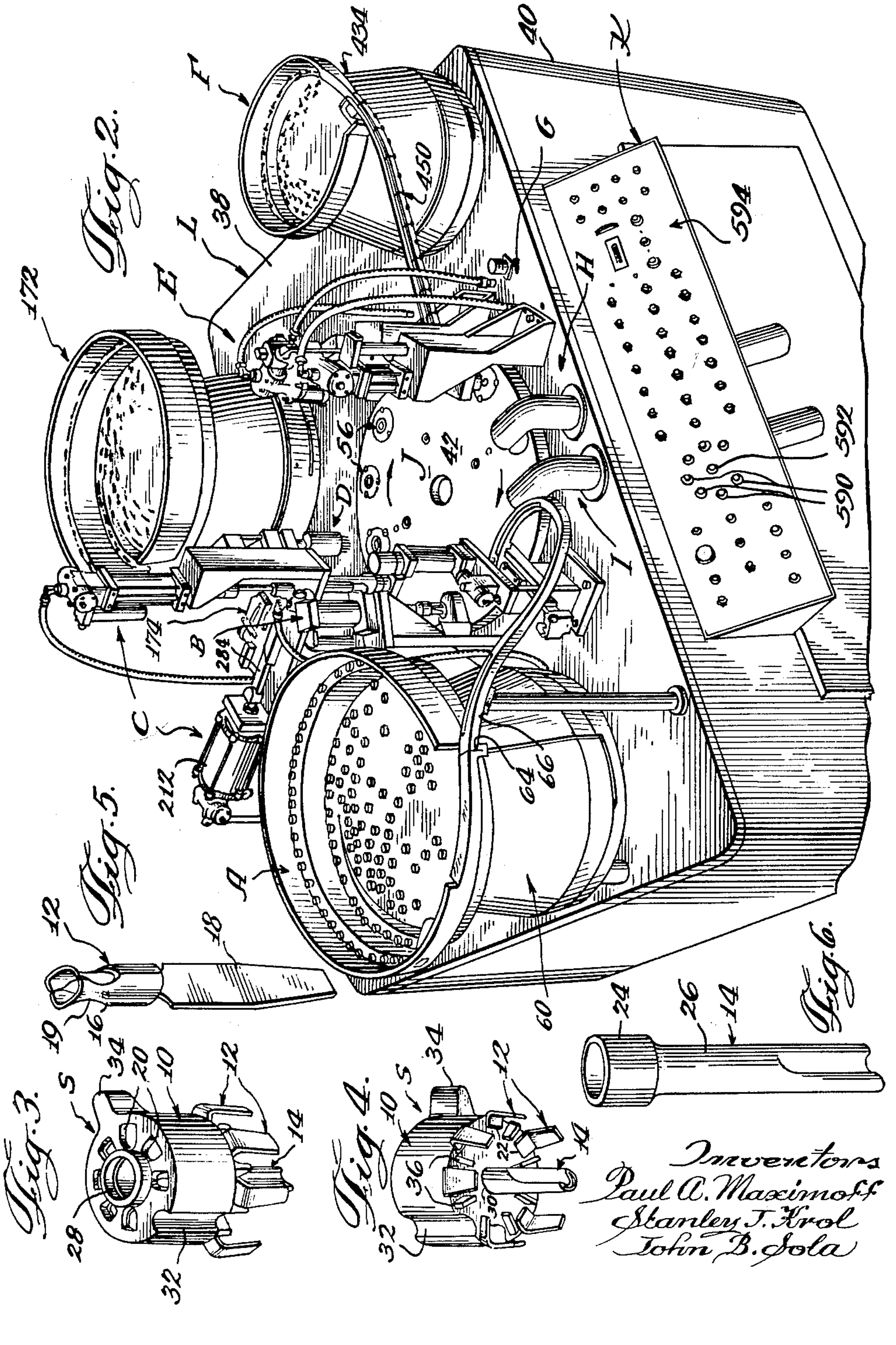
FIGURE 2 is a perspective view of the automatic socket machine shown in FIGURE 1.
FIGURE 3 is a top perspective view of a typical finished electronic tube socket which has been assembled by the machine of the present invention.
FIGURE 4 is a bottom perspective view of the finished tube socket of FIGURE 3.
FIGURE 5 is an enlarged perspective view of one of the contact connectors of the tube socket of FIGURES 3 and 4 before the connector has been inserted and formed.
FIGURE 6 is an enlarged perspective view of the center shield connector of the tube socket of FIGURES 3 and 4 before insertion in the socket body.
Figure 7:
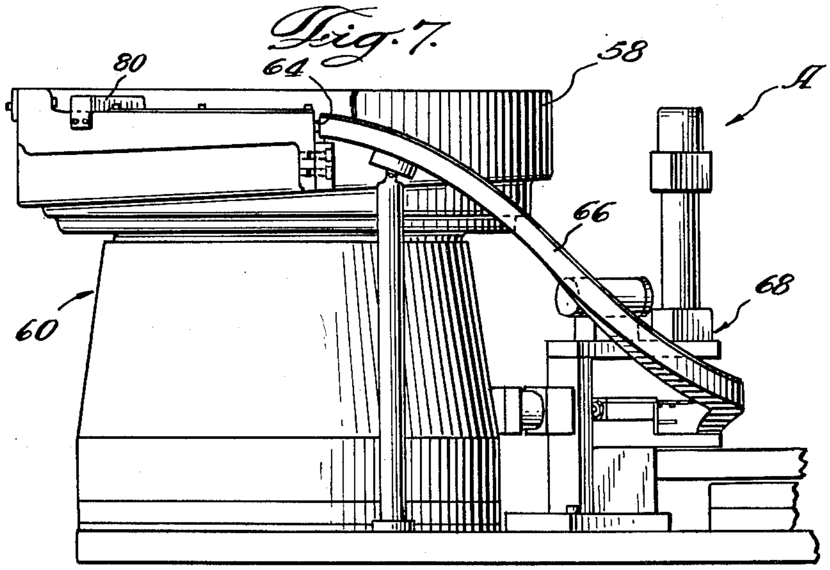
FIGURE 7 is a front elevational view of the insulator body feeding and loading mechanism of the socket machine of the present invention.

The particular embodiment of socket machine according to the present invention is constructed and arranged to assembled electronic tube sockets *"s"* as illustrated in FIGURES 3 and 4. Each of the tube sockets *"s"* comprises an insulator body or mold 10, formed of any suitable electrical insulating material, having a plurality of electrical connectors secured thereto in a predetermined spaced relation. These connectors include, in the present instance, seven metallic contacts 12 arranged around the periphery of the socket body and a metallic center shield 14 disposed in the center of the socket body.

The contacts 12 each comprise a head portion 16 and an integrally connected slot tail portion 18. The head portions 16 are generally of D-shaped cross section and are adapted to fit in mating apertures 20 formed in the socket body 10 (see also FIGURES 36 and 37). The apertures 20 have narrow rectangular openings 22 (see also FIGURES 36 and 39) formed through the bottom face of the socket body, of a proper size for snugly receiving the blade portions 18 of the contacts. After the contacts have been inserted in the respective apertures in the socket body, they are joggled substantially as shown in FIGURES 3 and 4 to fixedly secure them in the socket body and to properly locate the free end portions, on the tails, for securing to various electrical leads (not shown) connected in an electronic circuit.

The center shields 14 are generally tubular in configuration and each has an enlarged head portion 24 and an elongated tail portion 26. The head portion 24 is adapted to fit snugly in a mating center aperture 28 formed in the socket body with the tail portion 26 extending in closely fitting relation through a reduced diameter aperture portion 30 (see also FIGURES 36 and 39) through the bottom of the socket body.

Each of the contacts 12 has a reduced diameter neck 19 (see also FIGURES 104 and 105) formed in the head portion for receiving a mating connector (not shown) such as the prong of a vacuum tube, which is inserted into the open end of the head portion.

The socket body 10 is of generally cylindrical configuration as shown and is provided with a vertical locating groove 32 on one side and a radially extending tab or locating lug 34 on the other side. In addition, spacing lugs or feet 36 extend from the bottom surface of the socket body in equally spaced relation between the respective apertures 22.

The finished sockets *"s"* with attached and formed connectors 12 and 14 are intended for insertion in mating receiving structure in suitable electronic apparatus (not shown). Circuit leads (not shown) are secured to the tail portions of the contacts 12, and an electronic tube or the like has its connector prongs (not shown) inserted into the open ends of the head portions 16 and are frictionally retained therein by means of the reduced diameter necks 19 to complete the electronic circuit. If desired, a radiation shield (not shown) may surround the electronic tube and may be connected to the center shield 14 in any suitable manner. The center shield, in turn, is grounded in order to eliminate extraneous radiation from the electronic tube.

*General arrangement of socket machine*

The socket machine of the present invention provides complete automation in the assembling, testing accepting of finished tube sockets "*s*." For accomplishing this purpose the socket machine includes, in general, a plurality of operating stations comprising the insulator feeding and loading mechanism A, the insulator broaching mechanism B, the contact feeding and insertion mechanism C, the contact testing mechanism D, the contact forming mechanism E, the center shield feeding and insertion mechanism F, the final inspection and contact sizing mechanism G, the defective part rejection mechanism H, and the finished part acceptance mechanism I. The insulator bodies 10 are carried between the various operative stations by the transfer mechanism J, and all of the mechanisms A through J are mounted on the stationary frame L. The operations of the various mechanisms are controlled and coordinated by the control apparatus K. Only the control panel and incidental portions of the control apparatus are shown, but any suitable type of electrical or electronic controls can be utilized which will suitably automatically control and coordinate the entire operation of the machine in a manner to be described.

Figure 1:
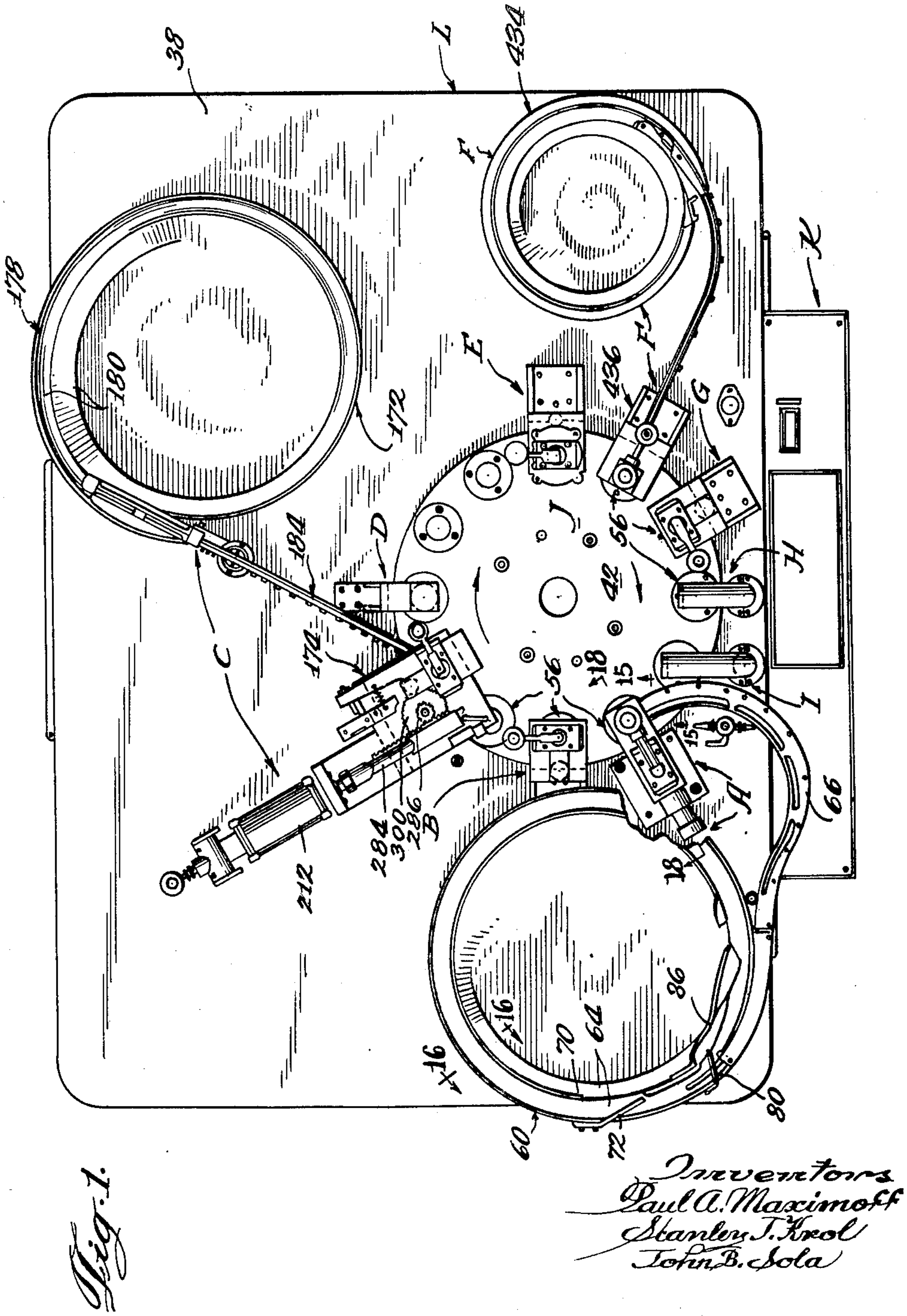
FIGURE 1 is a top plan view of an automatic socket machine according to the present invention, showing the general arrangement of the various operating stations of the machine.

The stationary frame L includes a horizontal metallic base plate 38 which is supported on any suitable support structure (not shown) which, in turn, is covered by an apron 40. All of the operating mechanisms A through I, and the transfer mechanism J, are located and supported on the base plate 38, as best shown in FIGURES 1 and 2.

The transfer mechanism J includes a heavy aluminum turntable assembly 42 (FIGURES 1, 2 and 106) which is horizontally rotatably supported by means of antifriction bearing 44 having its inner race secured about a pedestal portion 46 of the turntable assembly. The pedestal portion 46 has an outer peripheral flange 48 which is slidably supported by means of a guide-way assembly 50 which is fixedly secured to the base plate 38. The turntable assembly 42 is adapted for being intermittently driven by suitable drive mechanism (not shown), the operation of which is suitably coordinated and controlled through the control apparatus K.

The turntable assembly 42 includes a circular face plate 52 which is centrally located and fixedly secured to the central pedestal 46, and the face plate 52 is provided with a plurality of equally spaced apertures 54 formed about the outer peripheral portion of the face plate. A socket nest assembly 56 is secured in each of the apertures 54, and each of the nest assemblies 56 is adapted to receive and hold one socket body 10 in a predetermined manner to be described. The operation of the transfer mechanism J is controlled by the control apparatus K in such a manner that the socket nests 56 are intermittently and successively shifted from station to station where the various operations are performed to provide finished socket assemblies *s*.

In general, a plurality of insulator bodies are supplied to the insulator feeding and loading mechanism A and this mechanism successively dispenses properly orientated insulators to the socket nests 56, of the transfer mechanism as these nests are successively moved past the mechanism A. At the next operative station the insulator broaching mechanism B broaches the contact apertures 22 and the center shield aperture 30 to remove any burrs or webs of insulator material which might be left during fabrication of the insulator bodies.

Next, the broached insulator body moves to the contact feeding and insertion mechanism C which has been supplied with a plurality of contacts 12. This mechanism automatically dispenses and properly orientates the required number of contacts for one socket body and inserts these contacts in the insulator body. The socket body with inserted contacts is then moved to the contact testing mechanism D where a series circuit is formed through all of the contacts, so that if one contact is missing or improperly positioned, the operation of the entire machine is stopped until the defective part is removed. If the part is acceptable, it then moves on to the contact forming mechanism E where the contacts are given the final joggled form shown in FIGURES 3 and 4.

The socket body with formed contacts is then moved to the center shield feeding and insertion mechanism F which dispenses and inserts a single center shield into each socket body from the plurality of shields which are supplied to the mechanism. The socket assembly then moves to the final inspection and contact sizing mechanism G where a separate circuit is made through each of the connectors, including the contacts and the center shield, to insure that they are properly in place. At the same time the neck apertures in the contacts 12 are properly sized.

The finished socket assembly then passes to the defective part rejection mechanism H where it is removed from the transfer mechanism and rejected if it has been found to be defective at the final inspection station G. If the part is acceptable, however, the defective part rejection mechanism H is not actuated and the finished part then passes to the finished part acceptance mechanism I where it is removed from the contact nest and conveyed to a finished part container (not shown).

It will be understood that each of the mechanisms A through I operates after each intermittent movement of the turntable 42, except for the defective part rejection mechanism H which operates only when a defective part is detected. In this manner a steady stream of finished socket assemblies S is received and accepted at the mechanism I. Thus, a finished part is received on each cycle of the transfer mechanism, except for defective parts which are automatically rejected.

The operating mechanism A through I at the nine operating stations will now be described in detail.

*Insulator feeding and loading mechanism*

The insulator body handling mechanism A dispenses properly orientated socket bodies 10 and places these bodies in the socket nests 56 of the transfer mechanism J as they are successively placed in position at the insulator loading station. The mechanism A is illustrated in detail in FIGURES 7–33 of the drawings.

For feeding insulator socket bodies 10 a multitude of the bodies are supplied to an upper bowl or dish portion 58 of a vibrator feeding mechanism or vibrator swirl feeder 60. The vibrator swirl 60 is of a type manufactured by Martin Engineering Company of Franklin Park, Illinois and provides fairly high frequency vibration of the bowl 58 in such a manner that insulator bodies contained in the bowl are slowly "swirled" in a counterclockwise direction looking from the top as in FIGURES 1 and 8. However, the bowl 58 itself is of a special construction according to the present invention.

The bowl 58 is open topped and of generally circular plan as best seen in FIGURES 1 and 2. About its outer periphery, inside the bowl, a spiral ramp or ledge 62 is formed and the ledge makes about one and one half turns about the periphery of the bowl, gradually climbing in a counterclockwise direction from the bottom of the bowl up to the bowl exit 64. Here it connects with an insulator chute 66 which leads to an insulator loading portion 68 of the mechanism A.

Insulator bodies 10 are vibrated by the vibrator swirl 60 so that they travel or "crawl" up the ramp ledge 62 around the periphery of the bowl 58 until they are fed into the insulator chute 66 where they are delivered to the insulator loading mechanism 68, which successively orientates and loads a single insulator in each of the successive socket nests 56.

Figure 16:
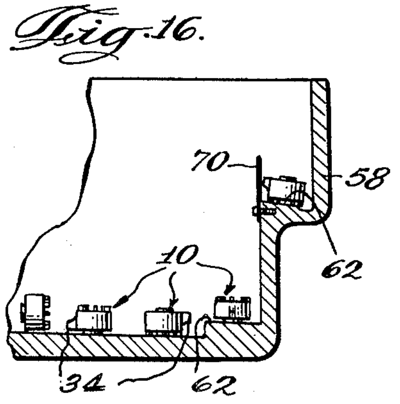
FIGURE 16 is an enlarged fragmentary sectional view taken along line 16—16 of FIGURE 1.
Figure 12:
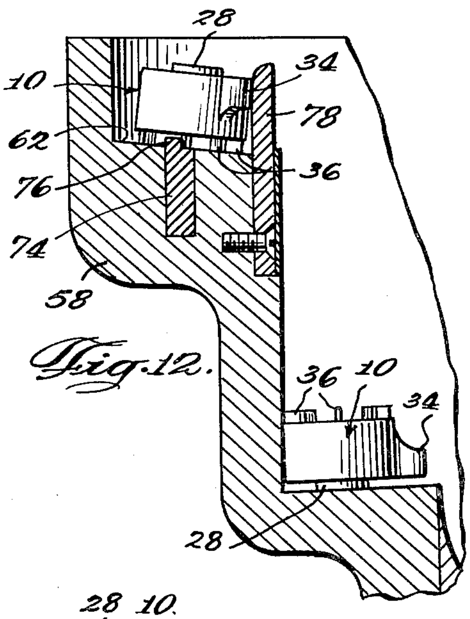
FIGURE 12 is an enlarged fragmentary sectional view taken along line 12—12 of FIGURE 8.

FIGURE 16 (a sectional view taken along line 16—16 of FIGURE 1) illustrates the progress of the insulator bodies as they crawl up the ramp 62 and shows a plurality of insulator bodies, some of which are lying in the bottom of the bowl, one of which is shown on the initial lower portion of the ramp and another of which is shown on a higher portion of the ramp after it has made a complete circuit. It will be noted that the socket bodies shown in FIGURE 16 may be in any position, flat with the feet 36 either up or down, or they may be lying on their sides. Until the socket bodies reach a ramp position beyond the upper position shown in FIGURE 16, they may travel in any of these positions. The socket bodies closely follow one another up the ramp, either in contact with adjacent socket bodies or close thereto, so that a continuous string of socket bodies moves up the ramp as long as the bowl is vibrated and is supplied with socket bodies.

It will be noted that at the positions shown in FIGURE 16 the ramp 62 is canted slightly toward the periphery of the bowl in order to induce the socket bodies to stay on the ramp. In addition, a fence 70 is provided along the upper position of the ramp to further insure that the socket bodies which have travelled this far stay on the ramp.

Figures 8, 9, 10, 11:
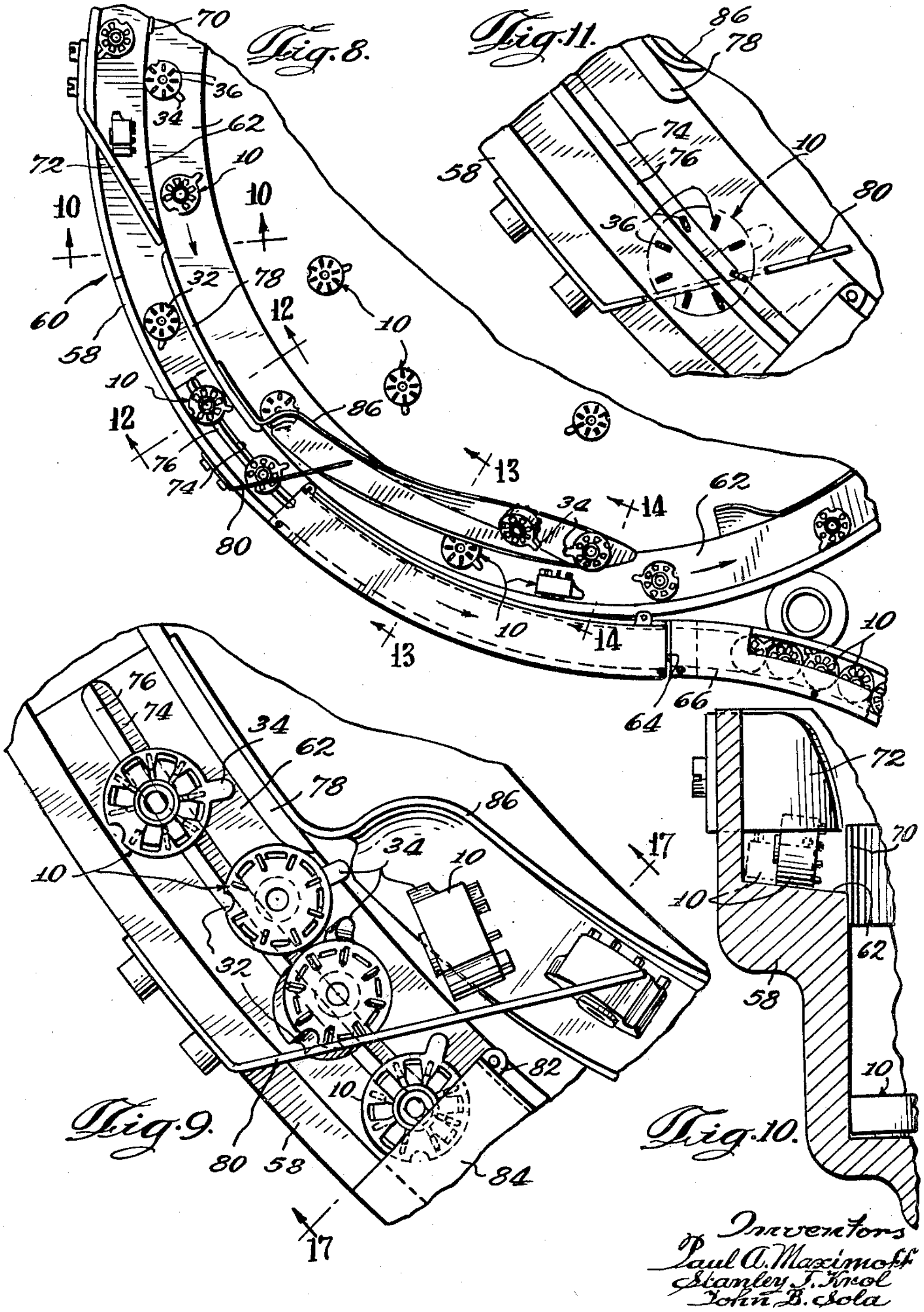
FIGURE 8 is a fragmentary, enlarged top elevational view of a portion of the insulator feeding mechanism.
FIGURE 9 is a fragmentary, further enlarged elevational view of a portion of the insulator feeding mechanism shown in FIGURE 8.
FIGURE 10 is an enlarged fragmentary sectional view taken along line 10—10 of FIGURE 8.
FIGURE 11 is a fragmentary view of a portion of the insulator body feeding mechanism of FIGURE 9 illustrating an insulator body being properly fed.

Shortly after the socket bodies reach the upper position shown in FIGURE 16, they come to the first orientating station, which is best shown in FIGURES 8 and 10. At this location the fence 70 ends and the upper portion of the ramp 62 is now canted slightly toward the inside of the bowl. A wiper arm 72 is secured to the bowl and has an arm portion extending in slanted relation across the upper ledge. As shown in FIGURE 10 the wiper arm 72 is spaced above the ledge 62 sufficiently that socket bodies 10 which are lying flat will pass under the ledge, but socket bodies which are standing on their sides will be wiped off and will drop either to the portion of the ledge below or back into the bottom of the bowl. Thus, the only socket bodies which pass the wiper arm 72 are lying flat.

The next orientating station occurs shortly thereafter at a position best illustrated in FIGURES 8, 9, 11, 12 and 17. At this position the ledge 62 is depressed an amount which is slightly less than the length of the feet 36 on the socket bodies, and a bar member 74 is secured generally longitudinally along substantially the center of the ledge with a ridge portion 76 extending above the depressed floor of the ledge at this section. At this point socket body feet which are extending down ride along the surface of the ledge 62 with some of the feet on one side of the ridge 76 and others on the other side. Here, a second fence 78 is secured along the inner edge of the ledge so that socket bodies are prevented from falling back into the bowl regardless whether their feet are up or down. However, shortly after the upper position shown in FIGURE 12, the fence 78 ends and socket bodies which have their feet up can slide off of the ledge (see FIGURES 9 and 17). Socket bodies which have their feet down are retained on the ledge by engagement of the feet with the ridge 76 (see FIGURES 11 and 12).

Shortly after the fence 78 ends, a second wiper arm 80 is fixedly secured to the bowl and has a finger extending in slanted relation across the ledge. The finger 80 is so spaced from the ledge 62 that socket bodies with their feet down can pass under the arm, but any socket bodies with their feet up which have not tumbled off of the ledge are held up high enough by the ridge 76 to cause the feet to engage the wiper arm 80, forcing these socket bodies off the ledge (see FIGURE 17).

Socket bodies with their feet down which pass under the wiper arm 80 move on to a further portion of the ledge which is formed with a guard rail 82 (FIGURE 13) along the inner edge of the ledge which now prevents the socket bodies from falling off the ledge, so that the bar member 74 ends at this position. In addition, a partial cover 84 is formed over this latter section of the ledge to further insure that the socket bodies stay thereon. The socket bodies which have reached this portion of the ledge must be lying flat with their feet down, and they continue in this manner to the bowl exit 64 where they are delivered to the chute 66.

Figures 17, 33:
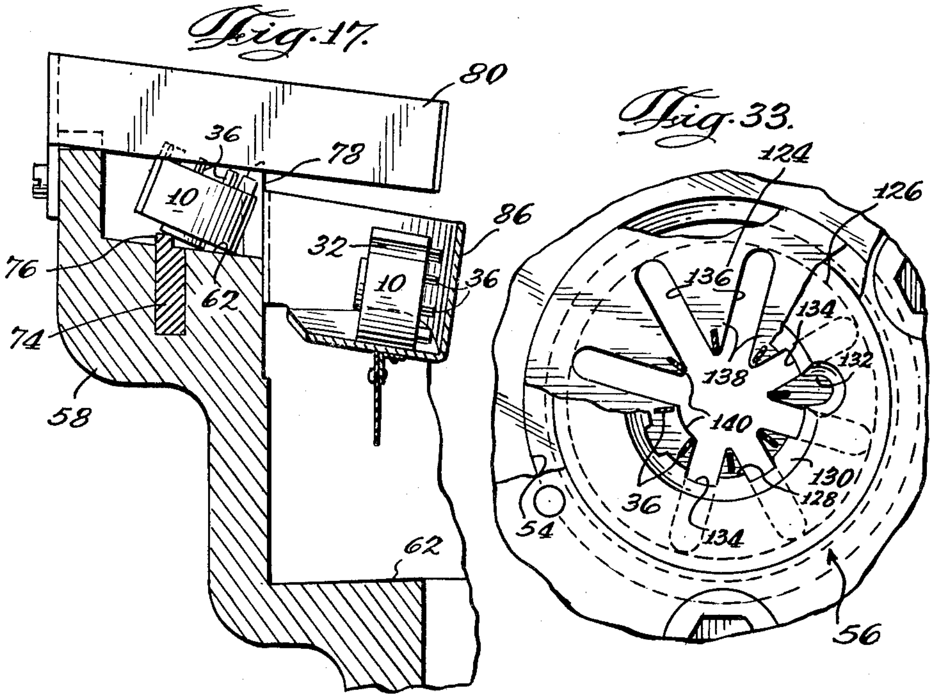
FIGURE 17 is a fragmentary sectional view taken along line 17—17 of FIGURE 9.
FIGURE 33 is an enlarged fragmentary sectional view similar to FIGURE 24 but with parts broken away to illustrate proper location of an insulator body in the transfer mechanism.
Figure 32:
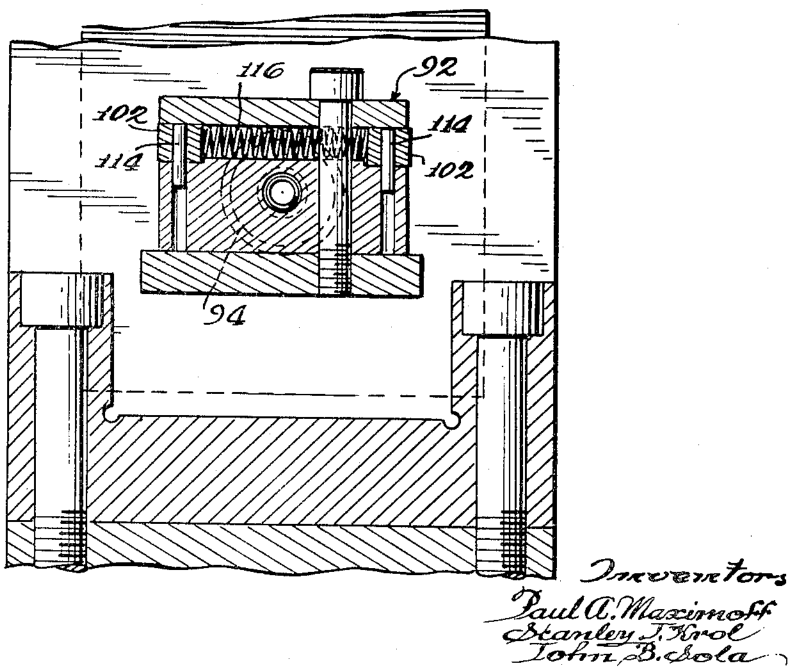
FIGURE 32 is an enlarged fragmentary sectional view taken along line 32—32 of FIGURE 26.

Socket bodies which fall off the ledge 62 adjacent to or by reason of engagement with the wiper arm 80 are flipped over by means of a twisted track 86, as shown in FIGURES 8, 9, 13, 14 and 17. As the improperly placed socket bodies slip off the ledge 62 they ordinarily fall onto the twisted track on their sides as shown in FIGURES 9 and 17. The track is then twisted to rotate the socket bodies clockwise, looking from the front, so that they follow the sequence of positions from that shown in FIGURE 17, to that shown in FIGURE 13, to that shown in FIGURE 14, at which time that are lying flat with their feet down. Shortly after the FIGURE 14 location, it will be seen from FIGURE 8 that the properly positioned socket bodies are deposited on the lower ledge 62 so that they can crawl all the way around the bowl again, this time with their feet down so that they will eventually find their way to the insulator track 66.

It will be understood that the orientating stations are not infallible in that some insulator bodies which are properly positioned might still fall off the ledge 62 but they are constructed so that no socket bodies which are improperly orientated can pass the wiper arms 72 and 80. However, the arrangement is such that many more socket bodies will be properly orientated than can be used during operation of the machine, so that when the ledge is full in the region of the wiper arm 80, the excess socket bodies will tumble over one another and back into the bowl. Thus, the loading portion 68 of the mechanism is always supplied with sufficient socket bodies and the socket bodies will not jam at the orientating stations.

Figures 18, 19, 20, 21:
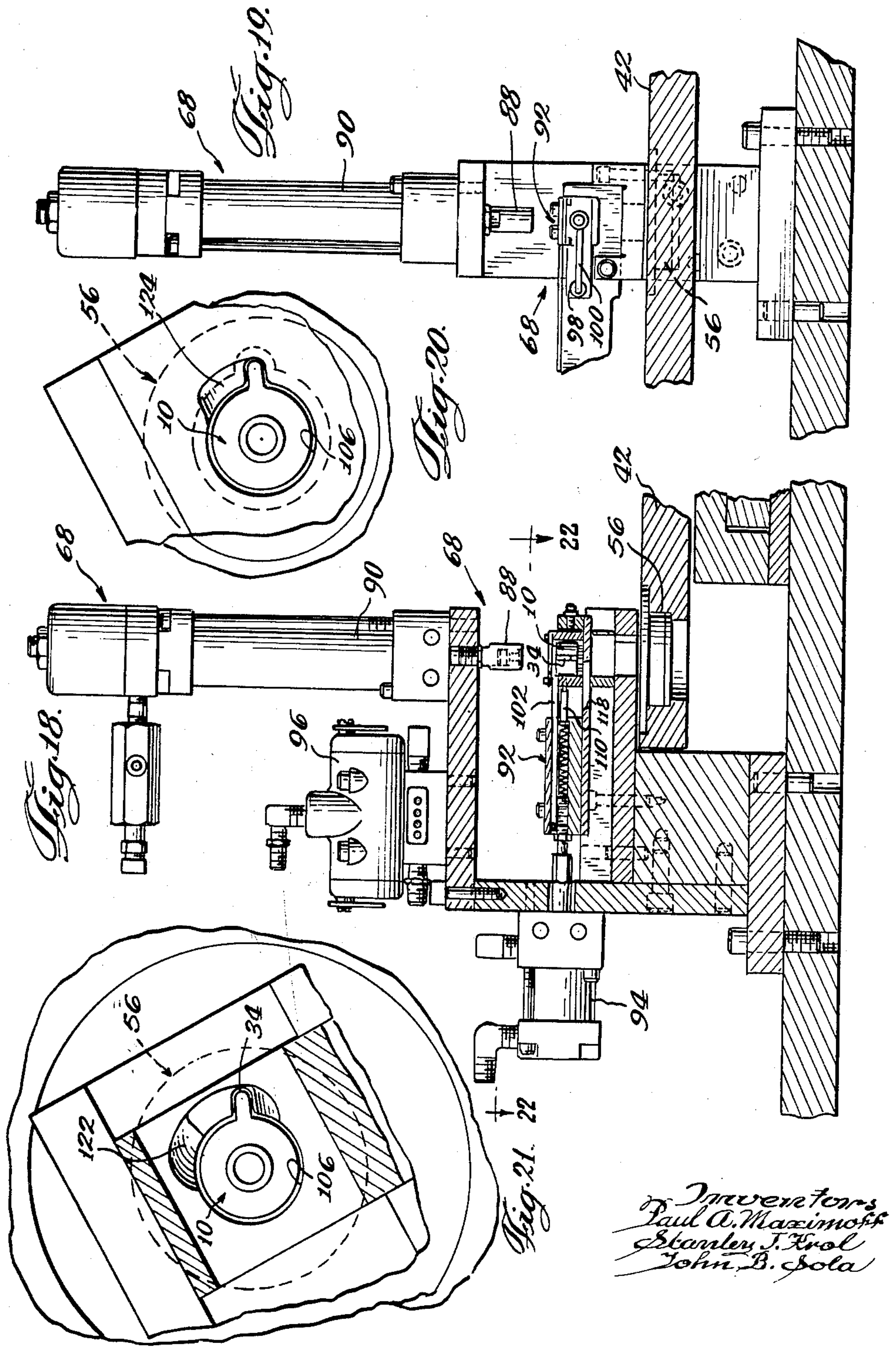
FIGURE 18 is an enlarged fragmentary sectional view of the insulator body loading mechanism portion taken along line 18—18 of FIGURE 1; with some parts shown in elevation.
FIGURE 19 is a fragmentary front sectional view of the insulator body loading mechanism of FIGURE 18, with some parts shown in elevation.
FIGURE 20 is a fragmentary sectional view taken along line 20—20 of FIGURE 30.
FIGURE 21 is a fragmentary sectional view taken along line 21—21 of FIGURE 30.

Referring now to FIGURES 18 and 19, the insulator body loading portion of the insulator feeding and loading mechanism A includes, in general, an insulator socket ram 88 actuated by an air cylinder 90, a slide assembly 92 actuated by an air cylinder 94, and a control valve 96 which co-ordinates the actuation of the two air cylinders.

Figure 22:
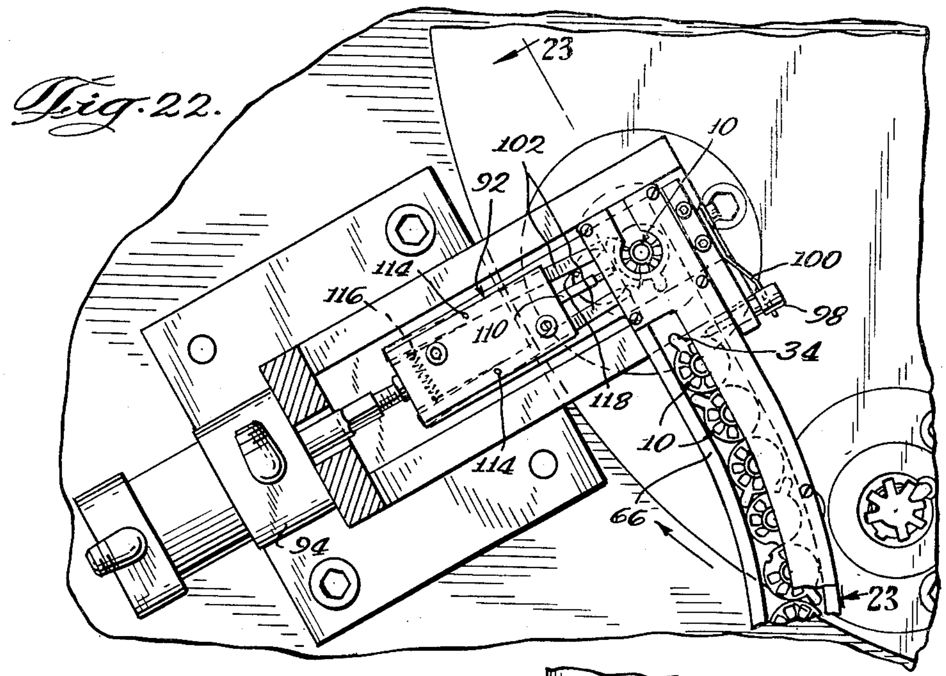
FIGURE 22 is an enlarged fragmentary sectional view taken along line 22—22 of FIGURE 18 and showing some parts in elevation.
Figures 23, 24:
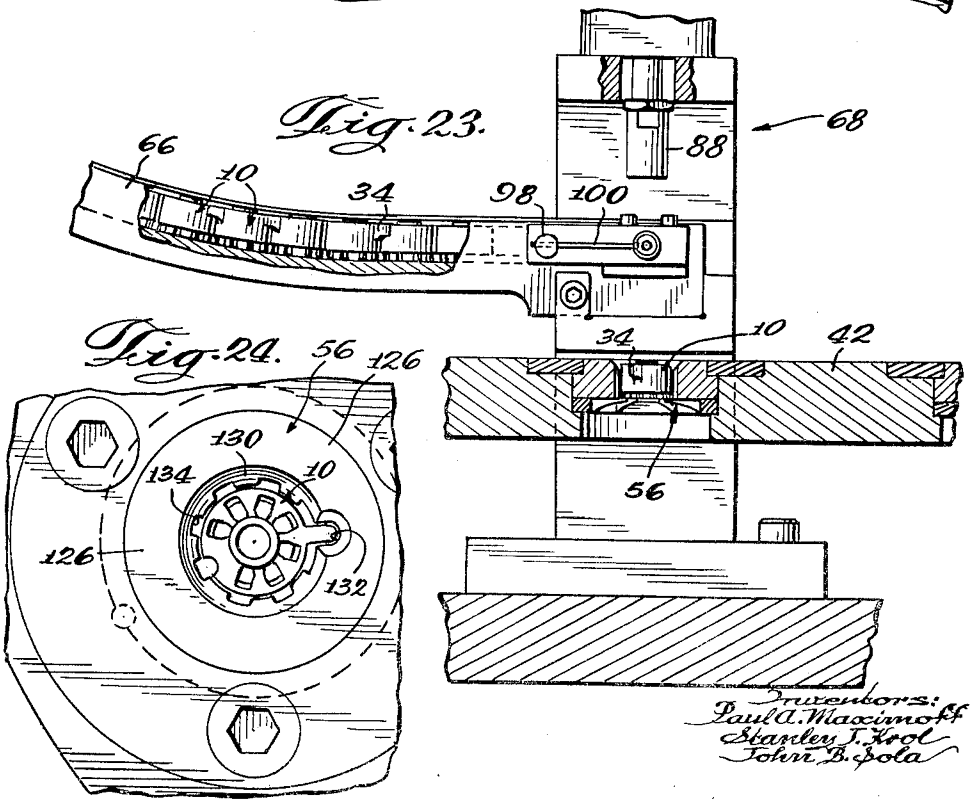
FIGURE 23 is a fragmentary sectional view taken along line 23—23 of FIGURE 22 with some parts broken away and with some parts shown in elevation.
FIGURE 24 is a fragmentary sectional view taken along line 24—24 of FIGURE 30.
Figures 27, 28, 29, 30, 31:
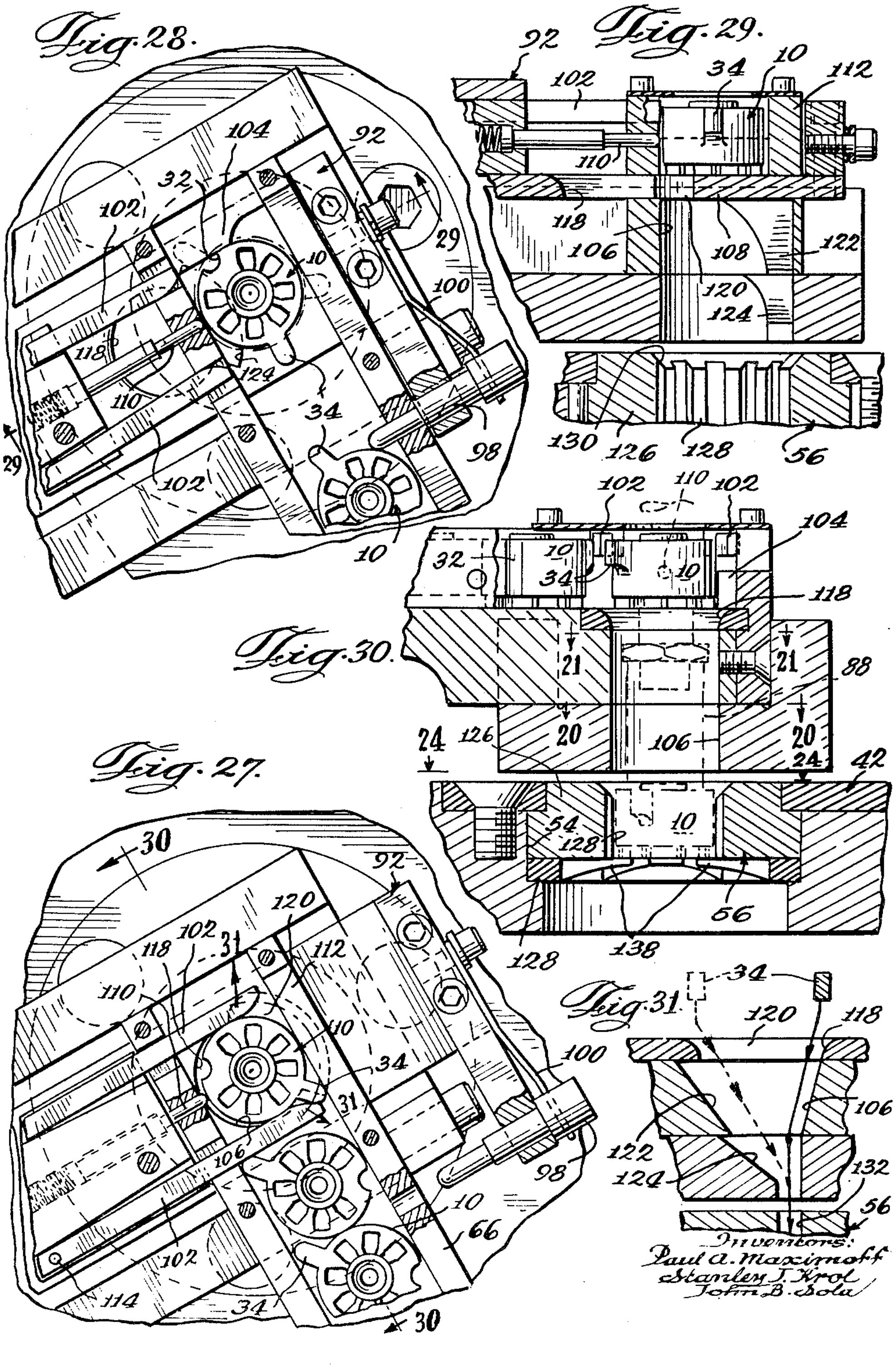
FIGURE 27 is an enlarged fragmentary view of a portion of the insulator body loading mechanism shown in FIGURE 22, showing the mechanism in the actuated position.
FIGURE 28 is a fragmentary view similar to FIGURE 27 but showing the mechanism in the unactuated position.
FIGURE 29 is a fragmentary sectional view taken line 29—29 of FIGURE 28.
FIGURE 30 is a fragmentary sectional view taken along line 30—30 of FIGURE 27.
FIGURE 31 is a fragmentary diagrammatic sectional view, related to FIGURE 30, explaining the mechanism for proper orientation of the insulator bodies during loading in the transfer mechanism.
Figures 34A, 35:
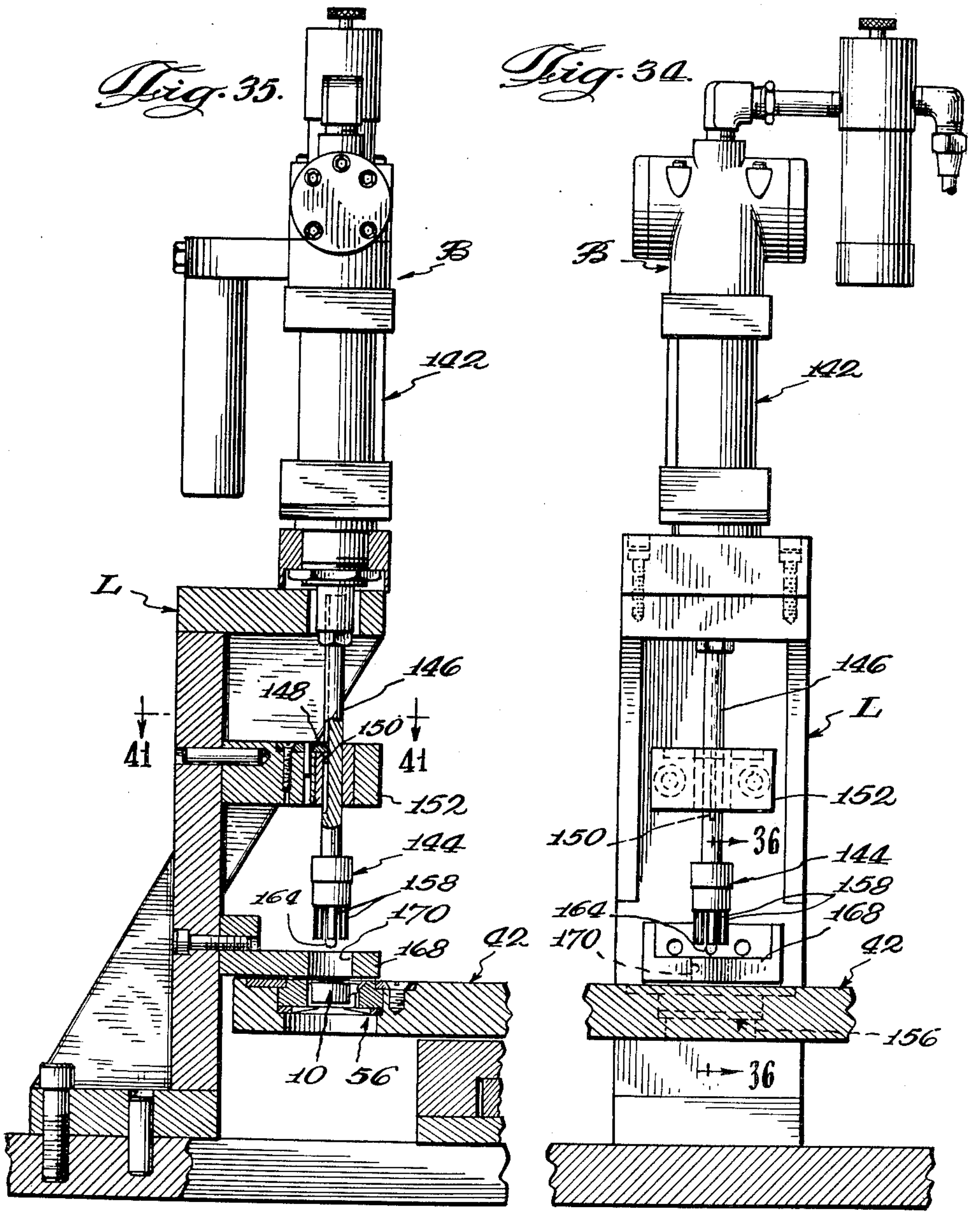
FIGURE 35 is a side elevational view of the insulator broaching mechanism of FIGURE 34, with additional parts shown in section.

The socket bodies which are fed down the insulator chute 66 travel to a position shown in FIGURES 22 and 28 when further movement is arrested by means of a stop finger 98 which has its free end extending into the insulator chute. The stop finger which is carried by a spring member 100, which, in turn, is secured to the slide assembly 92.

When the slide assembly moves forward as seen in FIGURE 27, the end of the stop finger 98 is moved out of the insulator chute 66 to permit a socket body to pass by. At the same time a pair of orientating fingers 102, which are carried by the slide assembly 92, are moved forward so that the socket body which passes the stop finger 98 can move only about the width of one socket body until it is prevented from further movement by the first of the orientating fingers 102.

When the slide is moved back again, the orientating fingers are moved out of the way as seen in FIGURES 22 and 28 and the socket which has passed the stop fingers 98 moves into a position directly ahead of the fingers 102 against a stop ledge 104, as seen in FIGURES 28 and 30. In this position the socket body would be free to fall into a vertical orientating passage 106 were it not for the presence of a holding ledge 108 formed on the slide assembly 92 (FIGURE 29) on which the socket body momentarily rests.

On the next stroke of the slide 92 the orientating fingers 102 pass on each side of the socket body and if the locating tab 34 is not directed generally forwardly, then the orientating fingers move the tab to a forwardly directed position as illustrated in the sequence from FIGURE 28 to FIGURE 27. Also, as the slide assembly 92 is moved forward, a spring pressed holding finger 110 (FIGURES 26, 27–29) is moved forward along with the slide and resiliently holds the socket body against a stationary structural member 112.

Figures 25, 26:
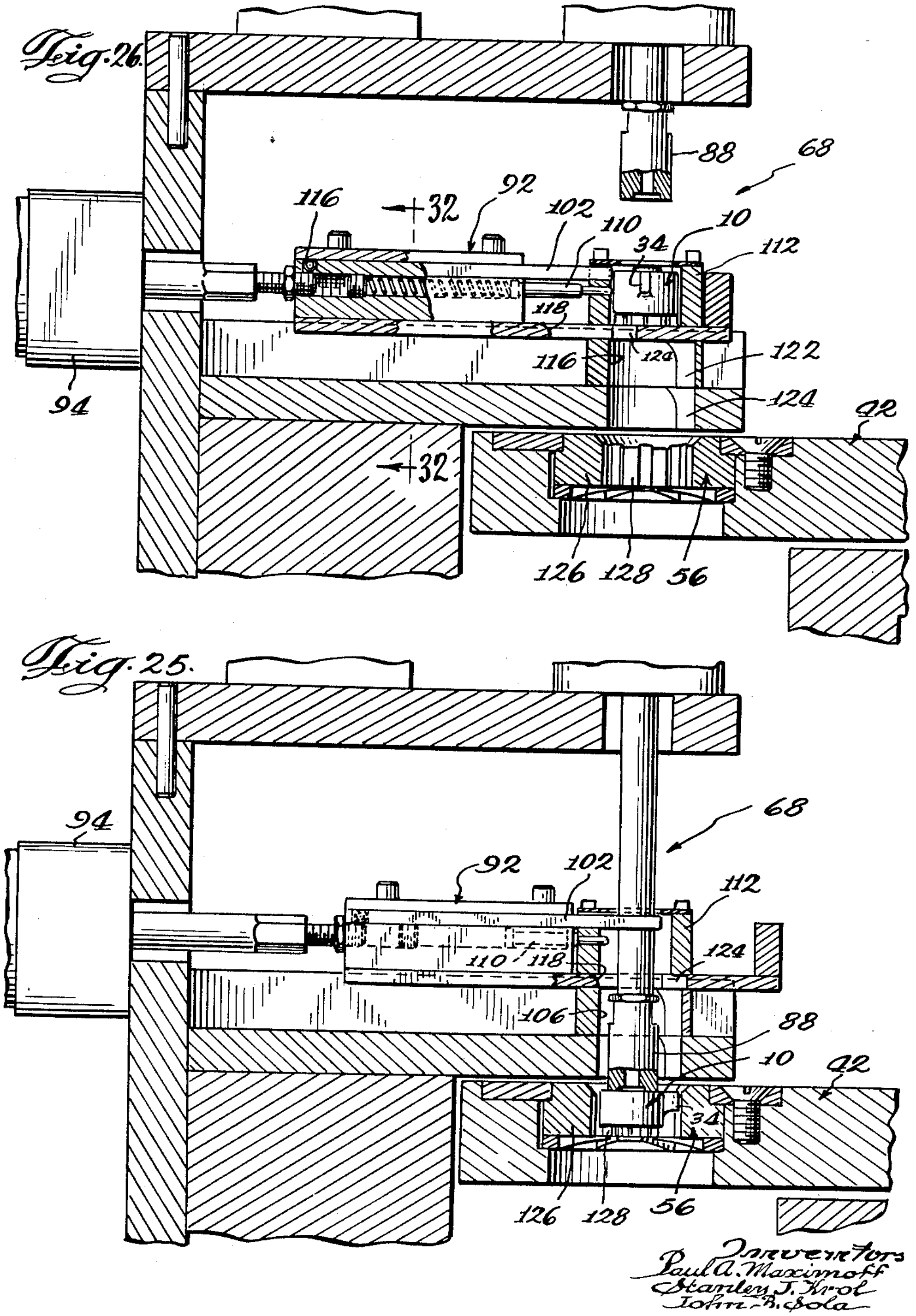
FIGURE 25 is a fragmentary sectional view of a portion of the insulator body loading mechanism of FIGURE 18, showing the mechanism in the fully actuated condition.
FIGURE 26 is a fragmentary sectional view similar to FIGURE 25 but showing the mechanism in the unactuated position.

The orientating fingers 102 are pivotally secured to the slide assembly by means of intermediate pins 114 (FIGURES 22, 27 and 32), so that a compression spring member 116 which acts between the rearward ends of the orientating fingers causes the forward end to be resiliently moved inwardly to grip the opposite sides of the socket body, as shown in FIGURE 27. This frictional gripping action, plus the frictional gripping action of the holding pin 110, prevents the socket body from dropping into the orientating passage 106 even though the stop ledge 108 is moved out of the way when the slide assembly 92 is moved forward. After this has taken place, the socket body is positioned over an orientating slot 118 formed through the slide assembly. With the slide and the socket body in this position, the ram 88 is actuated, moving downwardly to engage the socket body and to carry it downwardly into the orientating slot 118, through the orientating passage 106, into position in the socket nest 56 of the turntable 42 (as shown in FIGURE 25).

As the socket body is moved downwardly by the ram 88 the locating tab 34, which has been directed generally forwardly by the orientating fingers 102, engages in successive orientating grooves 120 in the slot 118, and 122 and 124 successively in the two succeeding portions of the orientating passage 106. The orientating grooves 120, 122 and 124, which are aligned as shown in FIGURE 31, provides a funnel-shape (as shown in FIGURE 31) to exactly orientate the tab 34 as the socket body 10 travels downwardly toward the socket nest. This sequence is best seen by reference to FIGURES 20, 21, 29 and 31 showing how the locating tab 34 of the socket body 10 is rotated where necessary until it reaches the proper position for entering the socket nest 56.

The construction of the nest 56 itself can be best seen from FIGURES 24, 29, 30, and 33. It comprises essentially a generally annular member 126 and a bottom support member 128.

The annular member 126 has a central aperture 128 which is of a size for receiving the socket body with a slight clearance and provided with a lead-in chamfer 130 at the top. A locating notch 132 is formed in the wall of the opening 128 and is adapted to receive the locating tab 34 of a socket body 10 in order to hold the socket body in a predetermined position for subsequent operations. The orientating means previously described, including the orientating fingers 102 and the orientating notches 120, 122 and 124, are provided for the purpose of properly orientating the tab 34 of the socket body in this locating notch 132 of the socket nest. The cavity 128 is also provided with a plurality of clearance notches 134 to accommodate the formed contacts 12 of the finished socket assembly *s* as illustrated in FIGURES 3 and 4.

The support plate 124 is formed with a plurality of radial cut-outs 136 which are formed to provide clearance for the finished contacts 12, and also to provide clearance for the means (to be described) for forming these contacts. The cut-outs 136 define triangular support fingers 138, the inner ends of which form a reduced diameter access aperture 140 through the support plate 128. The support fingers 138 are so positioned that they support the feet 36 of a socket body 10 held in the nest 56. This is best illustrated in FIGURE 33 which shows the feet (only) of a socket body resting on the support fingers. In addition, the support fingers 138 are bevelled toward their inner ends, as best seen in FIGURE 30, in order to provide clearance for the contact forming means to be described.

From the foregoing description it will be seen that the insulator feeding and loading mechanism A automatically feeds a supply of socket bodies 10 and successively loads these socket bodies in properly orientated relation in the socket nests 56. The machine operator is not required to perform any manual operation except to see that the bowl 58 is kept supplied with socket bodies.

*Insulator broaching mechanism*

The insulator broaching mechanism B is located at the next station after the insulator feeding and loading mechanism A. The purpose of the mechanism at this next station is to clean out any webs or ridges of excess material which are left in the connector receiving apertures in the socket bodies. The insulator broaching mechanism is specifically illustrated in FIGURES 34–42.

After a socket body has been loaded in one of the nests 56 of the transfer mechanism J, the transfer mechanism is cycled by the control apparatus K to shift this nest with its socket body to the next station for operation by the insulator broaching mechanism B. This mechanism comprises, in general, a pneumatic actuating cylinder 142 which is adapted for actuating a broaching ram 144. The cylinder 142 is supported on a portion of the stationary frame L as shown. The piston (not shown) of the actuating cylinder is connected to the broaching ram 144 by means of a shaft 146 and the shaft is maintained in a predetermined radial position by means of a key 148 connected to the stationary support structure and riding in a longitudinal keyway 150 in the shaft. The shaft is guided in a vertical aperture in a support member 152 which is secured to the stationary frame and which carries the key 148.

Figures 36, 37, 38, 39:
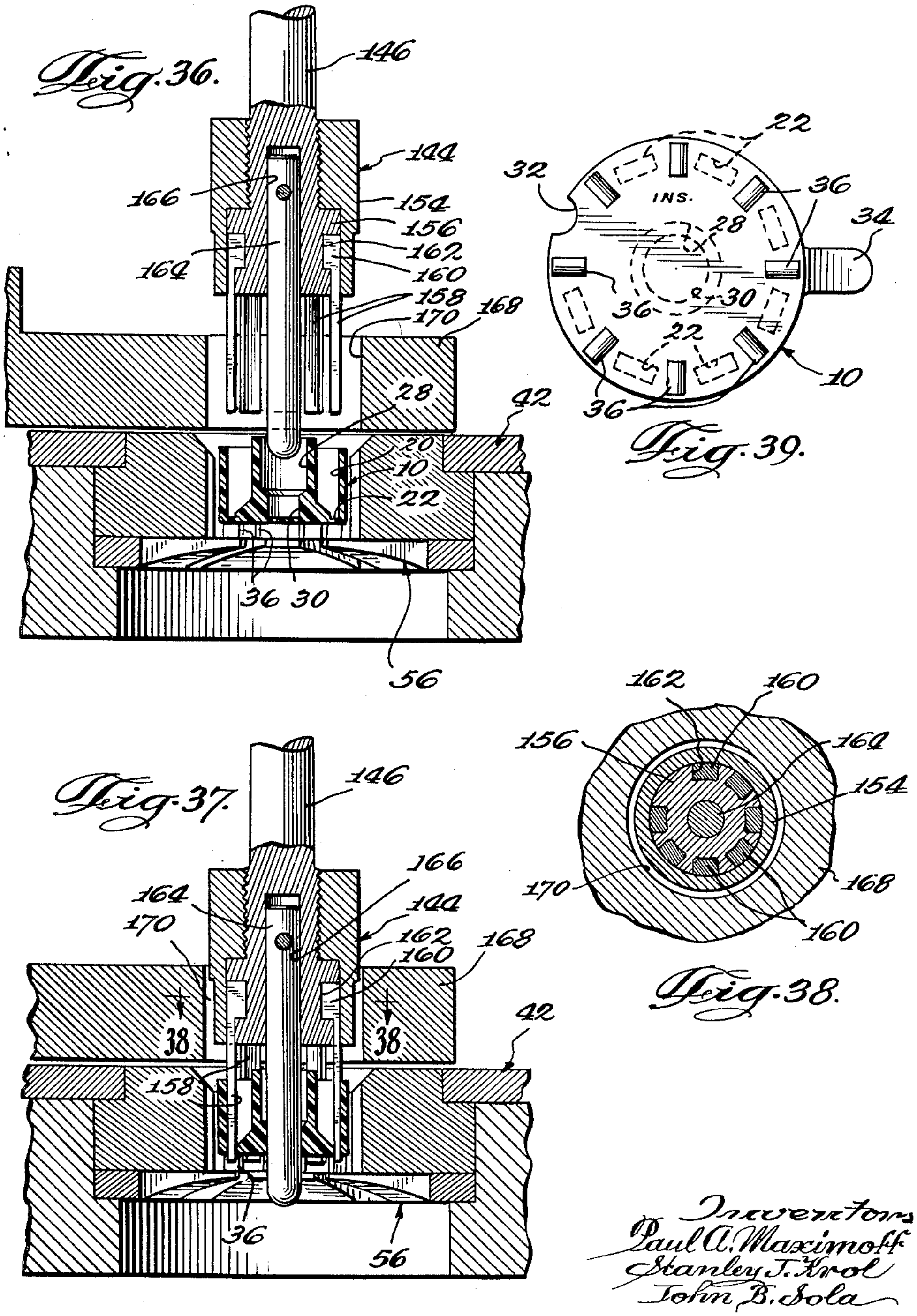
FIGURE 36 is an enlarged fragmentary sectional view taken along line 36—36 of FIGURE 34 but showing the broaching mechanism partly actuated.
FIGURE 37 is an enlarged fragmentary sectional view similar to FIGURE 36 but showing the broaching mechanism fully actuated.
FIGURE 38 is a fragmentary sectional view taken along line 38—38 of FIGURE 37.
FIGURE 39 is an enlarged bottom plan view of one of the insulator bodies before broaching illustrating how the connector apertures may be closed by web formations.
Figure 42:
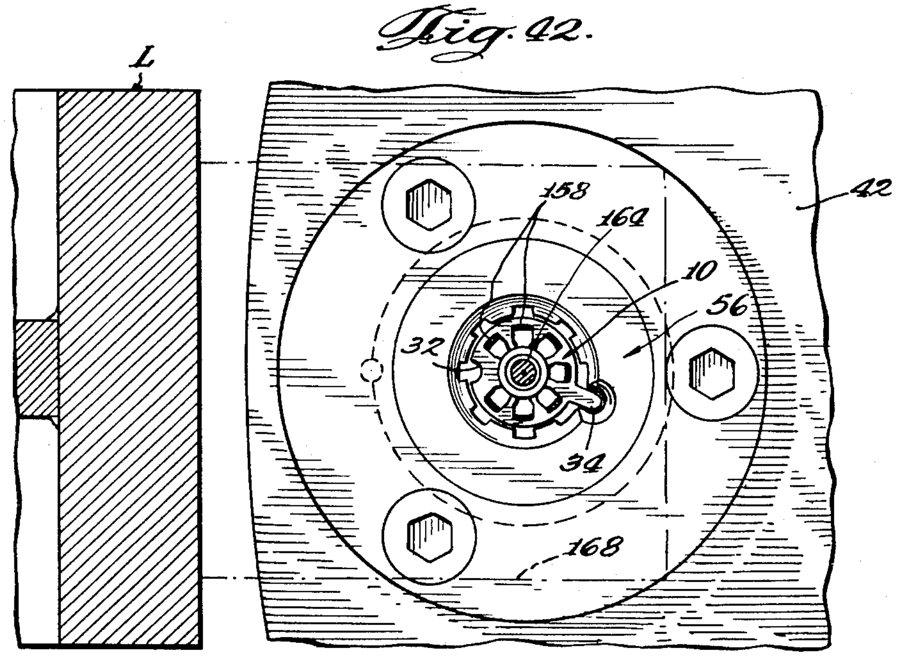
FIGURE 42 is a fragmentary sectional view taken along line 42—42 of FIGURE 40.

The broaching ram 144 is secured at the bottom end of the shaft 146. As best seen in FIGURES 36 and 37 the ram includes a body portion 154 surrounding an enlarged end portion 156 of the shaft 146 and threadedly secured to the shaft as shown. Seven contact aperture broaching punches 158 are provided with enlarged upper end portions 160 which are engaged in interfitting notches 162 formed in the shaft end portion 156, and the body portion 154 surrounds the end portion 156 and the enlarged portions 160 of the contact punches to fixedly secure the punches in a depending position as shown. A center shield aperture broaching punch 164 is fixedly secured in a central aperture 166 in the bottom end of the shaft 146.

Figure 40:
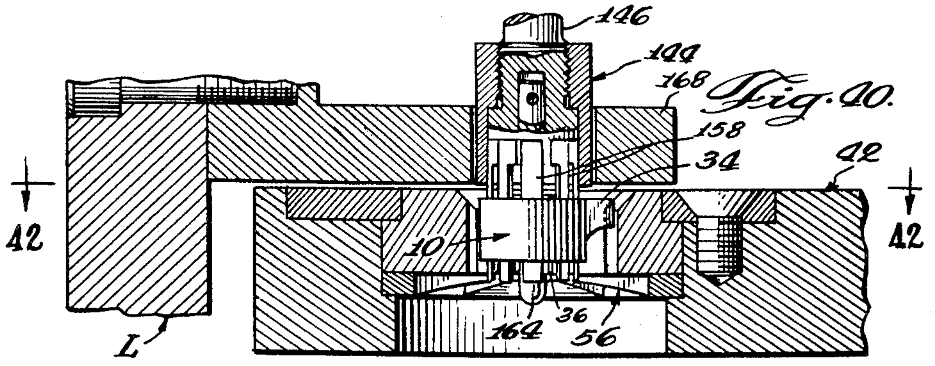
FIGURE 40 is an enlarged fragmentary illustration of a portion of the broaching mechanism shown in FIGURE 35 but showing the broaching punch in section and in its fully actuated position.
Figure 41:
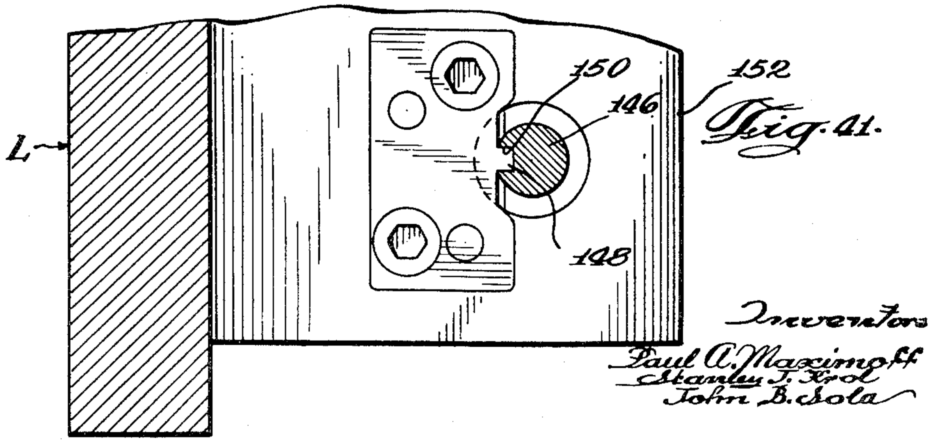
FIGURE 41 is an enlarged fragmentary sectional view taken along line 41—41 of FIGURE 35.

The contact aperture punches 158 and the center shield aperture punch 164 are so located and sized that when the broaching ram 144 is moved to the bottom of its stroke as shown in FIGURES 37 and 40, the contact punches 158 broach the contact apertures 22 in the socket body and the center shield punch 164 broaches the center shield aperture 30. The purpose of this broaching action is to remove any burr or film of material of the socket which may be left covering the apertures after molding of the socket. A situation in which webs cover the apertures is illustrated in FIGURES 36 and 39.

When the broaching action has been completed and the broaching ram is moved upwardly, there is a tendency for the broached socket body to stick on the punches and to move upwardly with the ram because of the tight fit of the punches in the connector apertures. In order to strip the socket body from the broaching punches a stripper plate 168 is fixedly secured to the stationary frame and extends over the socket nest 56 which is at the broaching station. A punch clearance aperture 170 is formed through the stripper plate with sufficient clearance to allow the broaching ram 144 to pass therethrough. It will be noted that the stripper plate is located with only a slight clearance above the socket nest 56 so that when a socket body tends to cling to the broaching punches, the locating tab 34 of the socket body will be brought up against the bottom of the stripper plate, thus dislodging the socket body so that it drops back into the nest.

After the broaching operation the contact apertures 22 and the center shield aperture 30 of the broached socket body 10 are cleaned out and properly sized for receiving the respective connectors.

*Contact feeding and insertion mechanism*

After the broaching operation has been performed, the control apparatus K again actuates the transfer mechanism J to shift the turntable 42 clockwise until the socket nest 56 containing the broached socket body is located at the next station, which, in the particular machine being described, is an open station. After the various operating mechanisms are again actuated the transfer mechanism is cycled again to index the turntable one station in a clockwise direction to place this nest at the station of the contact feeding and insertion mechanism C. This mechanism is illustrated in detail in FIGURES 43–67.

Figure 43:
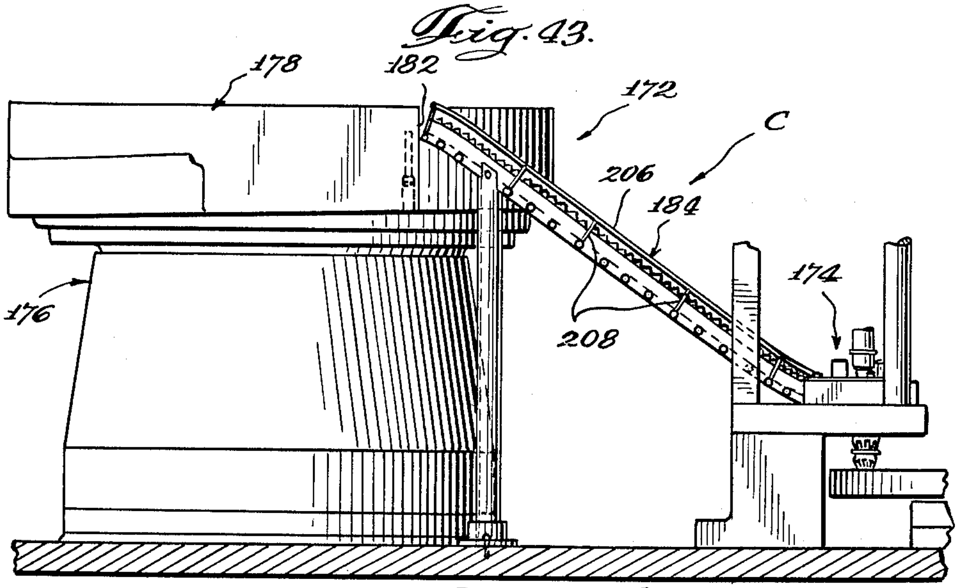
FIGURE 43 is a fragmentary side elevational view of the contact feeding mechanism of the socket machine of the present invention.

The mechanism C includes two major components, a contact feeding component 172 and a contact insertion component 174 (see FIGURES 1, 2 and 43). The feeding component 172 automatically orientates and feeds a multitude of contacts 12 to the contact insertion component 174 which, in turn, inserts seven contacts into proper positions in a socket body upon each cycle of the socket machine.

Figures 44, 47, 48:
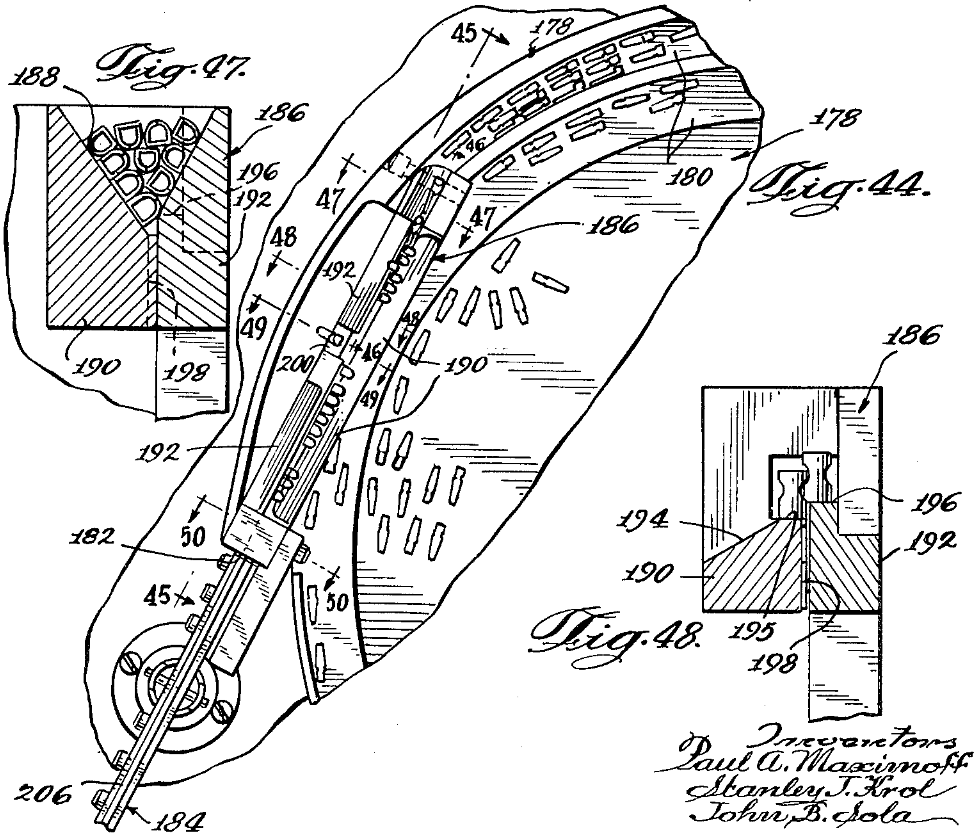
FIGURE 44 is an enlarged fragmentary plan view of a portion of the contact feeding mechanism.
FIGURE 47 is an enlarged fragmentary sectional view taken along line 47—47 of FIGURE 44.
FIGURE 48 is an enlarged fragmentary sectional view taken along line 48—48 of FIGURE 44.

The contact feed component includes a swirl type vibrator feeder 176, quite similar to the swirl feeder 60 of the insulator feeding and loading mechanism A. The vibrator feeder 176 includes a contact feed bowl 178 on top to which are imparted small amplitude, fairly high frequency vibrations. A multitude of contacts 12 are contained in the bowl, as best seen in FIGURES 2 and 44, and by reason of the character of the vibrations of the bowl the contacts swirl in a counterclockwise direction to crawl up a feed ramp or ledge 180 which is formed in a gradually climbing, spiral relation around the internal periphery of the bowl. After approximately 1½ circuits of the bowl on the ramp, properly orientated contacts 12 reach the bowl exit 182 and are there delivered to a contact chute 184 which carries these properly orientated contacts in abutting relation to the contact insertion component 174 for insertion in the socket bodies 10.

The ramp 180 is fairly wide at its beginning at the bottom of the bowl so that a large number of contracts can be carried side-by-side or on top of one another. As the ramp progresses and climbs around the bowl, it becomes more and more dished until it reaches an orientating rail 186 (FIGURE 47) which has an initial V-shape through 188. It will be noted that the dished ramp 180 and the receiving trough 188 carry a large number of contacts.

Figure 45:
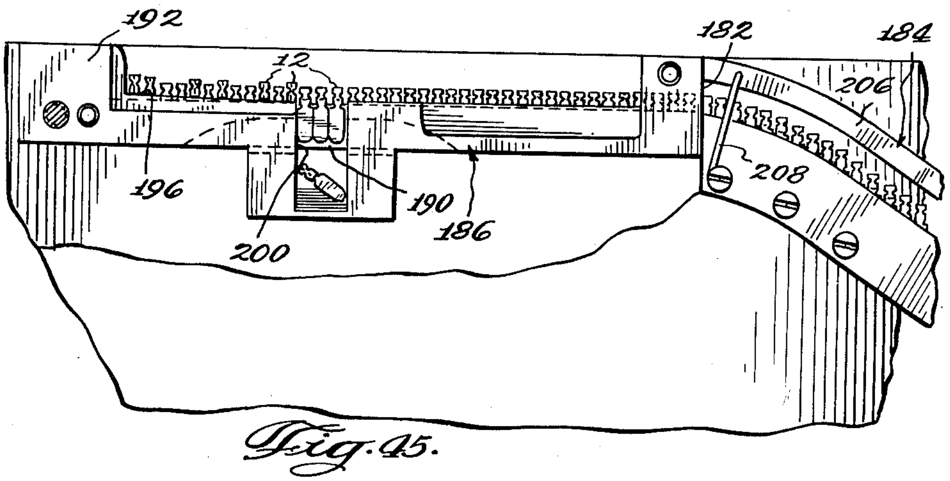
FIGURE 45 is an enlarged fragmentary sectional view taken along line 45—45 of FIGURE 44.
Figure 46:
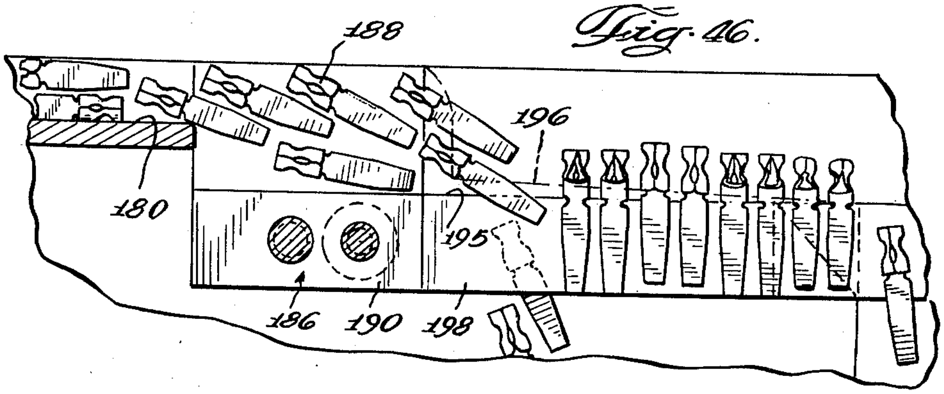
FIGURE 46 is an enlarged fragmentary sectional view taken along line 46—46 of FIGURE 44.
Figure 49:
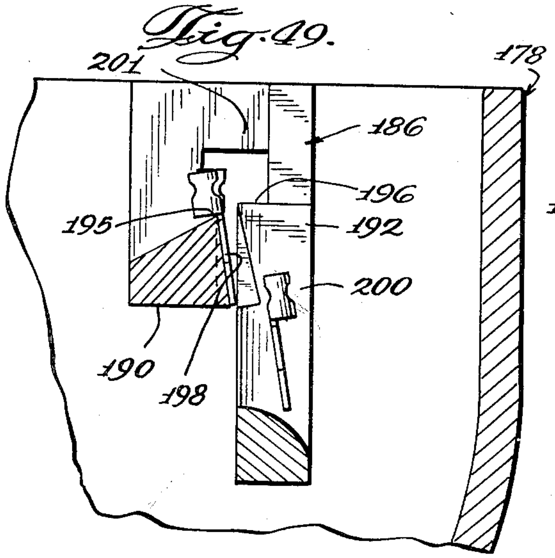
FIGURE 49 is an enlarged fragmentary sectional view taken along line 49—49 of FIGURE 44.

As seen in FIGURES 44–50, the orientating rail 146 is formed essentially by an inner portion 190 and an outer portion 192, each of which can be formed as an integral piece or as several pieces secured together. Initially the two rail portions 190 and 192 are notched to form the V-groove 186 shown in FIGURE 47. As best seen in FIGURE 48, after a short distance the inner portion 190 is cut away to provide an inwardly canted face 194 with a narrow horizontal ledge 195 adjacent the rail portion 192. The outward portion 192 of the rail has its upper section cut off at this position, leaving a narrow horizontal ledge 196 adjacent the ledge 195 but slightly higher. A narrow vertical channel 198 is formed between the two portions 190 and 192 (as best seen in FIGURE 48) of sufficient width to receive the tail portions 18 of the contacts 12 with some clearance. At this position many of the contacts fall off both sides of the orientating rail back into the bowl. However, as best seen in FIGURES 45, 46 and 48, the tail portions 18 of a number of the contacts slide into the channel 198 between the two rail portions 190 and 192 and these contacts are retained by the rail. The head portions 16 which are extending inwardly rest on the ledge 195 and the head portions which extend outwardly rest on the ledge 196, as best seen in FIGURE 48.

Figure 50:
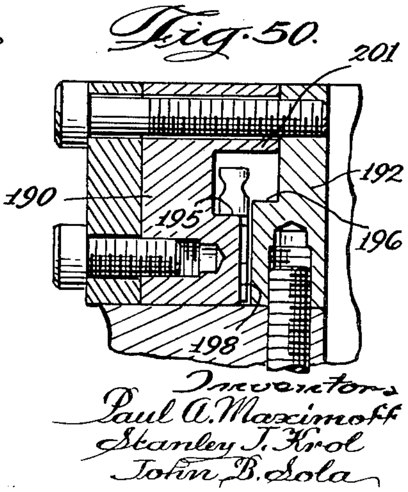
FIGURE 50 is an enlarged fragmentary sectional view taken along line 50—50 of FIGURE 44.

As the retained contacts continue on along the rail they reach a cutout 200 where the ledge 196 of the outer rail 192 is cut away sharply for a distance of the width of about three contacts, as best seen in FIGURES 44, 45, 46 and 49. The contacts which have their head portions facing outwardly drop off the rail back into the bowl so that only the contacts which have their heads facing inwardly are retained on the rail. At the same time the face of the channel 198 of the rail portion 190 is canted inwardly from the top so that the ledge 195 becomes essentially a sharp edge to assist in retaining the contacts on the rail portion. After the cut-out 200 has been passed, the ledges 195 and 196 are reformed, but there are now no contact heads resting on the ledge 146. Inasmuch as the ledge 196 is slightly higher than the ledge 195, it assists in retaining the tails of the contacts in the channel 198, which has now resumed its vertical configuration, as best seen in FIGURE 50. To make certain that only contacts with inwardly facing heads are fed to the contact chute 184, the rail portion 190 has a ceiling 201 formed at this position with sufficient clearance to pass contacts with their heads resting on the ledge 195 but with insufficient clearance to pass contacts with their heads on the raised ledge 196. The contacts then pass on to the bowl exit 182 where they are delivered in properly orientated position to the contact chute 184.

Figures 57, 58, 59, 60, 61, 62:
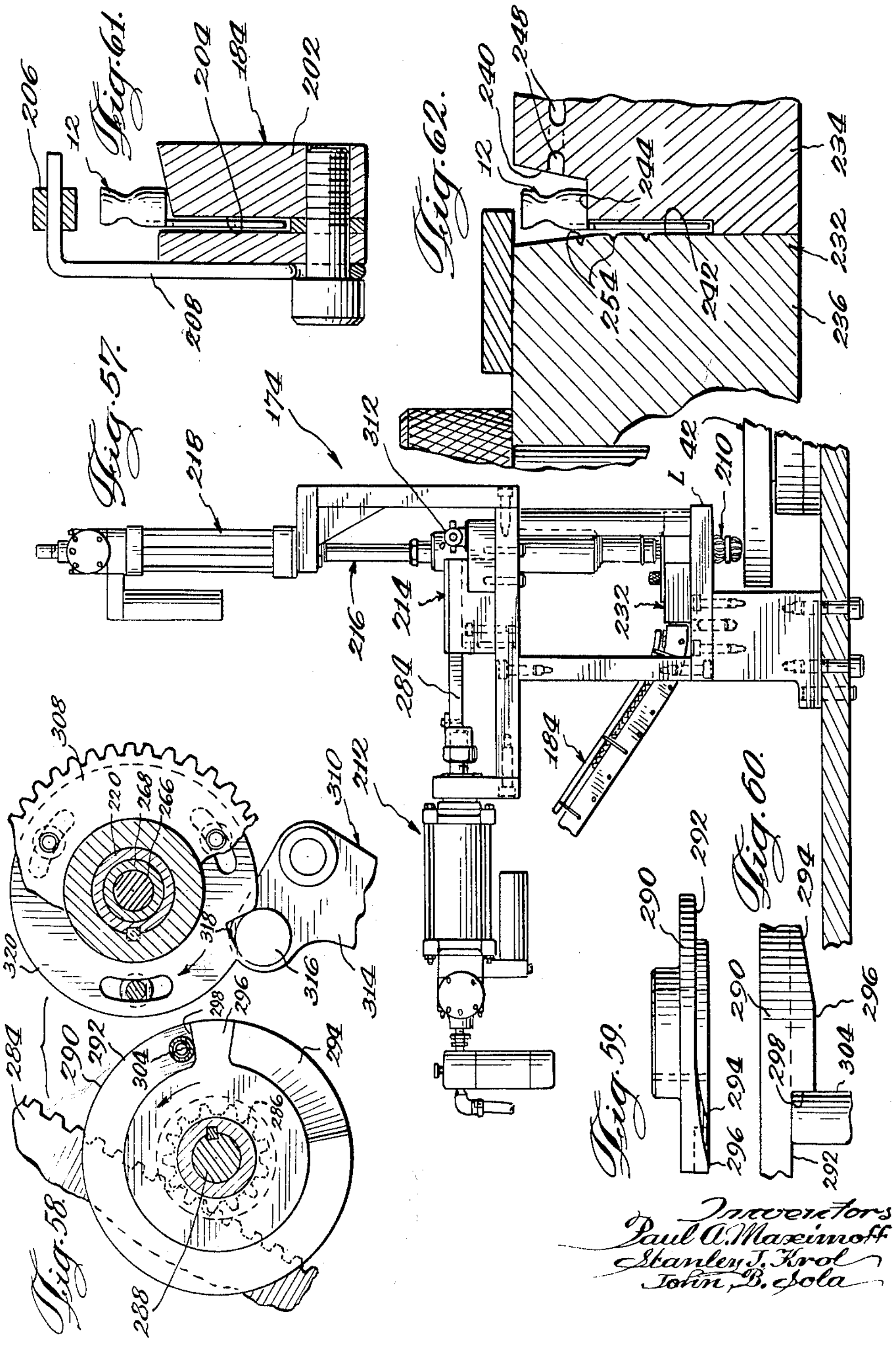
FIGURE 57 is a fragmentary elevational view of the contact insertion mechanism of the socket machine of the present invention.
FIGURE 58 is an enlarged fragmentary sectional view taken along line 58—58 of FIGURE 52, with parts broken away for clarity.
FIGURE 59 is an enlarged side elevational view of the cam plate specifically illustrated in FIGURES 52 and 58.
FIGURE 60 is a further enlarged fragmentary side elevational view of a portion of the cam plate and cam pin illustrated in FIGURES 52 and 58.
FIGURE 61 is an enlarged fragmentary sectional view taken along line 61—61 of FIGURE 63.
FIGURE 62 is an enlarged fragmentary sectional view taken along line 62—62 of FIGURE 63.

As best seen in FIGURE 61, the contact chute 184 comprises a rail member 202 formed with a vertical channel 204 which receives the tail portions 18 of the contacts from the channel 198 of the orientating rail 186. A keeper bar 206 is disposed over the tops of the contacts to prevent any contacts from jumping out of the channel 204 as they pass down the chute in abutting relation. The keeper bar is suspended over the chute by means of a plurality of spring members 208. The contact chute 184 delivers contacts side-by-side, in properly orientated relationship, to the contact insertion component 174 of the mechanism C.

The contact insertion component 174 (FIGURE 57) comprises, in general, a contact feeding and orientating shaft 210, a pneumatic actuating cylinder 212 for selectively rotating the shaft through drive mechanism 214, a contact insertion ram 216, and a pneumatic ram actuating cylinder 218. In general, the feeding and orientating shaft 210 rotates 360°, thereby picking up seven contacts, and then the insertion ram 216 is brought down to push these contacts down into a socket body 10.

Figures 52, 53:
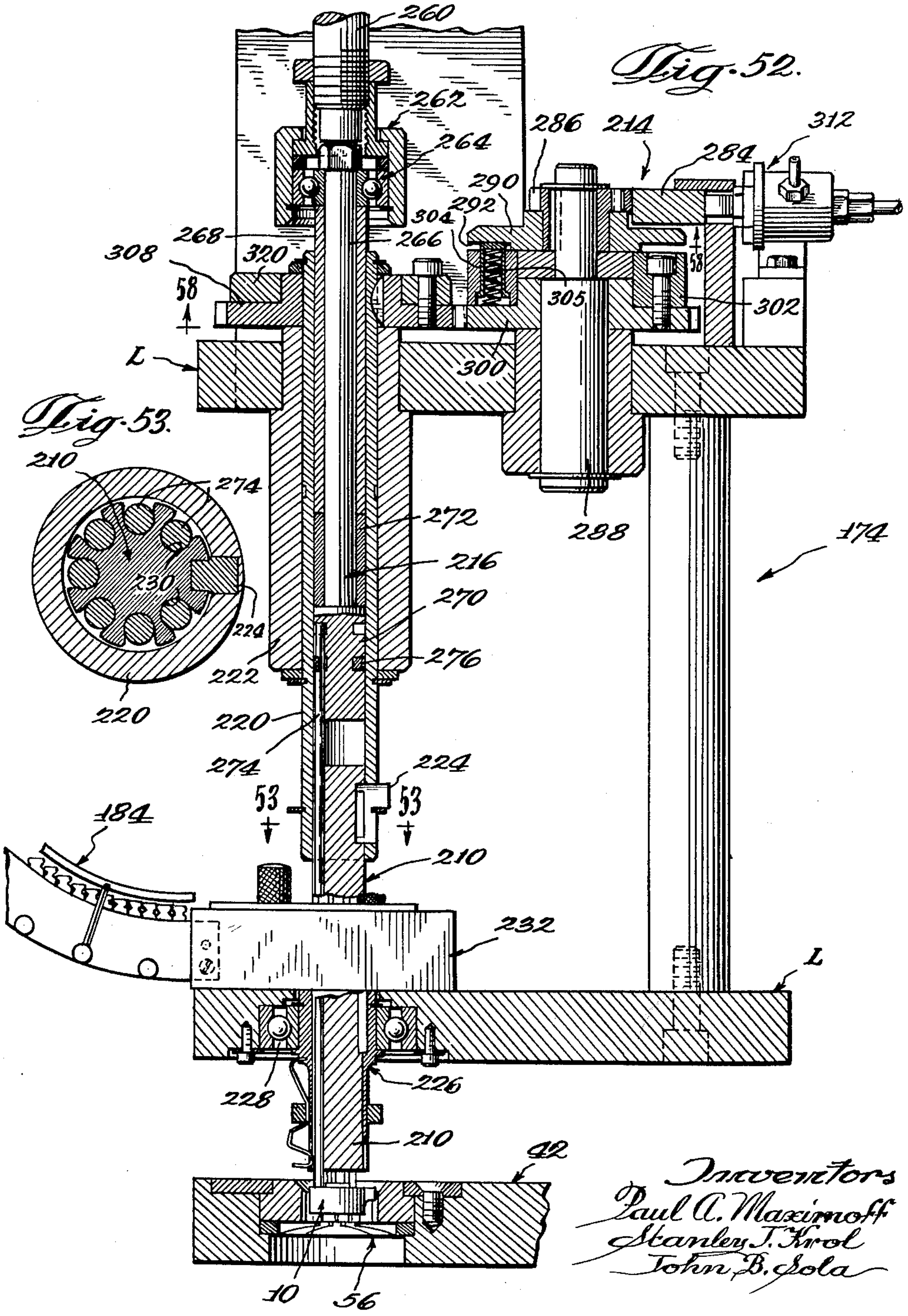
FIGURE 52 is an enlarged fragmentary sectional view taken along line 52—52 of FIGURE 51 but showing the mechanism in its actuated position.
FIGURE 53 is an enlarged fragmentary sectional view taken along line 53—53 of FIGURE 52.

Referring to FIGURE 52, the contact feeding and orientating shaft 210 is carried at its upper end portion by a rotatable drive sleeve 220 which, in turn, is rotatably mounted in a support sleeve 222. The support sleeve 222 is secured, in a vertical position, to a portion of the stationary frame L. The connection between the contact feed shaft 210 and the rotatable sleeve 220 is made by a key 224 which engages in appropriate adjacent grooves formed in the shaft and the sleeve. The lower end portion of the feed shaft 210 is supported in a fitting 226 which is rotatably mounted in a portion of the stationary frame L by means of an antifriction bearing 228 (see FIGURE 54).

In order for the feed shaft 210 to pick up seven of the contacts 12 with each rotation, the shaft is formed with seven longitudinal grooves 230 which extend the length of the shaft. It will be noted that the grooves 230 have configurations which are formed to interfit with the curved portions of the heads 16 of the contacts (FIGURES 56 and 64), with the flat sides generally conforming with the periphery of the shaft. It will be noted that there is sufficient clearance provided in the grooves to permit the contacts to easily move into the grooves, but the shape is such that the contacts are prevented from rotation once they are received by the grooves.

Figures 63, 64:
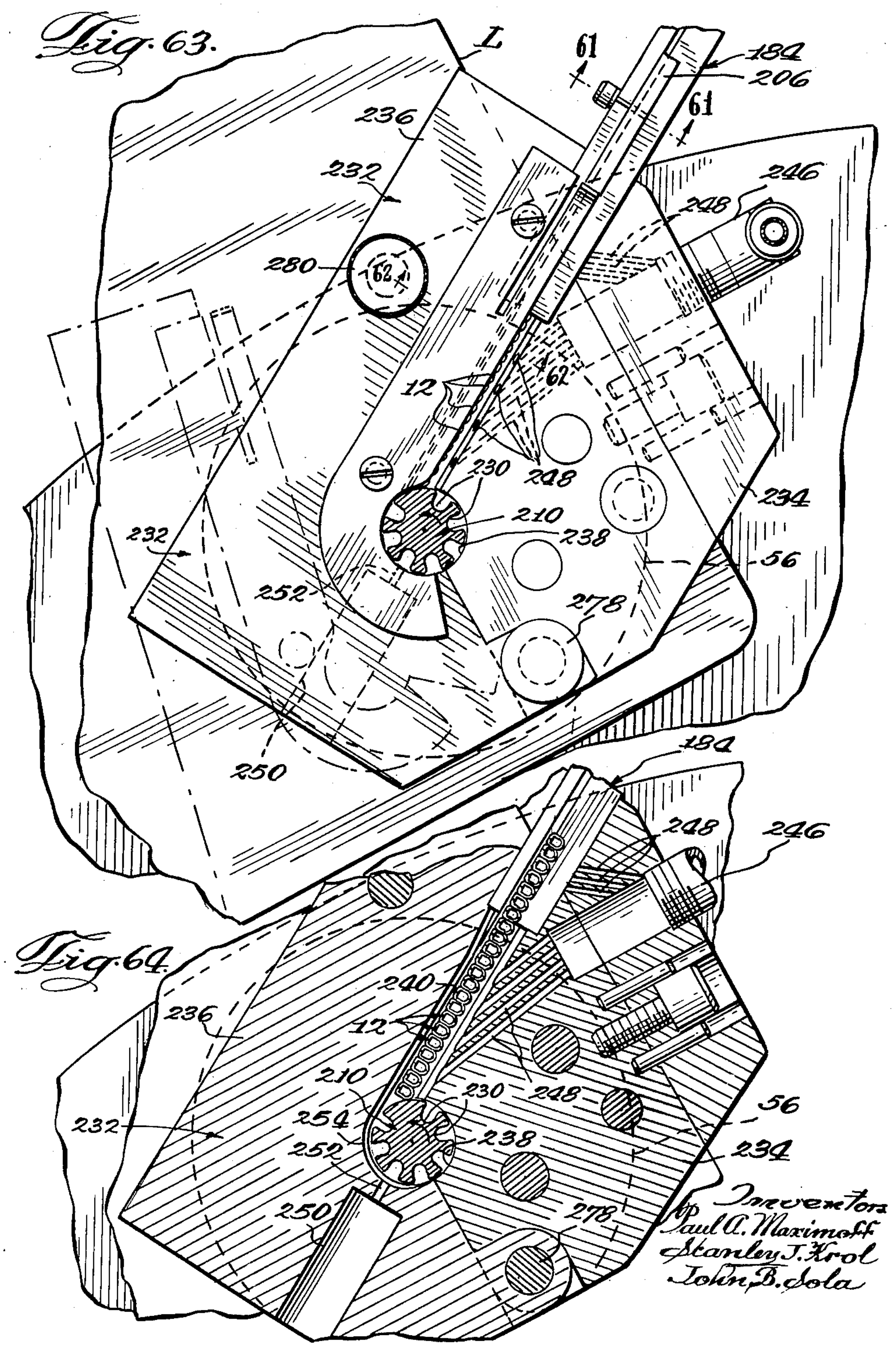
FIGURE 63 is an enlarged fragmentary plan view of a portion of the contact feeding and insertion mechanism of the socket machine of the present invention showing the contact insertion shaft in section.
FIGURE 64 is a fragmentary sectional view similar to FIGURE 63 and illustrating the relationship of the contact insertion shaft with the contacts being fed thereto.

Referring to FIGURES 54, 63, 64 and 65, it will be seen that the contact chute 184 delivers the contacts to a contact loading block 232. The loading block 232 includes a fixed portion 234 and a movable portion 236, both of which are secured on a portion of the structure L immediately above the fitting 226. When the movable portion 236 is in its normal, closed position as shown in FIGURES 63 and 64 the loading block encloses a portion of the insertion shaft 210 in a loading bore 238. The contacts are directed from the contact chute 184 to the loading bore 238 through a loading channel (FIGURE 62) which has an enlarged upper portion 240 which carries the heads of the contacts in spaced relation, and a reduced size lower portion 242 which receives the tail portions in close fitting relation but with sufficient clearance to allow free sliding. The head portions of the contacts rest on a ledge 244 formed in the fixed block 234. When the insertion shaft 210 is in its unactuated position the contact grooves 230 in the shaft 210 are shown as disposed in FIGURES 63 and 64, and the contacts in the loading channel abut the shaft but cannot enter the grooves.

Figures 13, 14:
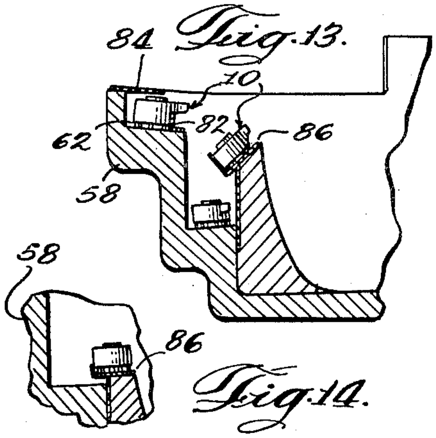
FIGURE 13 is a fragmentary sectional view taken along line 13—13 of FIGURE 8.
FIGURE 14 is a fragmentary sectional view taken along line 14—14 of FIGURE 8.
Figure 15:
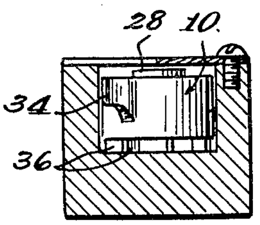
FIGURE 15 is an enlarged fragmentary sectional view taken along line 15—15 of FIGURE 1.

When the contact insertion mechanism is actuated, the shaft is rotated in a counterclockwise direction (viewed from the top) by means of the actuating cylinder 212 and the drive mechanism 214 in a manner to be described. At the same time, compressed air is introduced into the fixed portion 234 of the loading block through an air fitting 246 (FIGURE 14). The fitting 246 is connected with a plurality of air passages formed in the block and directed against the heads of the contacts adjacent the shaft 210 in a manner to urge these contacts toward the shaft. Thus, as the insertion shaft 210 rotates in a counterclockwise direction, the first contact in the line is forced into the first groove 230, the second contact is forced into the second groove 230, and so on until seven contacts have been inserted in the respective seven grooves.

After the shaft has completed one rotation, it is again in the position shown in FIGURES 63 and 64, preventing any more contacts from entering in the contact grooves. It will be understood that the row of contacts awaiting insertion will still be filled as shown in FIGURE 64 because the feeding capacity of the feed component 172 is greater than the insertion capacity of the insertion component 174.

An air outlet passage 250 is formed through the movable block 236 on the opposite side of the shaft 210 from the air inlet passages 242. This air outlet passage is connected to the insertion bore 238 by means of a plurality of air outlet passages 252, so that air flowing past the contacts and into the insertion bore can flow out the passages 252 and the passage 250. To assist in allowing the air to pass out, the widened area provided on the opposite sides of the contact heads, the contact passage 240 is continued around to the air outlet passages, and air passage grooves 254 are formed in the contact passage wall of the block 236.

Figures 54, 55, 56:
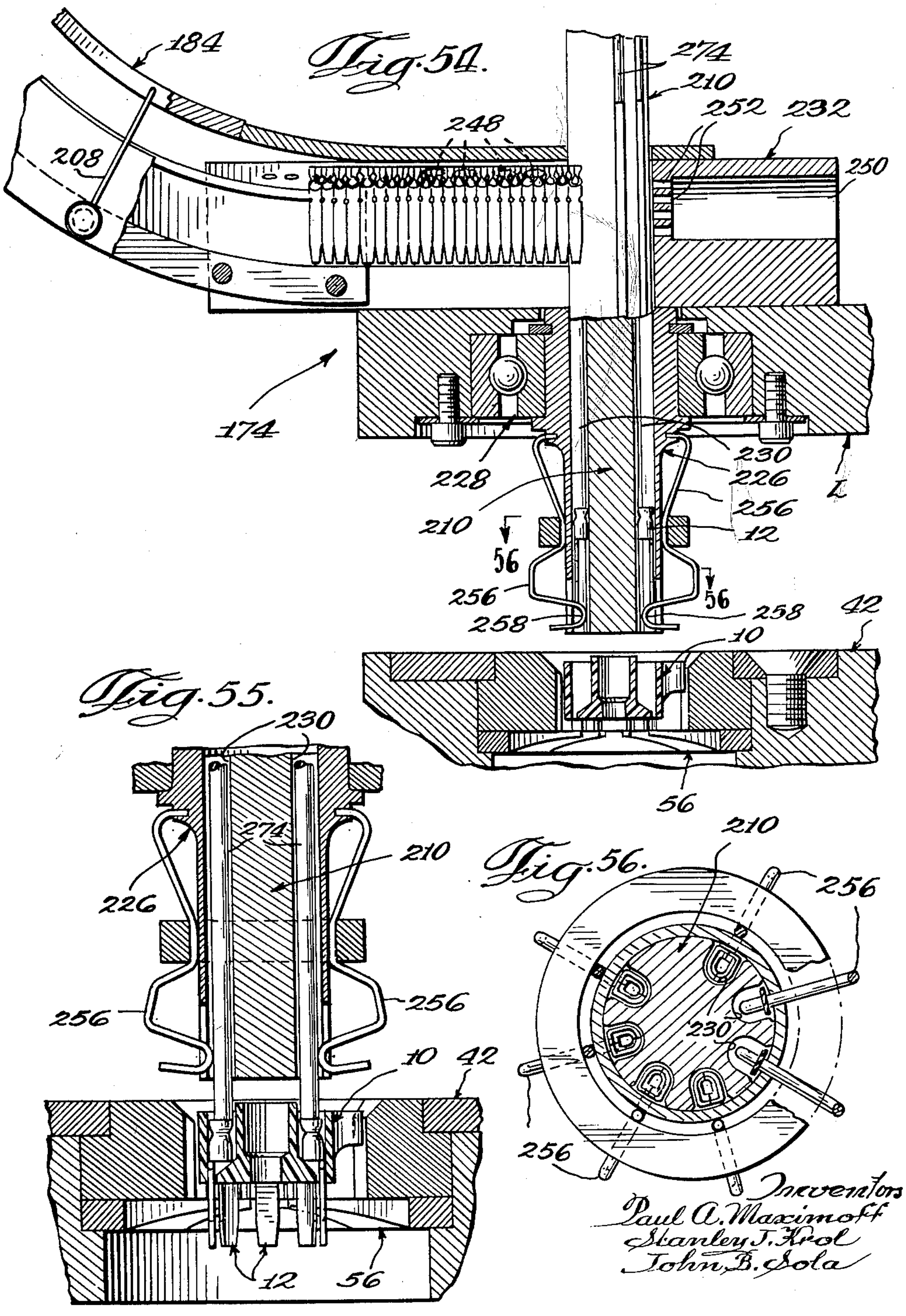
FIGURE 54 is an enlarged fragmentary sectional view of a portion of the contact insertion mechanism shown in FIGURE 52, but showing the mechanism in its unactuated position.
FIGURE 55 is an enlarged fragmentary sectional view of a portion of FIGURE 54 but showing the contact insertion mechanism in its fully actuated position.
FIGURE 56 is an enlarged fragmentary sectional view taken along line 56—56 of FIGURE 54.

After the contacts 12 are received in the contact grooves 230 of the insertion shaft 210, they drop freely into the insertion fitting 226, as illustrated in FIGURES 54 and 56, until they reach seven spring stop members 256 which are secured to the fitting 226 and which have lower nose portions 258 extending through the fitting and into the respective channels 230. The lower ends of the contacts 12 engage the spring stops and are temporarily held in this position. It will be noted from FIGURE 54 that when the contacts are in this position, they are directly above the socket body 10 in the socket nest 56 which is at this position.

While the contacts are in the position shown in FIGURE 54, the contact insertion ram 216 is actuated to push them into the place in the waiting socket body. The insertion ram includes a shaft 260 which is secured to the piston (not shown) of the pneumatic actuating cylinder 218. At its bottom end the shaft 260 is connected to a fitting 262 which contains an antifriction bearing 264 having its inner race secured about a lower shaft 266. A bearing support sleeve 268 is secured about the lower shaft 266 and has its upper end engaging the inner race of the bearing 264 to hold the bearing in place. At its lower end the shaft 266 has an enlarged head 270 which fits snugly but slidably within the rotatable shaft 220. A bushing 272 is disposed between the lower end of the support sleeve 268 and the upper end of the head 270. Seven contact insertion rods 274 are fixedly secured to the shaft head 270 by any suitable means such as silver soldering at the points 276, and these insertion rods are disposed in the respective contact grooves 230 of the insertion shaft 210 as shown in FIGURES 52–53 and 55.

Normally the insertion ram 216 is raised sufficiently that the lower ends of the insertion rods 274 are above the loading block 232, as shown in FIGURE 54. When the insertion ram is actuated, after actuation of the insertion shaft 210 so that seven contacts are in the position shown in FIGURE 54, the insertion ram 216 is moved downwardly carrying with it the insertion rods 274 which engage the upper ends of the contacts 12 in the groove 230, forcing these contacts beyond the stop springs 256 down into proper position in the socket body 10, as shown in FIGURE 55. The insertion ram is then moved upwardly to withdraw the insertion rods 274 and the mechanism is in condition for another cycle after the turntable 42 has moved another socket body into position.

Figures 65, 67:
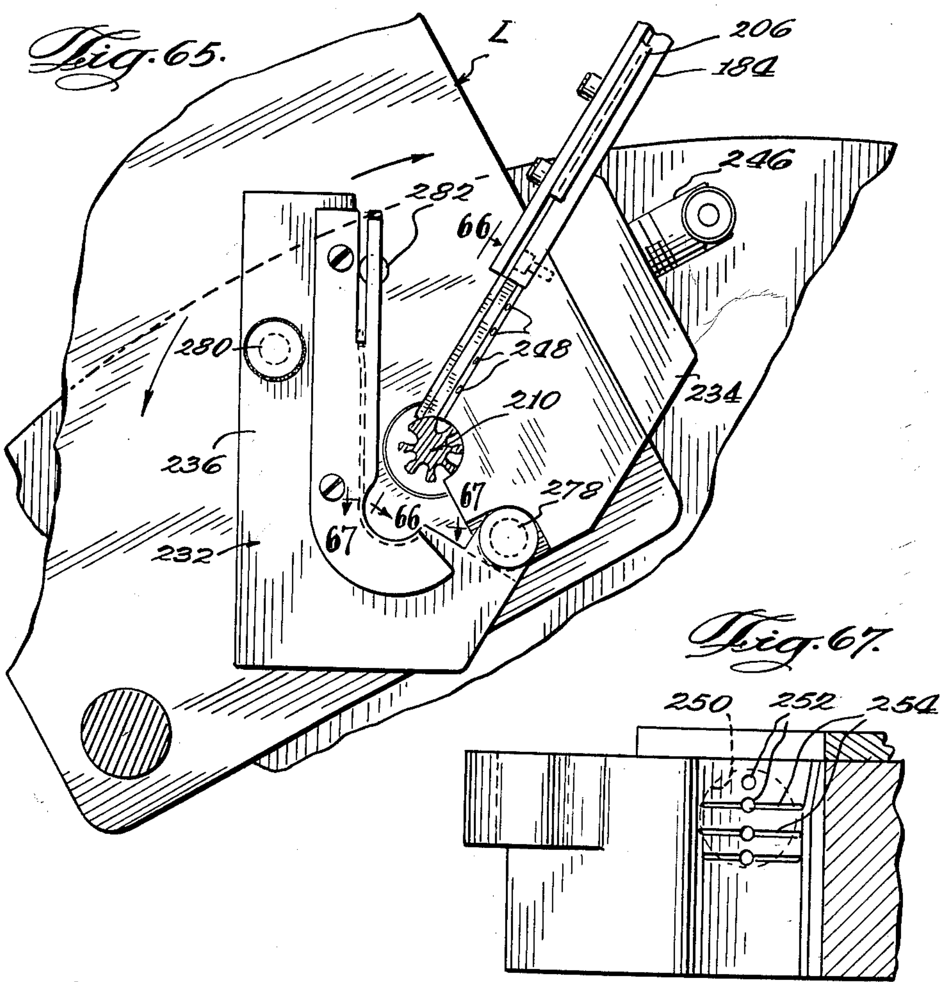
FIGURE 65 is a fragmentary elevational view similar to FIGURE 63 but on a reduced scale and showing a portion of the structure unhinged for access purposes.
FIGURE 67 is an enlarged fragmentary sectional view taken along line 67—67 of FIGURE 65.
Figure 66:
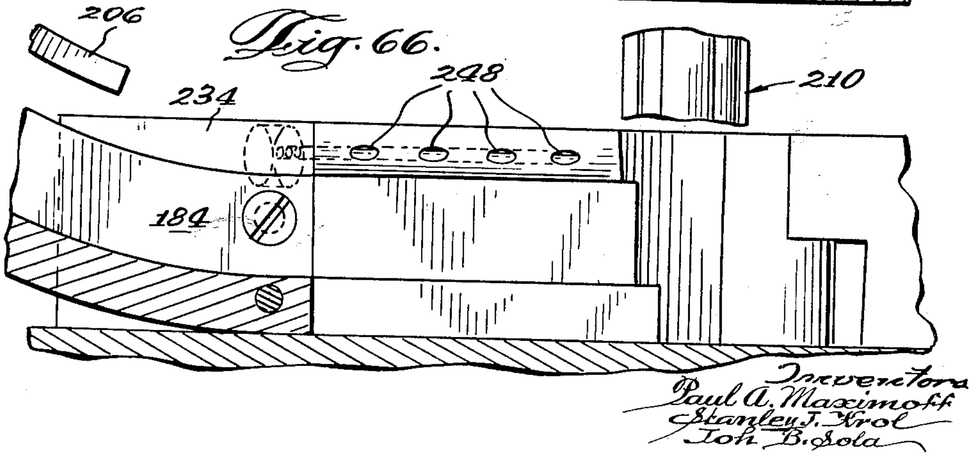
FIGURE 66 is an enlarged fragmentary sectional view taken along line 66—66 of FIGURE 65.

For easy access, the movable block portion 236 of the loading block 232 is pivotally secured to the frame by a pin 278, so that this movable block can be pivoted away from the insertion shaft 210, as shown in FIGURE 65. This permits ready removal of defective pins, for example. The movable block is normally held in its closed position by means of a spring pin 280 which normally engages in an aperture 282 in the support structure below the loading block.

Figure 51:
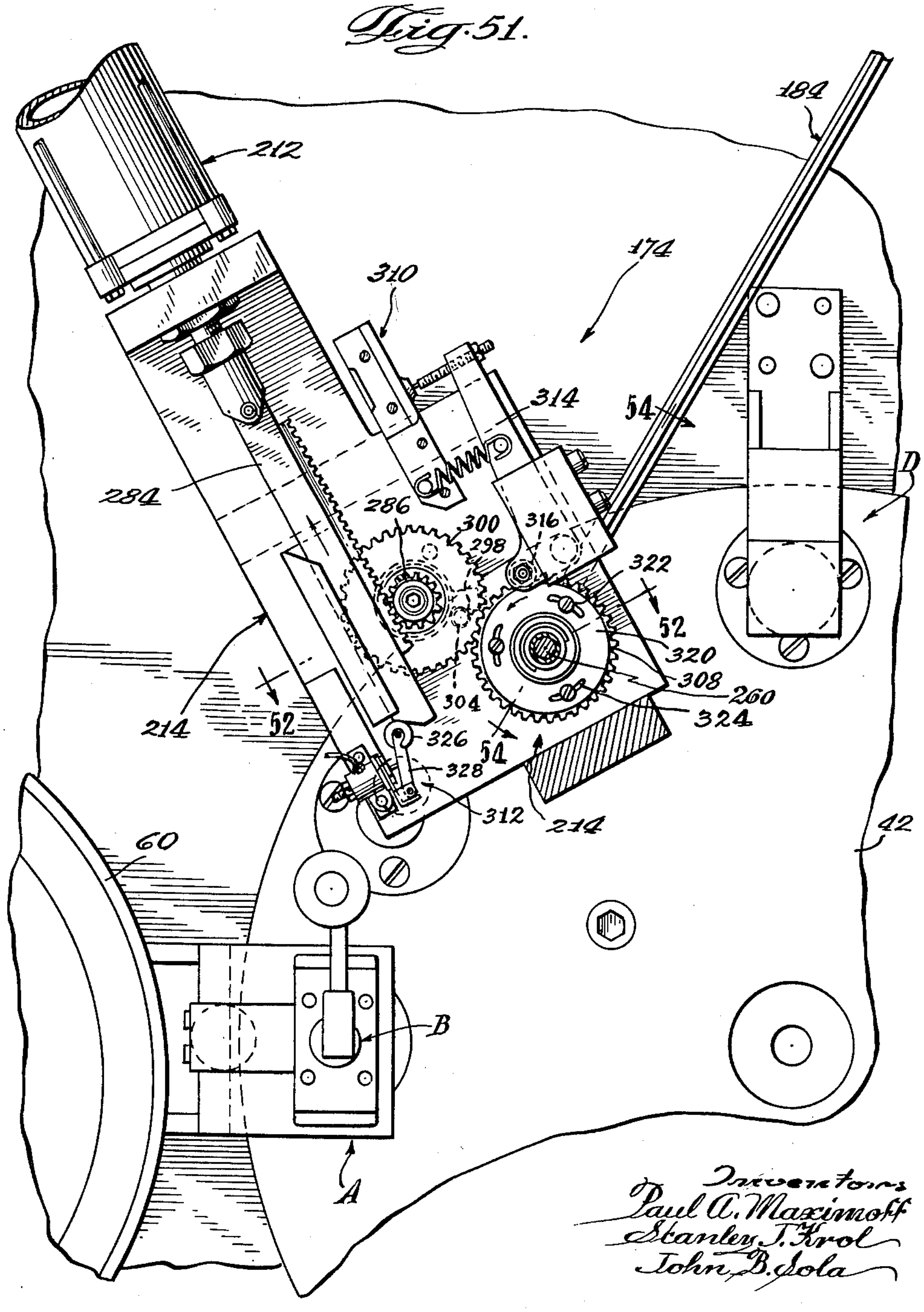
FIGURE 51 is an enlarged fragmentary top elevational view of a portion of the drive for the contact insertion mechanism of the socket machine of the present invention.

The insertion shaft 210 is intermittently rotated through the actuating cylinder 212 and the drive mechanism 214 (FIGURES 51, 52 and 58). The piston (not shown) of the pneumatic cylinder 212 is connected to a rack 284 of the drive mechanism and this rack is meshed with a relatively small spur gear 286 (FIGURES 51, 52 and 58). The spur gear 286 is keyed to a shaft 288 which is rotatably secured in a vertical position in a portion of the stationary frame L. The spur gear is also secured to a cam plate 290 which is provided with a peripheral cam groove 292 in its lower face. The cam groove 292 is formed with a cam rise portion 294 (FIGURES 58 and 59) which gradually "rises" from the cam groove floor to a raised portion 296, and then abruptly returns to the level of the cam groove at a cam shoulder 298.

A drive gear 300 is rotatably secured on the shaft 288 below the spur gear 286 and a ring bracket 302 is secured between the drive gear and the cam plate 290. A spring pressed cam follower 304 (FIGURES 52, 58 and 60) is secured in a vertical aperture in the ring 302 and has an upper end portion which is resiliently urged, by means of a compression spring 306, into the cam groove 292 of the clutch plate 290. The cam follower 304 is so located with respect to the cam shoulder 298 that the follower is engaged by the shoulder when the spur gear 286 is rotated in a clockwise direction as viewed in FIGURE 51, or in a counterclockwise direction as viewed in FIGURE 58 (which is a bottom view). When the spur gear 286 is rotated in the other direction, the cam follower 304 merely rides in the cam groove 292 until it reaches the cam rise 294 at which time it is depressed until it passes the raised portion 296 and the shoulder 298, at which time it drops back into the cam groove.

Thus, when the rack 284 is moved in its out-going direction, the cam follower does not engage the shoulder 298, so that rotation of the spur gear 286 does not cause any rotation of the drive gear 300. However, on the return stroke of the rack, the shoulder 298 of the clutch plate is in engagement with the cam follower 304, so that the clutch plate carries the ring 302 and the drive gear 300 as it rotates.

The drive gear 300 is meshed with a rotating gear 308 for the insertion shaft 210. This rotating gear is keyed to the drive sleeve shaft 220, as seen in FIGURES 52 and 58, so that rotation of the gear 308 causes rotation of the sleeve shaft, and, consequently, causes rotation of the contact insertion shaft 210.

It will be noted that the insertion shaft is rotated in a counterclockwise direction only, looking down on the shaft, because of the action of the clutch plate 290 and the cam follower 304 as previously described.

It will also be noted that the antifriction bearing 264 of the insertion ram 216 allows the lower shaft 266 of the ram to rotate without necessitating rotation of the upper shaft 260.

Portions of the control apparatus K are shown in the form of normally open micro-switch 310 and an air valve 312 (FIGURES 51, 52 and 58). The switch 310 includes a bell crank actuating arm 314 which has one arm portion for actuating the switch and the opposite arm portion carrying a cam roller 316 which is adapted to engage in a cam notch 318 in a cam plate 320. When the cam roller 316 is engaged in the cam notch 318, the switch 310 is closed and the control apparatus permits operation of the insertion ram 216. However, when the roller is riding in the periphery of the cam plate 320 out of the cam notch, the switch 310 is open and the insertion ram cannot be actuated.

It will be noted that adjusting screws 322 secure the cam plate 320 to the rotating gear 308 through adjusting slots 324 formed in the cam plate. This permits the position of the insertion shaft 310 and the associated mechanism to be changed while still insuring that the switch 310 will be closed at the proper position.

The air valve 312 is connected to a source of compressed air (not shown) for the air nozzle 246 and the air passages 248 (FIGURE 64). When the rack 284 is in the position shown in FIGURE 51 the valve 312 is closed and the source of air is cut off. However, when the rack moves, a cam roller 326 connected to an actuating arm 328 of the valve rides up on the rack, causing the valve 312 to open, thus actuating the air blast through the air passages 248 to insure that the contacts will be forced into the contact grooves 230 of the insertion shaft 210 as it rotates.

From the foregoing description it will be seen that the contact feeding and insertion mechanism C automatically handles and feeds contacts and inserts seven contacts into respective socket bodies with each cycle of the socket machine. No manual operations need be performed other than seeing that the contact feed bowl 172 is supplied with sufficient contacts.

*Contact testing mechanism*

After the contacts have been inserted by the contact feeding and insertion mechanism C, the transfer mechanism J is again cycled by the control apparatus K and the turntable 42 moves the socket 12 with inserted contacts to the next station at the contact tesing mechanism D. This mechanism is specifically illustrated in FIGURES 68–72, and includes, in general, an upper contact shoe 330 which is actuated by a pneumatic actuating cylinder 332, and a lower contact shoe 334 which is actuated by a pneumatic actuating cylinder 336.

The upper contact shoe 330 comprises a metallic body portion 338 which is secured to a shaft 340 connected to the piston (not shown) of the pneumatic actuating cylinder 332. An insulating body 342 is secured below the metallic body 338 by means of a plurality of screws 344, and an insulating plate 346 is disposed between the two bodies. Seven contact fingers 348 have head portions slidably disposed in seven vertical passages 350 formed in the insulating body 342 and reduced diameter shanks extending below the insulating body. Compression springs 352 are disposed in the bores 350 and act between the heads of the contact pin 348 and the insulating plate 346 to press the pins downwardly until they normally engage shoulders 354 in the bores 352 to retain the pins in the position shown in FIGURE 69. The contact pins are located directly above the contacts 12 in the socket body disposed at the contact testing station.

The lower contact shoe 334 includes an insulating body 356 which is fixedly secured to the upper end of a shaft 358 by means of an end bolt 360. The shaft 358 is connected to the piston (not shown) of the actuating cylinder 336. A collar 362 is threadedly inserted over the end of the shaft 358 below the insulating body 356 and an insulating plate 364 is disposed between the insulating body and the collar. Seven metallic contact pins 366 are fixedly secured in vertical apertures 368 formed in the insulating body 356, and electrical contact springs 370 are disposed below the pins 366 in the apertures in engagement with the bottom ends of the pins. The upper end portion of the insulating body 356 is frusto-conical as shown and the upper ends of the pins 366 are cut off flush with the frusto-conical surface. The contact pins are located directly below the respective contacts 12 in the socket body 10 which is disposed at the contact testing station.

Figures 68, 70:
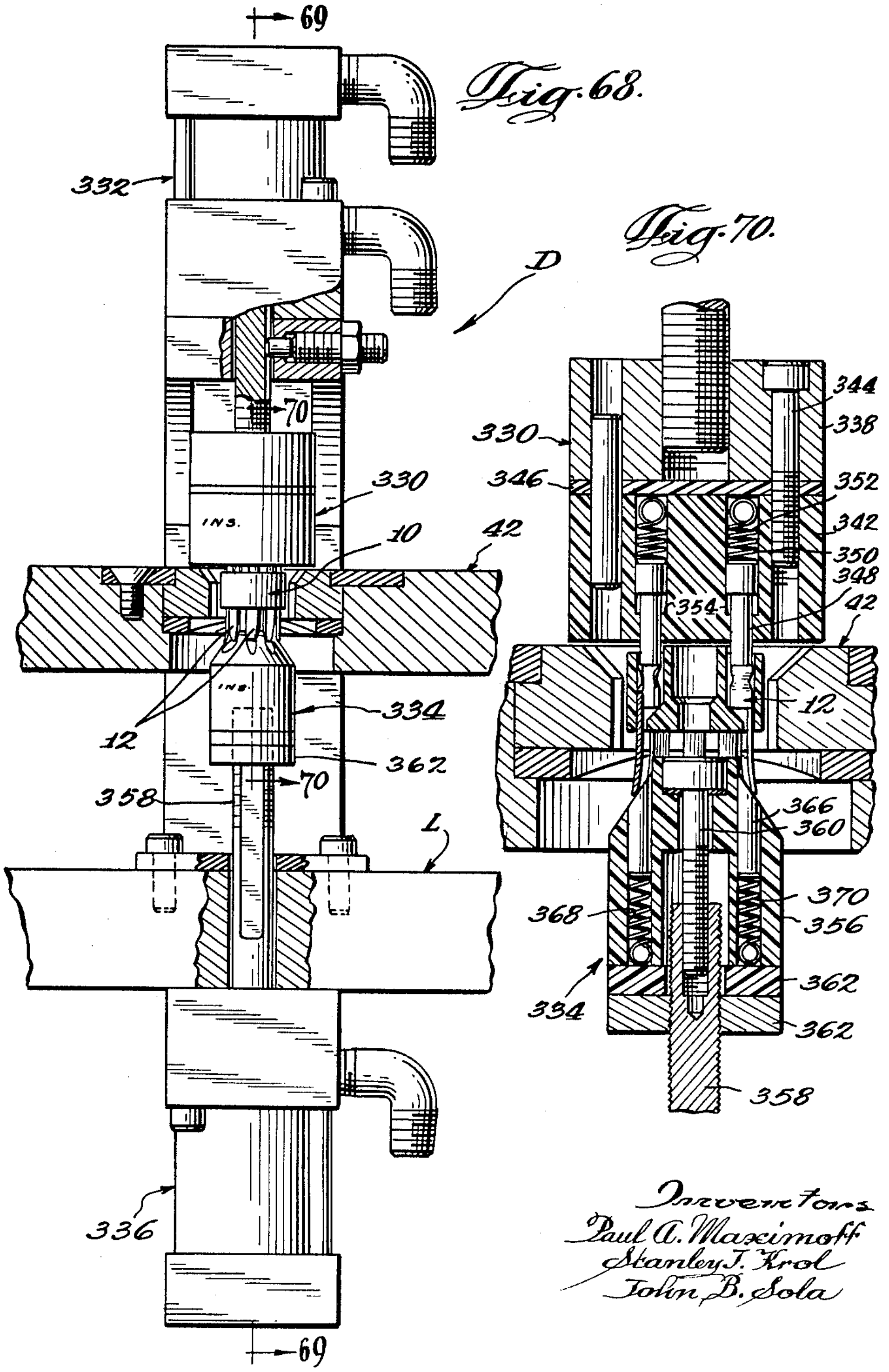
FIGURE 68 is an enlarged fragmentary sectional view of the contact testing mechanism of the socket machine of the present invention, showing some parts in elevation and some parts bboken away, and with the contact testing mechanism in its fully actuated position.
FIGURE 70 is a further enlarged fragmentary sectional view taken along line 70—70 of FIGURE 68.
Figures 69, 71, 72:
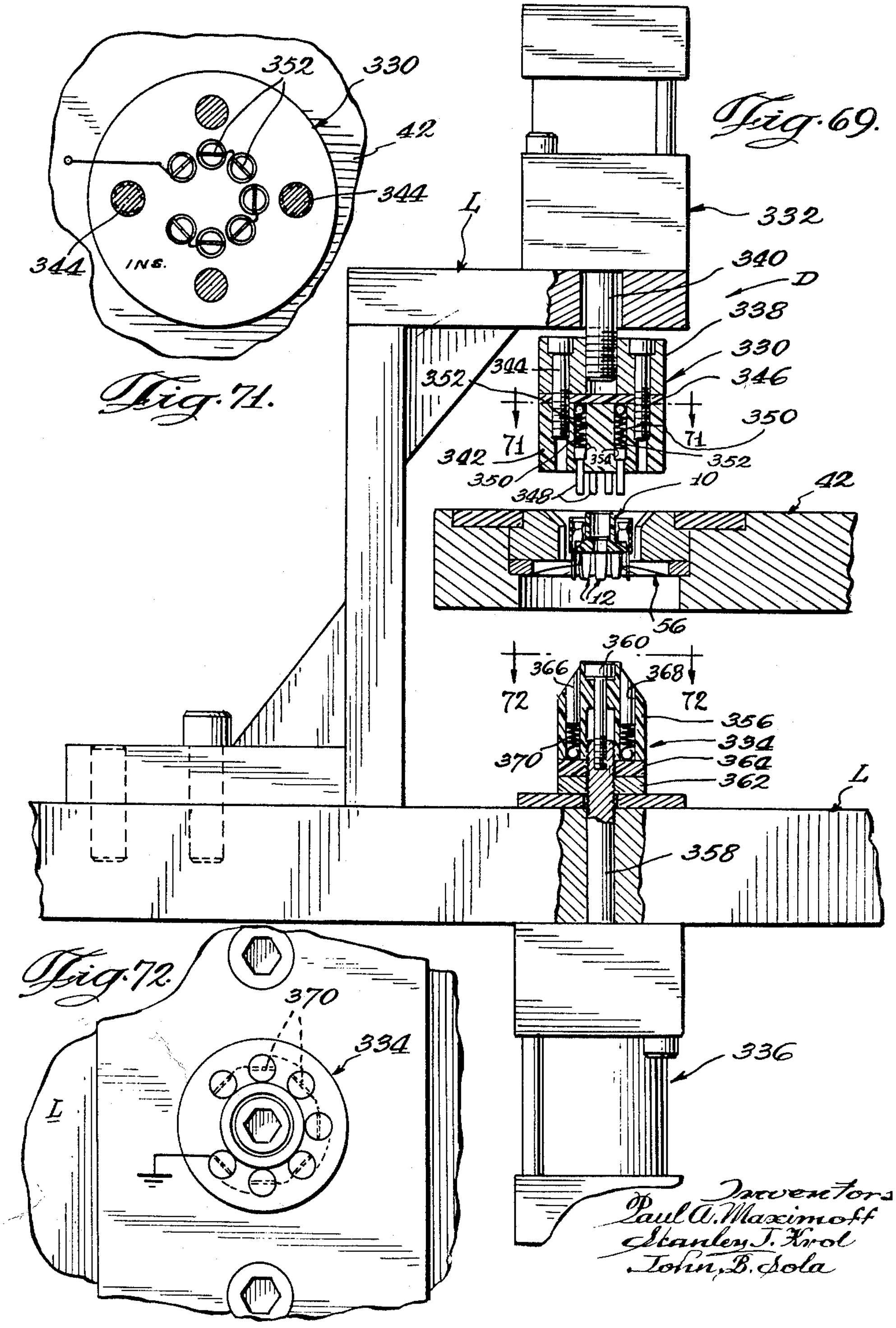
FIGURE 69 is a fragmentary sectional view taken along line 69—69 of FIGURE 68 but showing the contact testing mechanism in the unactuated position.
FIGURE 71 is an enlarged fragmentary sectional view taken along line 71—71 of FIGURE 69 and diagrammatically illustrating the series connection through the upper contact engaging elements.
FIGURE 72 is an enlarged fragmentary elevational view taken along line 72—72 of FIGURE 69 and illustrating the series connection between the lower contact engaging elements.
Figure 74:
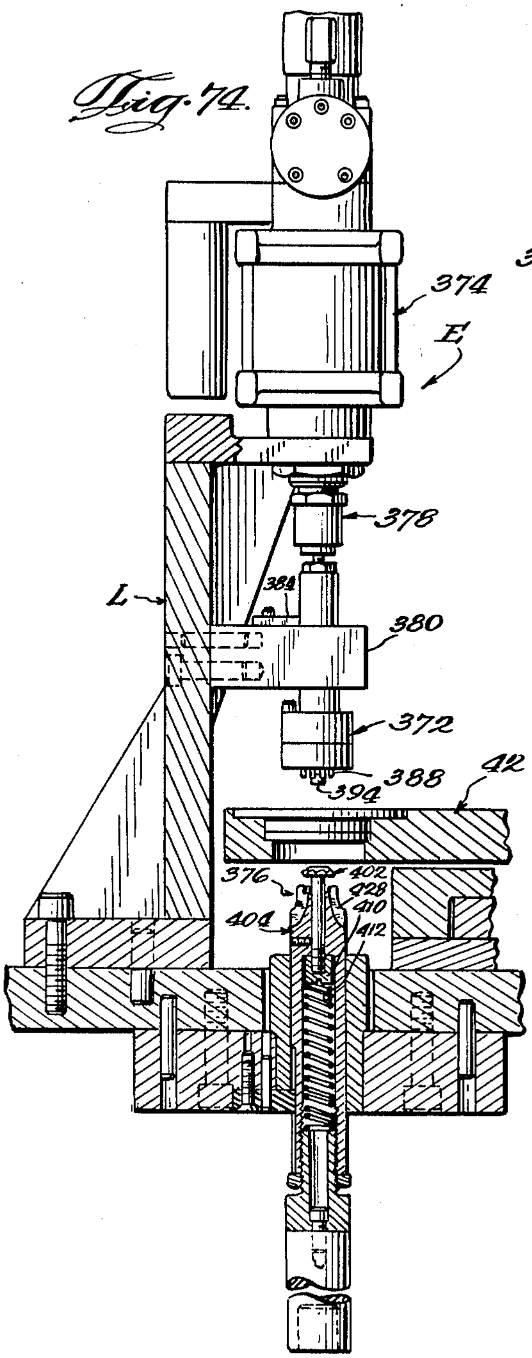
FIGURE 74 is a fragmentary sectional view taken along line 74—74 of FIGURE 73 but with portions shown in elevation.
Figure 73:
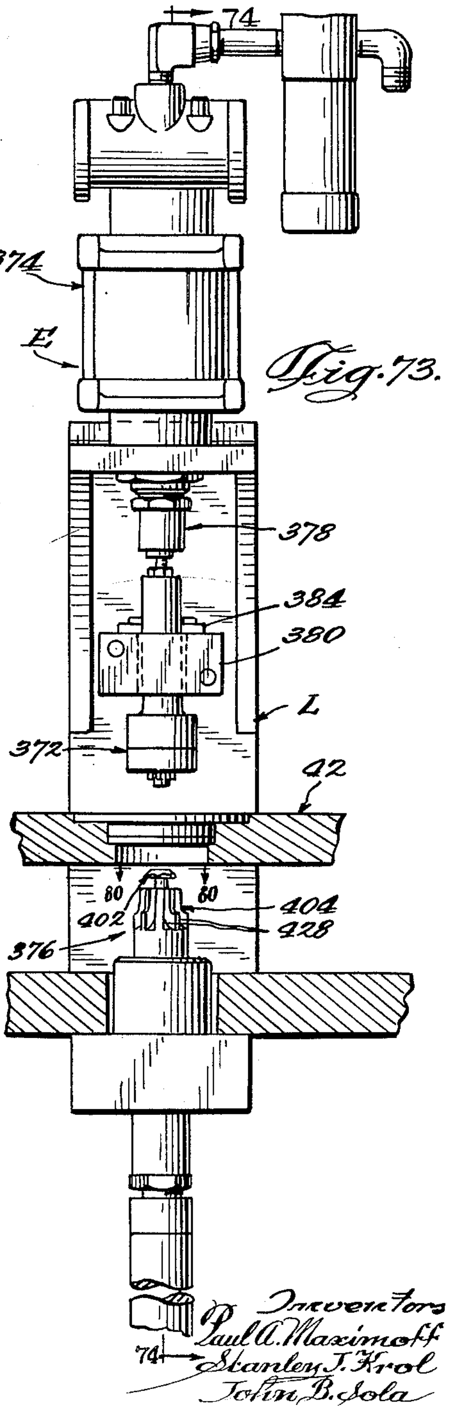
FIGURE 73 is a front elevational view of the contact forming mechanism of the socket machine of the present invention, with some parts shown in section.

When the contact testing mechanism D is actuated, the upper shoe 330 moves down and the lower shoe 334 moves up in such a manner that the contact fingers 348 of the upper shoe are resiliently pressed against the top ends of the seven contacts 12 in the socket body 10 before the contact pins 366 of the lower shoe engage the lower ends of the tails of the contacts. It will be noted that sufficient pressure is brought to bear so that the contact pins 348 are forced upwardly, as shown in FIGURE 70, to insure that the contacts 12 will be held in place when they are engaged by the lower contact pins 366. Because of the frustoconical formation of the end of the lower contact shoe 334, the tail ends of the contacts 12 are spread outwardly slightly as shown in FIGURE 70 to make certain that good electrical contact is provided with the contact pins.

When the contact shoes are in the actuated position as shown in FIGURE 70 a series circuit is formed through the seven contacts 12 in such a manner that if any one of the contacts is improperly placed or missing, the circuit will not be completed. This circuit is illustrated more or less schematically in FIGURES 71 and 72. They illustrate that the first spring contact 352 of the upper shoe is connected to the current source so that the current passes into the associated pin 348, through the contact 12 down to the contact pin 366 of the lower shoe directly therebelow and then into the contact springs 370 which is connected to the next contact spring 370. The circuit now travels up through that spring, through its associated pin 366, through the next contact 12, to the finger 348 directly thereabove, to the spring 352 above this contact finger, and then over to the next spring 352. This pattern continues so that the current travels back and forth between the upper and lower contact shoes through the successive contacts 12 until it reaches the last contact spring 370 of the lower shoe, which is grounded.

The electrical circuit of the contact testing mechanism D is connected to the control apparatus K in such a manner that if the series contact is not completed during actuation of the contact testing mechanism, the entire socket machine operation is stopped until the defective socket is removed and the machine is started again.

Thus, the contact testing mechanism D makes certain that all of the contacts are in place and are properly positioned before the transfer mechanism J is again cycled to move the tested socket body to the next station.

*Contact forming mechanism*

After the contact testing operation, the transfer mechanism is cycled and the tested socket body with inserted contacts is moved on to the contact forming station. As illustrated in the drawings, the particular machine shown provides two open stations between the mechanism D and the mechanism E, and these stations provide room for additional operations, if they should be necessary for the particular socket being assembled. In the present instance, however, no operations are performed at these stations, and the socket body which has been tested reaches the contact forming mechanism E after three cycles of the machine. However, it will be understood that a tested socket and contacts are disposed in each of the socket nests 56, so that the socket forming mechanism E operates on each cycle of the machine to form the contacts 12 to the configuration shown in FIGURES 3 and 4. The forming mechanism is specifically illustrated in FIGURES 73–80 of the drawings.

The contact forming mechanism comprises generally an upper holder ram 372 actuated by a pneumatic actuating cylinder 374, and a lower contact forming ram 376 actuated by a pneumatic actuating cylinder which is not shown.

The upper ram 372 is connected to the piston (not shown) of the actuating cylinder 374 by means of an adjustable throw shaft assembly 378. The ram has an elongated upper portion which is guided in a guide block 380 which is secured to a portion of the stationary frame L. An elongated keyway 382 is formed longitudinally in the upper portion of the ram 372 and a key 384, which is secured to the guide block 380, has its nose portion slidably riding in the keyway 382 in order to prevent rotation of the ram 372.

The lower portion of the ram 372 is provided with an enlarged head, and a bottom pad 386 is secured below the head. Seven contact press fingers 388 are disposed in conforming vertical apertures in the pad 386, in positions corresponding to the positions of the contacts 12 in the socket body 10 directly below. It will be noted that the fingers 388 are headed and the apertures containing the fingers conform closely to the finger configuration to fixedly retain the fingers with respect to the head of the ram 372.

A central aperture 390 is formed through the pad 386 and is axially aligned with a center bore 392 formed in the upper portion of the ram. A presser foot 394 is disposed in close fitting relation in the bore 390 and has an upper flange 396 riding in substantially conforming relation within the bore 392, which is slightly larger than the bore 390, so that the flange provides a stop for locating the presser foot 394 in its downward position. A compression spring 398 is disposed in the bore 392 above the presser foot 394 so that the presser foot is resiliently urged downwardly with the flange 396 normally at the bottom end of the bore 392 against the pad 386. At the lower end of the presser foot an enlarged pad 400 is formed, and this pad is of substantially the same diameter as the raised center flange of the socket body 10 at the upper end of the bore 28.

The lower, forming ram 376 of the contact forming mechanism E is comprised essentially of two parts, an initial forming punch 402 and a final forming punch 404. The initial forming punch is secured on a shaft 406 which is slidably disposed in a central vertical bore 408 of the lower punch 404. The lower end of the shaft 406 is threadedly secured to an enlarged diameter block 410 which is disposed in an enlarged diameter bore 412. A compression spring 414 is disposed in the bore 412 below the block 410 and resiliently urges the block upwardly so that it normally engages a shoulder 416 formed at the juncture of the bores 408 and 412. The first punch 402 is maintained in a predetermined circumferential relationship with the second punch 404 by means of a key 418 secured in the second punch 404 and having its inner end riding in a longitudinal keyway 420 formed in the shaft 406.

Figures 77, 78, 79, 80:
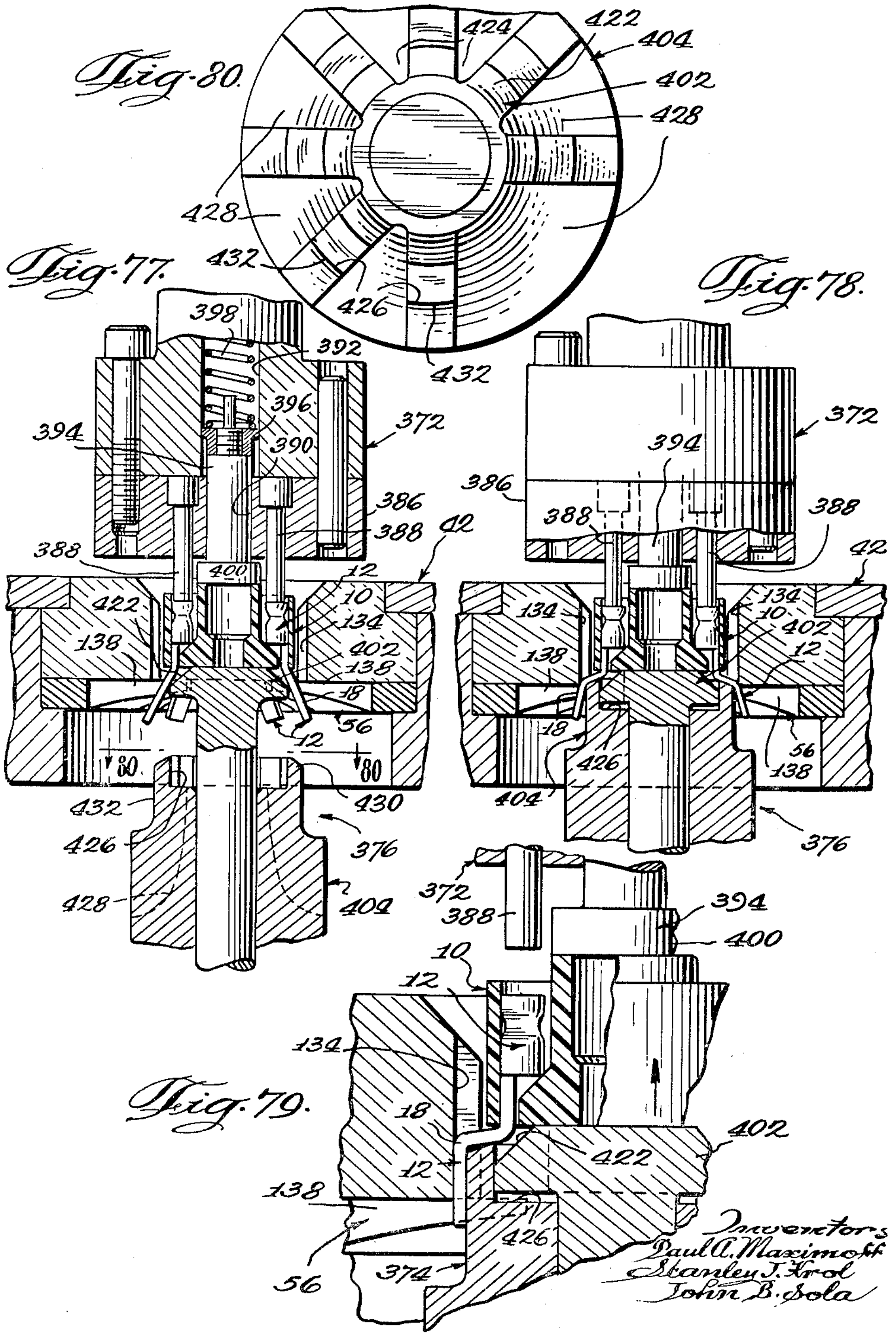
FIGURE 77 is a further enlarged fragmentary sectional view of a portion of the contact forming mechanism shown in FIGURE 75, and showing the mechanism in the partly actuated position.
FIGURE 78 is a fragmentary sectional view similar to FIGURE 77 but showing the contact forming mechanism further actuated in the operating cycle.
FIGURE 79 is a further enlarged fragmentary sectional view of a portion of the contact forming mechanism shown in FIGURES 77 and 78 and illustrating the mechanism in its fully actuated condition.
FIGURE 80 is an enlarged fragmentary elevational view taken along line 80—80 of FIGURE 73.

The first punch 402 has a frusto-conical end face 422 which is adapted to initially engage the tail portions 18 of the contacts 12 to bend them to the position shown in FIGURE 77. Clearance notches 424 (FIGURE 80) are formed about the periphery of the first punch 402 to provide clearance for the feet 36 of the socket body and for the inner ends of the socket support fingers 138 of the socket nest 56 when the upper flat end of the first punch comes up against the lower surface of the socket body (as shown in FIGURES 77, 78 and 79).

The upper end of the the second punch 404 is recessed at 426 to receive the first punch 402 when it is depressed into the second punch as illustrated in FIGURES 78 and 79. The second punch also is provided with clearance notches for the support fingers 138 of the socket nest in the form of deep flutes 428 formed directly below the notches 424 in the first punch. The upper end of the second punch has a shallow frusto-conical face 430 to initially form the joggle in the tail portions 18 of the contacts 12, as seen in FIGURE 78. The rib portions 432 formed between the flutes 428 are of proper width to fit in the clearance notches 134 in the socket nests 56 with the thickness of the material of the tail portions 18 of the contacts 12 therebetween, as illustrated in FIGURE 79, to provide the final joggle form in the contact tails.

Figures 75, 76:
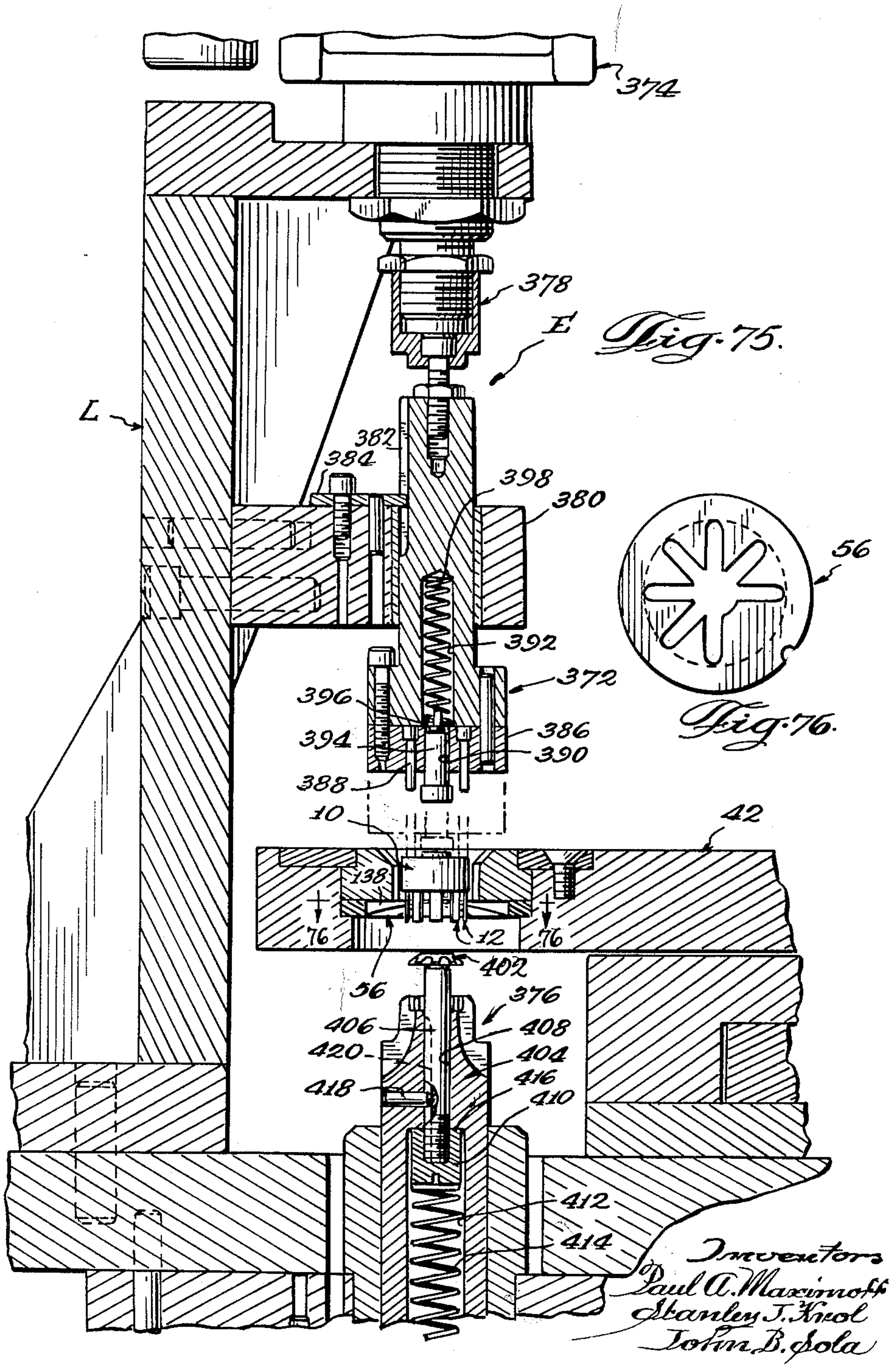
FIGURE 75 is an enlarged fragmentary sectional view of a portion of the contact forming mechanism of FIGURE 74.
FIGURE 76 is a sectional view taken along line 76—76 of FIGURE 75 but illustrating only the insulator body supporter plate in the transfer mechanism.

When the contact forming mechanism E is actuated, the upper holding ram 372 first moves down to the position shown in dotted lines in FIGURE 75, which corresponds to the position shown in FIGURE 77. At this point the contact holding fingers 388 engage the upper ends of the contacts 12, and the presser foot 394 engages the central portion of the socket body 10 and is moved resiliently upwardly as shown in FIGURE 77 to hold the socket body down in the socket nest.

With the upper ram 372 in place, the forming ram 376 moves then up and the first operation performed is the initial outward bending of the tail portions 18 of the contacts 12 by the first punch 402, as shown in FIGURE 77. The forming ram 376 continues to move upwardly after the end of the first punch 402 engages the lower surface of the socket body 10, so that the first punch is telescoped within the second punch and the second punch performs the second forming operation of the tail portions 18 as shown in FIGURE 78. At this point the upper holder ram 372 moves upwardly slightly to the position shown in FIGURE 79 to raise the contact fingers off of the contacts. This permits the forming ram 376 to move upward an additional distance, which forces the tail portions 18 of the contacts into the forming grooves 134 of the socket nest 56 to form the tail portions to the finished configuration shown in FIGURES 3 and 4. After this final forming operation both of the rams 372 and 376 move back to their unactuated positions leaving the socket body with contacts having finally formed tail portions.

Thus, the contact forming operation is also performed completely automatically as was the case with all of the previous operations.

*Center shield feeding and insertion mechanism*

After the tail portions of the contacts have been finally formed at station E, the control apparatus K is actuated to shift the turntable 42 one station in a clockwise direction to place the socket body with formed contacts in position for the center shield insertion operation. The center shield feeding and insertion mechanism F is specifically illustrated in FIGURES 81 through 96.

The mechanism F includes, in general, a center shield feeding component 434 and a center shield insertion component 436. The feed component 434 is adapted to receive a multitude of center shields to orientate the center shields and to feed them in single file to the insertion component 436, which inserts them one at a time into the successive socket bodies as the socket machine is cycled.

The center shield feeding component 434 includes a vibratory feeder 438 of the vibratory swirly type, quite similar to the vibratory feeders 60 and 172 of the socket body station A and the contact insertion station C, respectively. The vibratory feeder comprises a lower vibrator portion 440, supported on the base plate 38 of the stationary frame L, and an upper bowl portion 442 which is carried and vibrated by the vibrator portion 440. As was the case with the previously described vibratory feeders, the bowl 442 includes a spiral feed ramp or ledge 444 which carries center shields in a gradual, climbing spiral path from the floor 446 of the bowl up to a bowl exit 448. Here orientated center shields are delivered to a center shield chute 450, which carries the center shields in abutting single file and delivers them to the insertion component 436. However, the vibrations of the swirl feeder 438 are such that the center shields swirl in a clockwise direction rather than a counterclockwise direction as is the case with the earlier described swirl type feeders.

As best seen in FIGURES 81–86, the ramp 444 receives a multitude of center shields 14 and carries them from the floor of the bowl around the inner periphery of the bowl for about 1¼ turns, gradually lifting the multitude of center shields, until they reach an orientating assembly 452. The orientating assembly includes a base plate 454 having its upper surface on a level with the adjacent adge of the ramp 444 and having a vertical orientating slot 456 formed therein. Along the outer edge of the slot a rail 458 is formed in order to prevent center shields from passing radially outwardly of the slot. It will be noted that the rail 458 is gradually bevelled at its start in order to lead the center shields toward the slot and to allow excess shields to fall off the base plate 454, back onto the lower ramp 444 therebelow.

Figures 83, 84, 85, 86:
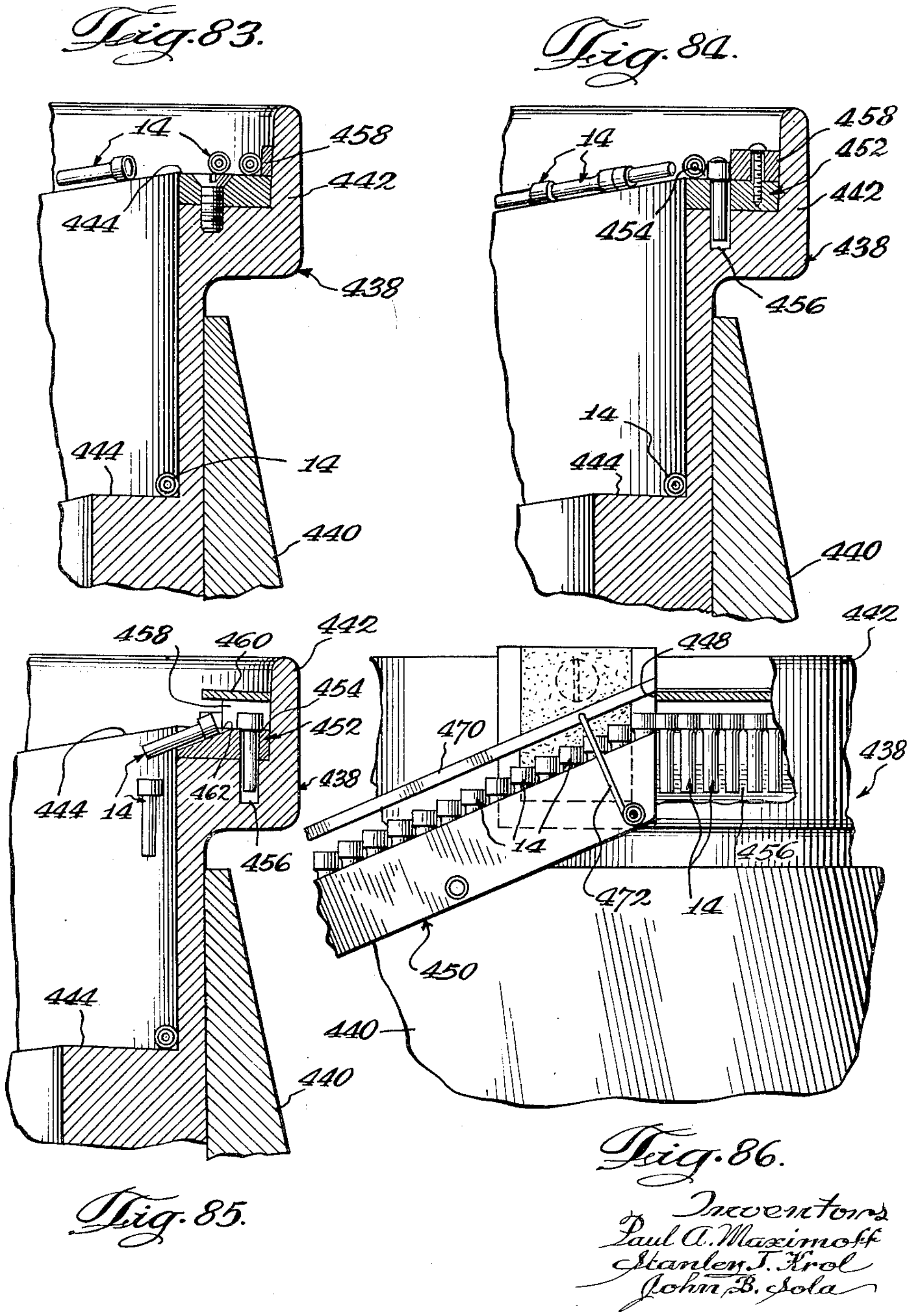
FIGURE 83 is an enlarged fragmentary sectional view taken along line 83—83 of FIGURE 81.
FIGURE 84 is an enlarged fragmentary sectional view taken along line 84—84 of FIGURE 81.
FIGURE 85 is an enlarged fragmentary sectional view taken along line 85—85 of FIGURE 82.
FIGURE 86 is an enlarged fragmentary elevational view taken along line 86—86 of FIGURE 81.

As the center shields reach the initial portion of the orientating slot 456 some of the shields begin to drop into the slot tail down, as shown in FIGURE 84, and excess shields continue to drop off the base plate 454 back to the ledge 444 therebelow, or down into the bottom of the bowl.

Figures 81, 82:
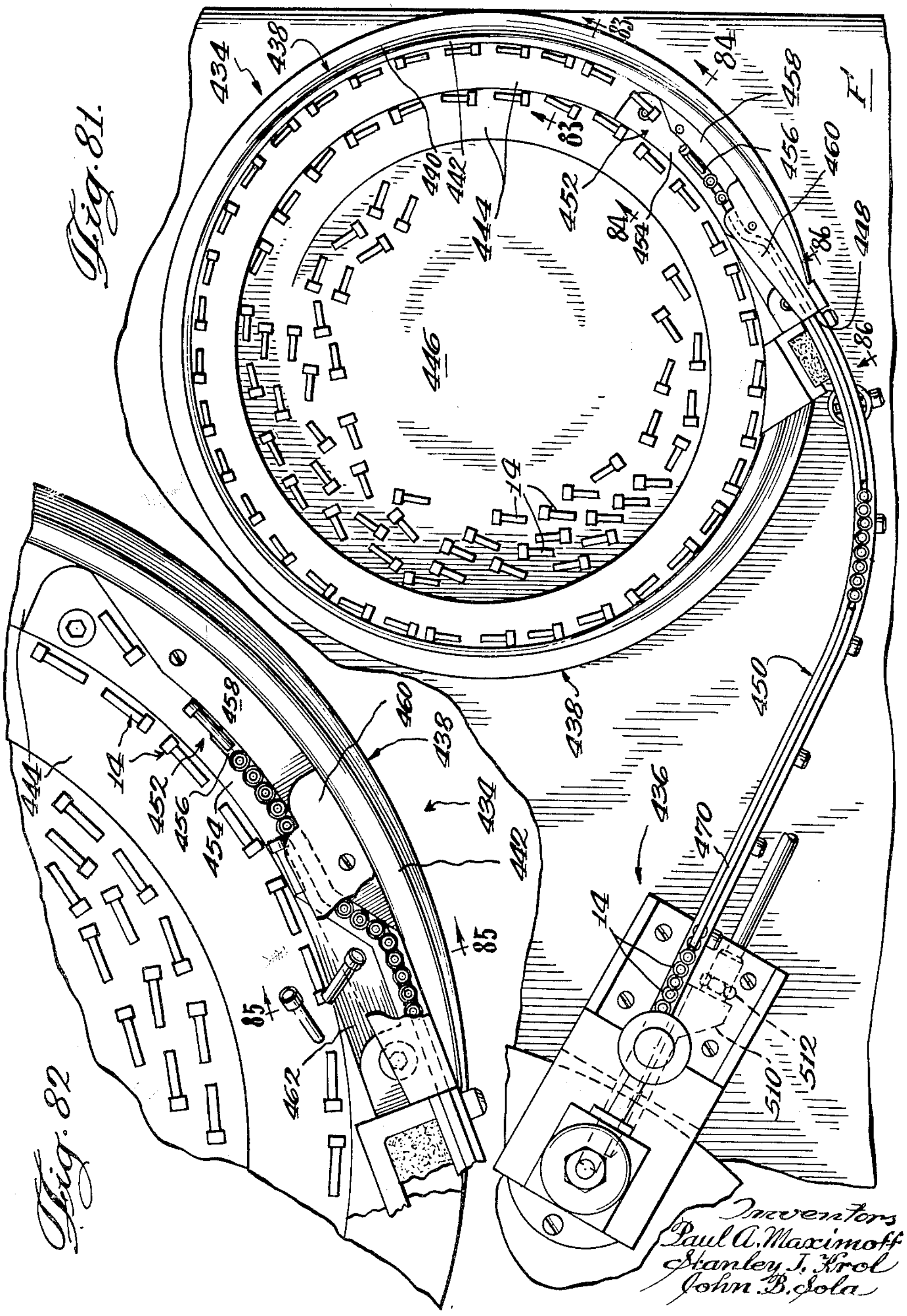
FIGURE 81 is a fragmentary enlarged top plan view of the center shield feeding and insertion mechanism portion of the socket machine of the present invention.
FIGURE 82 is a further enlarged fragmentary view of a portion of the center shield feeding mechanism shown in FIGURE 81.

It will be understood that a multitude of center shields are carried on the base plate and some may be carried on top of others which are properly orientated with their tails down in the slot 456. The excess center shields which are carried on top of orientating shields are wiped off shortly after the beginning of the slot by a top plate 460 which is carried on top of the rail 458 and overhangs the slot 456 in cantilever fashion, as best seen in FIGURES 82 and 85. Since only one center shield at a time can pass under the cover plate 460, excess shields are swept back into the bowl. As the slot progresses it slants outwardly toward the edge of the bowl, as best seen in FIGURES 81, 82 and 85, and at the same time the inner edge of the base plate 454 is canted inwardly at 462 so that excess center shields 14 which have been carried next to orientated shields now slide off back into the bowl.

After passing the orientating assembly 452 the only center shields which remain are carried in the slot or track 456 in single file and in abutting relation, as best seen in FIGURE 86. These properly orientated center shields then pass on to the bowl exit 448 where they are delivered to the center shield chute 450.

Figures 87, 88, 90:
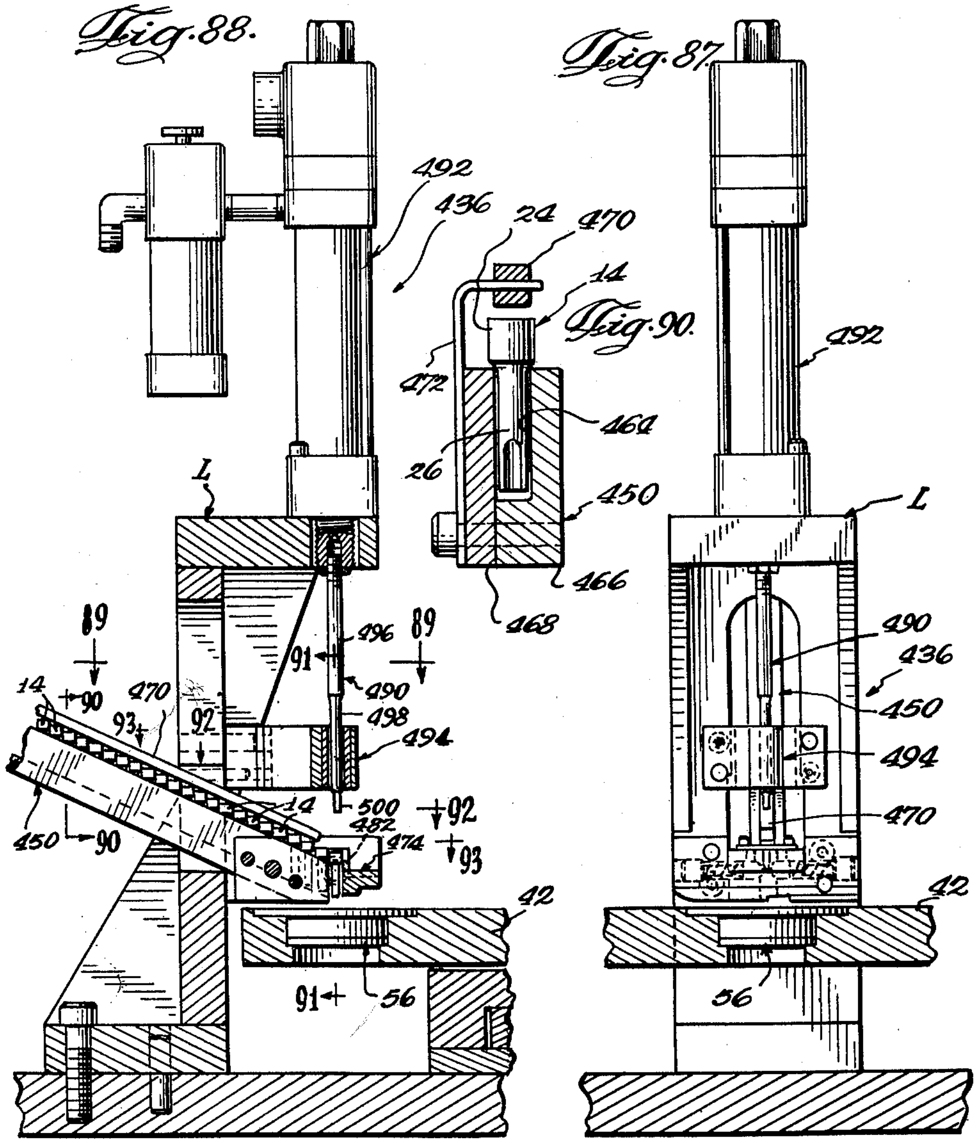
FIGURE 87 is a fragmentary front elevational view of the center shield insertion mechanism portion of FIGURE 81.
FIGURE 88 is a side elevational view of the center shield insertion mechanism of FIGURE 87 with some parts shown in section.
FIGURE 90 is an enlarged fragmentary sectional view taken along line 90—90 of FIGURE 88.
Figure 89:
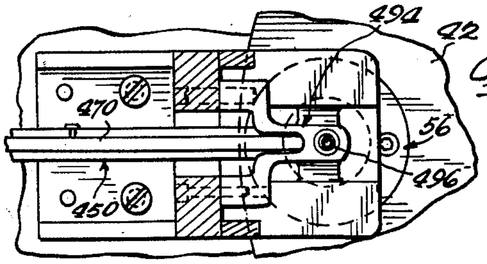
FIGURE 89 is a fragmentary sectional view taken along line 89—89 of FIGURE 88.

The chute 450 is quite similar in construction to the chute 184 of the contact station C and, as best seen in FIGURE 90, includes a vertical slot or track 464 formed by a pair of side members 466 and 468. The slot 464 is of sufficient width to carry the tail portions 26 of the center shields with clearance but is too narrow to receive the heads 24, so that the orientated center shields are carried down the chute 450 as shown in FIGURES 81, 86 and 88. In order to prevent the center shields from inadvertently jumping out of the chute a keeper bar 470 is disposed over the tops of the center shields in spaced relation and is supported in this position by a plurality of spring fingers 472.

Figures 91, 92, 93:
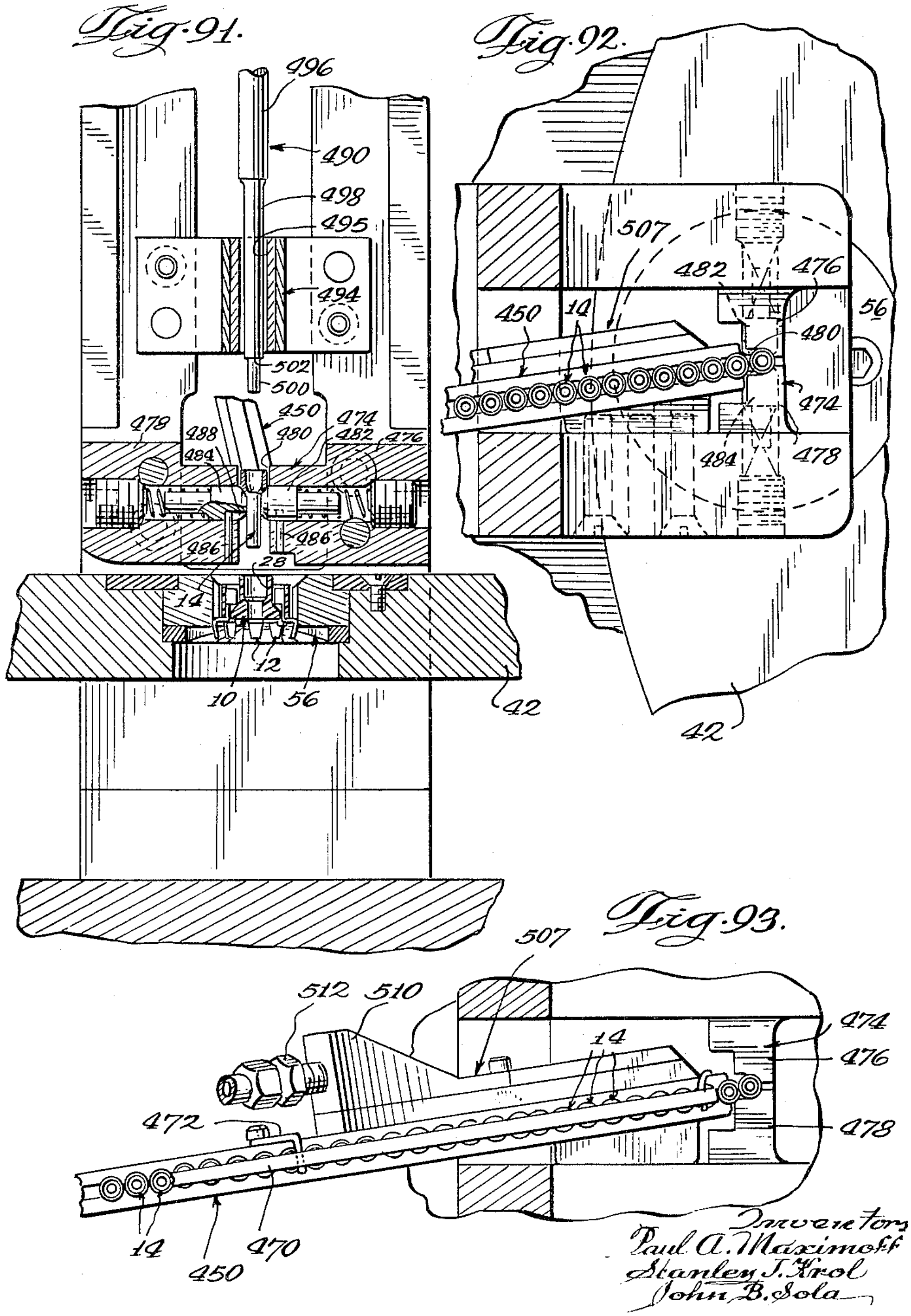
FIGURE 91 is an enlarged fragmentary sectional view taken along line 91—91 of FIGURE 88.
FIGURE 92 is an enlarged fragmentary sectional view taken along line 92—92 of FIGURE 88.
FIGURE 93 is an enlarged fragmentary sectional view taken along line 93—93 of FIGURE 88.
Figure 94:
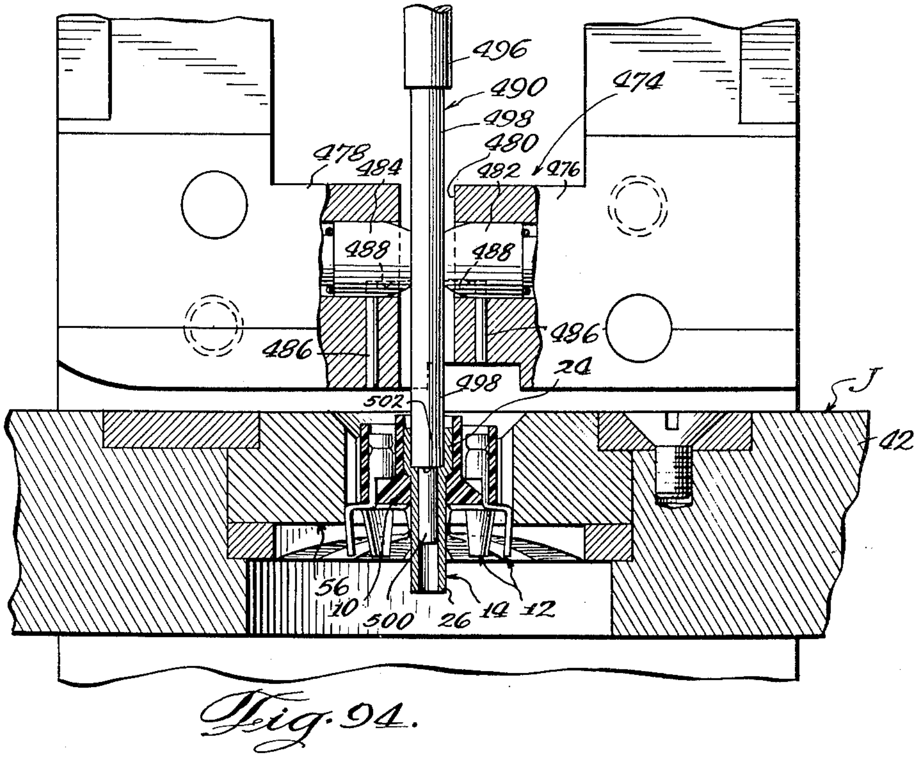
FIGURE 94 is a further enlarged fragmentary view similar to FIGURE 91 but showing the center shield insertion mechanism at the end of its operation.
Figures 95, 96:
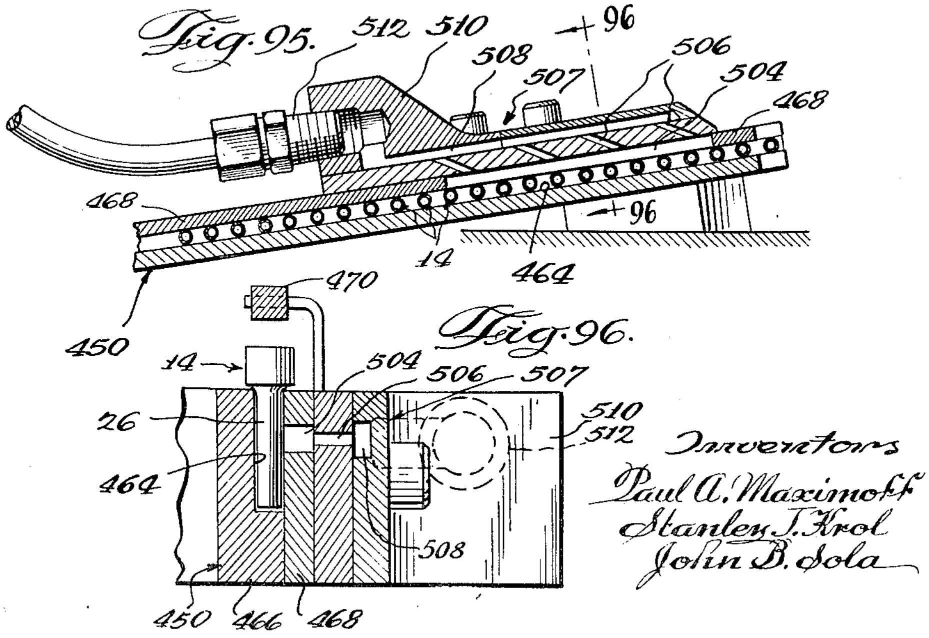
FIGURE 95 is an enlarged fragmentary sectional view of the same portion of the center shield insertion mechanism shown in FIGURE 93 but taken at a slightly different angle and illustrating the air inlet passages.
FIGURE 96 is a fragmentary sectional view taken along line 96—96 of FIGURE 95.
Figures 97, 98:
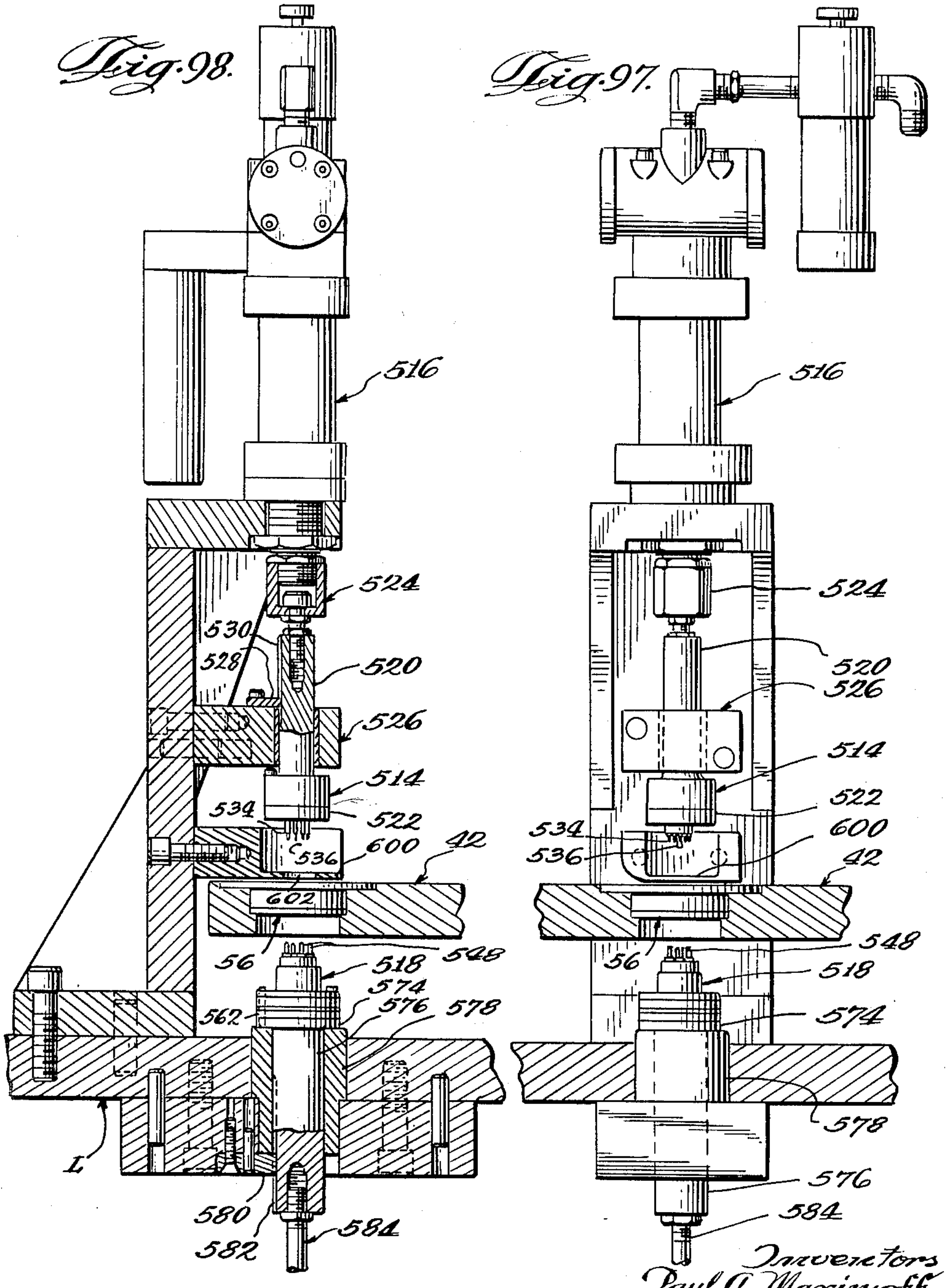
FIGURE 97 is an enlarged fragmentary front elevational view of the final inspection and contact sizing mechanism of the socket machine of the present invention, with some parts shown in section.
FIGURE 98 is a side view of the final inspection and contact sizing mechanism shown in FIGURE 97 with additional parts in section.

The center shield track 450 delivers the orientated center shields to a receiver assembly 474 which comprises, essentially, a pair of spaced blocks 476 and 478 having a center shield gap 480 therebetween. The gap 480 is of sufficient width to receive the heads of successive center shields, with clearance, up to a predetermined position which is directly above the center of a socket body 10 which has been carried by the turntable 42 from the preceding contact forming station E. At this position the gap is narrowed so that the center shields can move no further, and the center shield first in line is received between a pair of spring pressed plungers 482 in the block 476 and 484 in the block 478, as best seen in FIGURES 91 and 92.

The plungers 482 and 484 are so located and so formed that they receive the tail portion of the leading center shield with slight clearance between their opposed ends, but they are close enough to retain the heads to prevent the center shield from dropping down between them. Stop pins 486 are secured in the respective blocks 476 and 478 directly below the plunger and are engaged in stop slots 488 (FIGURES 91 and 94) formed in the respective plungers 482 and 484 in such a position that the plungers are prevented from moving inwardly toward each other beyond positions which provide a gap therebetween slightly greater than the width of the shanks of the center shields.

In order to insert center shields one at a time into the respective socket bodies, a center shield insertion plunger 490 is disposed in vertical relation directly above the center shield in the receiving assembly 474. The plunger 490 is adjustably secured to the piston (not shown) of a pneumatic actuating cylinder 492 which is supported on a portion of the stationary frame L directly above the receiving assembly 474, as best seen in FIGURES 87 and 88. Between the cylinder 492 and the receiver assembly 474 the insertion plunger 490 is supported by a support bracket 494 which is fixedly secured to a portion of the stationary frame L.

It will be noted that the plunger 490 comprises an enlarged portion 496, an intermediate stepped-down portion 498, and a reduced diameter nose portion 500, with a shoulder 502 formed between the nose 500 and the intermediate stepped portion 498. When the plunger 490 is moved downwardly by the actuating cylinder 492, the nose portion 500 enters the tail 26 of the center shield disposed between the plunger 482 and 484 and travels downwardly until the shoulder 502 engages the inner shoulder formed between the head 24 and the tail. As the plunger continues its downwardly movement, the spring-pressed stop plungers 482 and 484 are spread apart to allow the head of the center shield to pass by, thus permitting the plunger 490 to carry the center shield down into the center aperture 28 in the waiting socket body 10.

The axial position of the plunger 490 is so arranged with respect to the stroke of the actuating cylinder that the center shield is carried down and firmly seated in the socket body. When the plunger is withdrawn, the center shield is properly assembled in the socket body. The plunger is loosely received in the center shield while the center shield itself is lightly press-fitted in the socket body, so that there is no danger of the center shield being withdrawn with the plunger. However, if the entire socket body should tend to move up with the plunger, the receiver assembly acts as a stripper to strip the socket body from the plunger so that it will drop back into the nest 56.

It will be noted that the intermediate shank 498 of the insertion plunger 490 is of smaller diameter than the aperture 495 of the support bracket 494, but this aperture is of a size to snugly receive the upper shank portion 496 to support the plunger when the plunger end engages the center shield. Prior to this time there is no load on the insertion plunger so that support is unnecessary.

In order to insure that for the center shields 14 are properly fed to the receiver assembly 474, just before the center shields reach the receiver assembly the side plate 468 of the chute 450 (see FIGURES 95 and 96) is formed with an elongated slot 504 which communicates with four slanted air passages 506 formed in an air blast fitting assembly 507. The air passages 506 are directed down the track 464 and communicate with an air groove 508 in a fitting member 510. An air hose fitting 512 is connected to the fitting 510, and compressed air is communicated to the groove 508. Thus, an air blast is directed through the elongated slot 504 against the tails 26 of the center shields, toward the receiving assembly 474, in order to urge the center shields toward the receiver assembly and to insure that the receiver assembly will always be supplied with a center shield after each stroke of the insertion plunger 490.

After the insertion plunger 490 has completed its return stroke back to the position shown in FIGURES 87, 88 and 91, the center shield insertion cycle is completed and the transfer mechanism J cycles the turntable 42 to place another socket body 10 in position for insertion of a center shield. The socket body with inserted shield passes on to the final inspection and contact sizing station G.

Thus, the entire center shield feeding and insertion operation is completely automatic and is performed in timed sequence with the other mechanisms of the socket machine through the control apparatus K. No manual operation need be performed except to see that the feed bowl 442 is kept supplied with sufficient center shields.

*Final inspection and contact sizing mechanism*

The final inspection and contact sizing mechanism G is best illustrated in FIGURES 97–105. This mechanism includes, generally, an upper contact and sizing shoe assembly 514 actuated by a pneumatic actuating cylinder 516, and a lower contact shoe assembly 518 actuated by a pneumatic actuating cylinder which is not shown. When a socket body 10 within inserted contacts 12 and a center shield 14 is properly placed at the final inspection station, the upper shoe 514 is directly above the socket body and the lower shoe 518 is directly below.

The upper contact shoe 516 comprises a shank portion 520 and a head portion 522 therebelow. The shank portion is connected by adjustable connection means 524 to the piston (not shown) of the actuating cylinder 516. The shank is guided in a buide bracket 526, and a key 528 is carried by the guide bracket and engages a vertical keyway 530 in the shank 520 in order to prevent rotation of the contact shoe 516 but to allow reciprocation thereof.

The head 522 includes an integral metallic upper portion and a lower metallic plate portion 532 which is fixedly secured to the upper portion. The plate portion carries seven metallic contact pins 534 disposed in a pattern directly above the contacts 12 in the socket body 10, and a metallic center shield pin 536 directly above the center shield in the socket body. The contact pins 534 are fixedly secured in the head portion as shown, but the center shield pin 536 has a shank slidably retained in a center aperture 538 in the plate 532. An enlarged head portion 540 of the pin 536 is disposed in an enlarged bore 542 formed in the integral head portion, and a compression spring 544 acts between the blind end of the bore 542 and the head 540 of the center shield pin to normally resiliently retain the head against the opposing shoulder formed at the juncture between the plate 532 and the bore 542.

The lower contact shoe 518 includes a rigid body portion 546 which is formed of any suitable electrical insulating material and which contains seven metallic contact pins 548 and a metallic center shield pin 550. The contact pins are disposed in the same pattern in the contacts 12 in the socket body 10 and are directly therebelow. These contact pins each have a reduced diameter shank slidably extending through mating vertical apertures in the upper end of the body 546 with portions of the apertures being defined by suitable metallic bushings 552. At their lower ends the contact pins 548 are provided with enlarged integral head portions 554 which are slidably retained in vertical bores 556 formed in the socket body.

At the lower ends of the bores 556 metallic contact shoes 558 are disposed and these shoes rest on an insulator plate 560 which is formed of suitable electrical insulating material. The plate 560 is sandwiched between the insulator body 546 and a metallic backing plate 562. Metallic compression springs 559 are disposed between the pin heads 554 and the contact shoes 558 to normally resiliently retain the heads at the upper ends of the bores 556 and to provide electrical conducting paths between the respective pins 548 and shoes 558.

The center shield pin 550 is also provided with a reduced diameter shank riding in a vertical aperture in the center of the insulating body 546, with a suitable wear bushing 564 slidably retaining the shank of the pin. An enlarged diameter head 566 is formed at the lower end of the center shield pin 550 and is slidably disposed in a mating vertical bore 568. The bore 568 has a metallic contact shoe 570 at its bottom end and a metallic compression spring 572 is disposed in the bore to normally hold the head 566 resiliently against the upper end of the bore 568 and to also provide an electrical conducting path between the center shield pin and the shoe 570.

To complete the construction of the lower shoe 518 the plate 562 rests on an enlarged head 574 of a shaft 576 which is slidably carried in a vertical bushing 578 (FIGURE 98) fixedly secured in a portion of the stationary frame L. A key 580 is secured to the stationary frame and has a portion riding in a vertical keyway 582 formed in the shank 576 in order to prevent rotation of the shank but to allow reciprocation. An adjustable connector 584 secures the lower end of the shank 576 to the piston of a pneumatic actuating cylinder (not shown).

Figures 101, 102, 103, 104, 105:
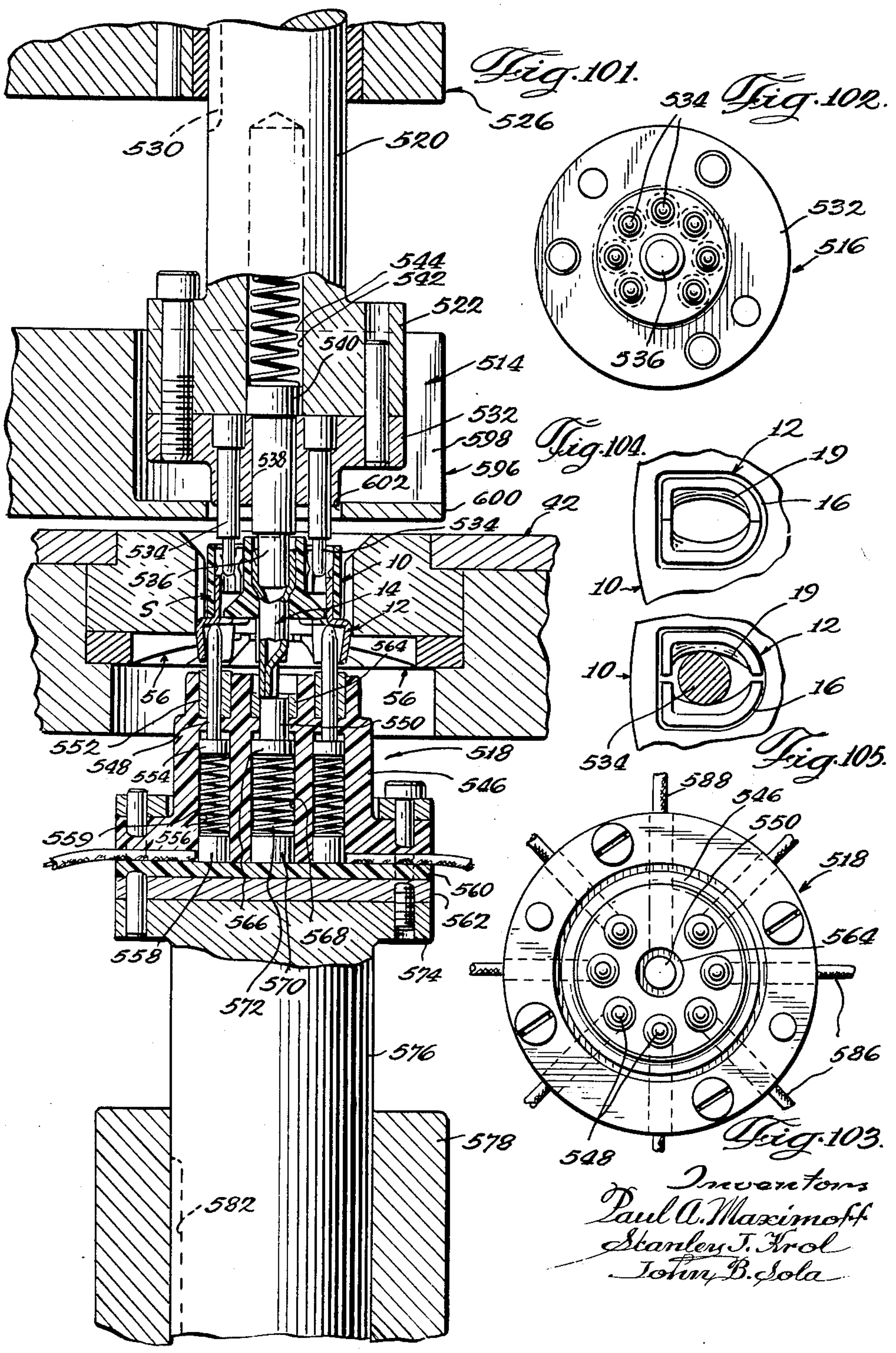
FIGURE 101 is a further enlarged fragmentary sectional view of the mechanism shown in FIGURE 99 but showing the mechanism in its fully actuated position.
FIGURE 102 is an enlarged fragmentary elevational view taken along line 102—102 of FIGURE 99.
FIGURE 103 is an enlarged fragmentary elevational view taken along line 103—103 of FIGURE 99.
FIGURE 104 is a greatly enlarged end elevational view of one of the socket contacts in position in the socket body before sizing.
FIGURE 105 is a greatly enlarged end elevational view similar to FIGURE 104 but showing the sizing pin of the sizing mechanism inserted in the contact.

A separate electrical control circuit of the control apparatus K is connected to each of the lower contact pins 548 and the center shield pin 550. These circuits are connected to the respective contact pins by means of respective wiring leads 586 and to the center shield pin 550 by a wiring lead 588 (FIGURES 101 and 103). The respective circuits are connected to indicator lights 590 for the contact pins and 592 for the center shield pin (FIGURE 2), which are carried by a control panel 594 of the control apparatus K. The separate leads and circuits are also connected to a "memory" circuit (not shown) of the control apparatus for a purpose to be described.

When a completed socket is disposed at the final inspection station G and the mechanism is actuated, the upper and lower shoes 516 and 518 move toward the socket until the lower ends of the upper contact pins 534 enter the apertures in the contacts 12 while the lower end of the center shield pin 536 enters the upper end of the center shield 14. This provides electrical contact with all seven pins and the center shield through the upper contact shoe. Simultaneously, or shortly thereafter, the lower contact pins 548 move up against the respective contacts 12 and the lower center shield pin 550 abuts the lower end of the center shield 14. The lower shoe 518 moves up sufficiently that the springs 559 and 572 are compressed, as shown in FIGURE 101, in order to insure a good electrical contact.

The upper shoe 516 is grounded so that a separate electrical circuit is formed through each of the separate contacts 12 and the center shield 14. These circuits are connected through the respective lights 590 and 592 on the control panel 594. If any one of the connectors is missing, its associated light will not light to indicate that the socket is defective.

At the same time completion of all of the circuits energizes the memory circuit in the control apparatus, so that upon the next cycling of the machine the defectve part rejection mechanism H is not actuated and instead, at the next cycling, the finished part acceptance mechanism I is actuated to accept the good part.

If, on the other hand, one of the circuits is not completed, the memeory circuit actuates the defective part rejection mechanism H upon the next cycling of the machine (immediately after the final inspection station G) to reject the defective part.

The control apparatus K can also be arranged to automatically stop operation of the machine if a defective part is detected in the final inspection station G.

Figures 99, 100:
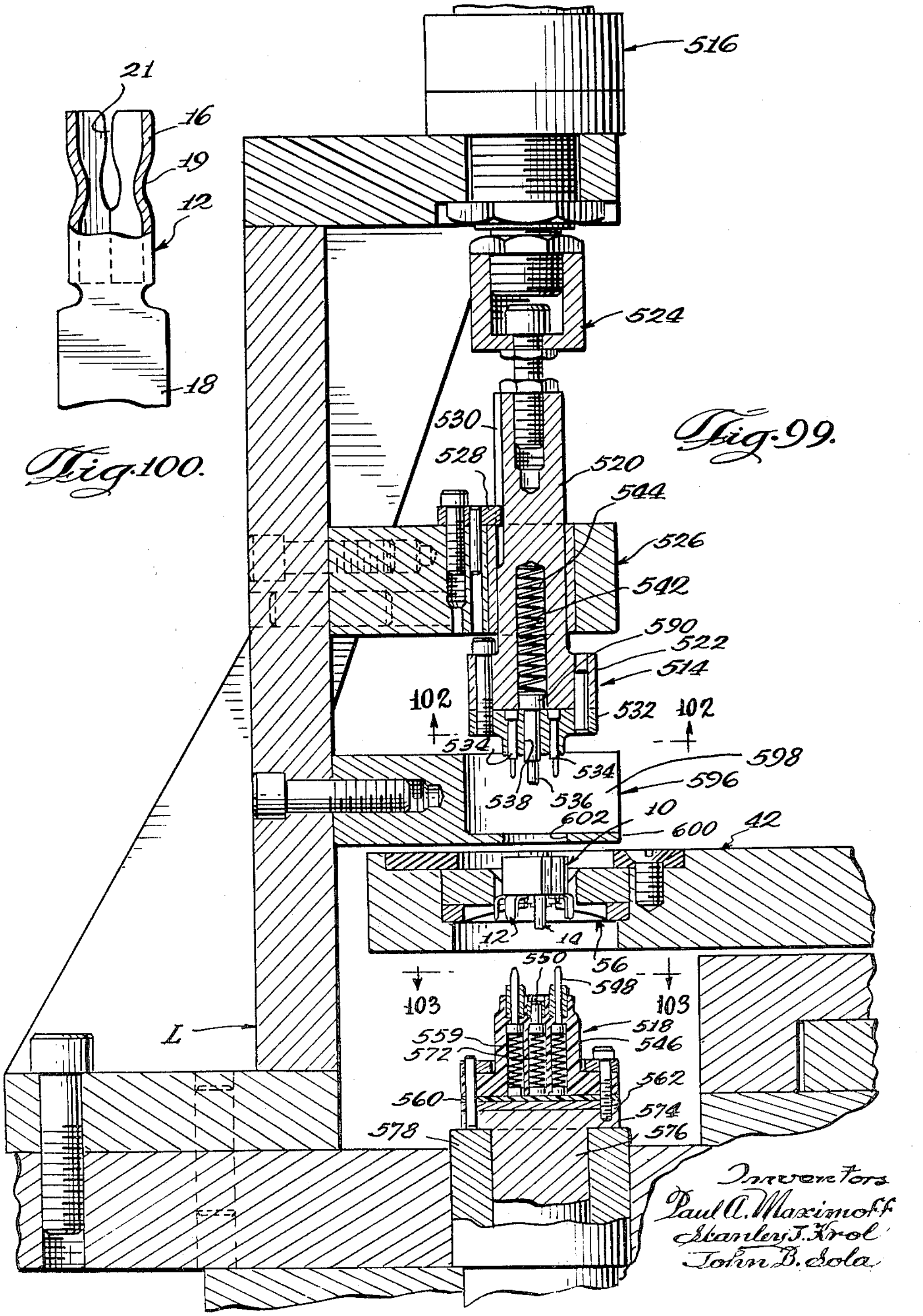
FIGURE 99 is an enlarged fragmentary view of a portion of the mechanism shown in FIGURE 98.
FIGURE 100 is a greatly enlarged fragmentary view of the upper portion of one of the contacts showing the portion to be sized.

In addition to the final inspection operation the mechanism H performs another important function in sizing the apertures through the necks 19 of the head portions 16 of the contacts 12. FIGURE 104 is a greatly enlarged top view of a contact 12 before proper sizing. FIGURE 105 illustrates the contact as it is being sized by the end of the contact pin 534. FIGURE 100 is an enlarged view of the head portion showing the neck after it has been properly sized, illustrating that the two halves of the head are separated at a split 21. After correct sizing the contacts will properly receive inserted connectors of an electronic tube or the like (not shown) but if they were not properly presized, insertion of the connectors would be difficult and might result in damage to the electronic tube.

After the inspection and sizing operation has been performed and the upper contact shoes 516 are raised, it tends to carry the socket body upwardly with it. Consequently, a stripper bracket 596 is secured to a portion of the stationary frame L immediately above the socket nest 516 at the final inspection station. The bracket 596 is provided with a large cavity 598 which receives the upper contact shoe 516 with clearance, and a thin web 600 defines the bottom of the cavity. The web 600 has an aperture 602 of sufficient size to provide clearance for the lower end of the plate 532 of the upper contact shoe and to allow the contact pins 534 and the center shield pin 536 to extend down into the socket body, as illustrated in FIGURE 101. However, the aperture 602 is not of sufficient size to pass the socket body 10, because of the radially extending locating tab 34, and when the socket body strikes the lower surface of the web 600 it is stripped from the pins 534 and 536 and drops back into the socket nest 56.

Consequently, it will be seen that the final inspection and contact sizing mechanism G performs the final inspection operation completely automatically and at the same time automatically sizes the aperture in the contacts 12. Furthermore, the final inspection mechanism actuates a memory circuit in the control apparatus K to signal either the defective part rejection mechanism H or the finished part acceptance mechanism I to reject defective parts and to accept good parts as they are brought to these respective stations. In addition, the final inspection station energizes the indicator lights on the control panel 594 to automatically provide a visual indication of the part condition.

*Defective part rejection mechanism and finished part acceptance mechanism*

The mechanism H and I for rejection of defective parts and accepting finished parts, respectively, are substantially identical, and, consequently, only the finished part acceptance mechanism is shown in detail in FIGURE 106.

The mechanism I comprises an ejection plunger 604 which is vertically disposed below the finished socket S in the socket nest 56 at the finished part acceptance station, and which is adapted for being reciprocated by a pneumatic actuating cylinder 606 which is mounted below the base plate 38. The ejection plunger 604 is guided in a bushing 608 which is secured on top of the base plate 38. The mechanism I also includes on ejection nozzle 610 connected to an air control valve 612 which, in turn, is connected by means of a conduit 614 to a suitable source of compressed air (not shown). The nozzle 610 is arranged to direct a blast of compressed air across the upper face of the socket nest 56 in the final inspection station and to direct this air blast into an acceptance tube 616 which extends down through the base plate 38 and out an aperutre in the apron 40 below the base plate.

When a good socket assembly *s* is moved by the turntable 42 to the finished part acceptance station, the control apparatus K actuates the mechanism I through the memory circuit previously mentioned to actuate the cylinder 606 to move the plunger upwardly to push the completed socket S up out of the socket nest 56. At the same time the air valve 612 is actuated to direct an air blast through the nozzle 610 to blow the finished part along the tube 616, so that it drops down and passes out to a waiting container (not shown).

The defective part rejection mechanism is substantially identical to the mechanism I, the only difference being that the mechanism H is actuated only when a defective part is detected by the final inspection mechanism G. Otherwise, the finished part acceptance mechanism I is actuated at each cycling of the socket machine.

*Conclusion*

The socket machine of the present invention provides a completely automatic handling, assembly, inspection, and rejection or acceptance of tube socket assemblies for use in electronic circuits. The only manual operations required are the supplying of the socket loading mechanism A with sockets, the supplying of the contact loading mechanism C with contacts, and supplying of the center shield loading mechanism F with sufficient center shields for continuous operation of the machine. All handling, orientation, sizing, part insertion and forming inspection and acceptance or rejection of finished parts is handled completely automatically once the machine is started. Consequently, a single operator can handle a number of such automatic socket machines, each producing a completed socket every second or so. The machine obviously accomplishes a tremendous saving in labor and handling of parts. In addition, all accepted parts must be perfect.

In addition to the invention involved in the completely co-ordinated and intricately operated mechanisms of the machine, many inventive features reside in the separate mechanisms themselves.

Variations and modifications may be effected without departing from the scope of the novel concepts of the present invention.

We claim:

1. In an assembling machine, mechanism for loading electrical contact elements in properly orientated relation in apertures in an insulator body comprising a stationary frame, a loading shaft disposed in vertical relation on said frame and having a plurality of axially disposed, circumferentially spaced loading channels therein each with a configuration generally conforming in cross-section with the largest cross-section of the contact elements, means for successively moving insulator bodies into a predetermined position relative to said loading shaft with the apertures aligned with the loading channels in said shaft, means for placing a contact element in generally conforming relation in each of said loading channels, means for retaining said contact elements in said channels, and plunger means for simultaneously pushing the contact elements in the loading channels into the aligned apertures in the insulator body disposed in said predetermined position.

2. Mechanism for loading a predetermined number of elongated electrical contact elements in properly orientated relation in a corresponding number of apertures in respective insulator bodies comprising a stationary frame, a loading shaft carried in vertical relation on said frame and having vertical loading channels therein corresponding in number to the number of apertures per insulator body, each of said channels having a configuration generally conforming in cross-section with the largest cross-section of the contact elements, means for successively moving insulator bodies into a position below said loading shaft with the apertures aligned with the loading channels in said shaft, drive means for intermittently rotating said loading shaft one complete turn in one direction, means carrying a multitude of contact elements in vertical abutting single file and for urging said contact elements toward said loading shaft whereby when said loading shaft is rotated one turn a contact element is received in each of said loading channels in generally conforming relation therein, resilient stop means for releasably retaining said contact elements in a predetermined vertical position in said loading channels, and a loading plunger including a finger member in each of said loading channels for simultaneously pushing the contact elements in the loading channels into the respective apertures in the insulator body disposed below said loading shaft.

3. Contact loading mechanism according to claim 2 wherein said drive means include a rotatable clutch plate, means for intermittently rotating said clutch plate a predetermined amount in a first direction and a predetermined amount in the opposite direction, drive gearing operatively associated with said loading shaft, and one-way drive means connecting said drive gearing and said clutch plate whereby said one-way drive means engages and said loading shaft is rotated one full turn in said direction when said clutch plate is rotated said predetermined amount in one of said directions, and whereby said one-way drive means disengages and said loading shaft remains stationary when said clutch plate is rotated in said other direction.

4. Contact loading mechanism according to claim 2 wherein said drive means include a rotatable clutch plate having a cam groove therein with a cam shoulder facing in one circumferential direction, means for intermittently rotating said clutch plate one full turn in a first direction and one full turn in the opposite direction, and drive gearing operatively associated with said loading shaft including a gear having a cam pawl resiliently disposed in the cam groove in said clutch plate whereby said cam pawl is engaged by said shoulder when said clutch plate is rotated in one of said directions to rotate said gear and to rotate said loading shaft one full turn, and whereby said clutch pawl disengages from said shoulder when said clutch plate is rotated in the other of said directions so that said gear and said shaft remain stationary.

5. Mechanism for loading in apertures of insulator bodies electrical connector elements each having a head portion and a reduced size tail portion, comprising a stationary frame, connector element locating structure secured to said stationary frame and adapted for positioning one connector element at a time, means for successively moving insulator bodies into a position below said locating structure with the aperture in the insulator body aligned with the connector element disposed in said locating structure, means carrying a multiude of connector elements in vertical abutting single file and for urging said connector elements toward said loading structure, said locating structure including a pair of opposed spring-pressed fingers adapted to resiliently retain the tail portions of successive connector elements, and an insertion ram adapted to engage the connector element positioned in said locating structure and to move said element into the aperture in the socket body therebelow.

6. In an assembling machine, mechanism for loading electrical contact elements in properly orientated relationship in apertures in an insulator body comprising a stationary frame, a loading shaft disposed in vertical relation on said frame and having a plurality of axially disposed circumferentially spaced loading channels therein each with a configuration generally conforming in cross section with the largest cross section of the contact elements, said plurality of loading channels including a series of equally spaced channels having a space of relatively greater proportion between oppositely disposed end channels of said series of channels, means for successively moving insulator bodies into a predetermined position relative to said loading shaft with the apertures aligned with the loading channels in said shaft, means for placing a contact element in generally conforming relation in each of said loading channels, and plunger means for simultaneously pushing the contact elements in the loading channels into the aligned apertures in the insulator body disposed in said predetermined position.

7. The loading mechanism of claim 6 further characterized in that said cross sectional configuration of said channels is formed to prevent rotation of the contact elements in corresponding channels.

8. The loading mechanism of claim 6 further characterized in that said plurality of loading channels includes a series of seven of said channels.

References Cited by the Examiner

UNITED STATES PATENTS

| | | | |
|---|---|---|---|
| 1,944,360 | 1/34 | Meyer | 29—208 X |
| 2,165,105 | 7/39 | Krejci et al. | 153—2 |
| 2,650,634 | 9/53 | Young et al. | 153—2 |
| 2,692,424 | 10/54 | Habel | 29—203 |
| 2,740,189 | 4/56 | Moore | 29—203 |
| 2,797,608 | 7/57 | Huyett | 29—203 X |
| 2,804,591 | 8/57 | Wilcox | 324—51 |
| 2,830,264 | 4/58 | Whitman | 324—51 |
| 2,870,728 | 1/59 | Goodykoontz | 29—203 X |
| 2,881,726 | 4/59 | Johnson | 153—21 |
| 2,908,376 | 10/59 | Sahagun | 198—33 |
| 2,970,371 | 2/61 | Cardani et al. | 29—203 |
| 3,034,633 | 5/62 | Clifford et al. | 198—33 |
| 3,043,001 | 7/62 | Gluck | 29—203 |
| 3,063,139 | 11/62 | Maximoff et al. | 29—203 |

WHITMORE A. WILTZ, *Primary Examiner.*

JAMES W. LAWRENCE, THOMAS H. EAGER, *Examiners.*